(12) United States Patent
Huang et al.

(10) Patent No.: US 11,724,460 B2
(45) Date of Patent: Aug. 15, 2023

(54) METHODS AND SYSTEMS OF THREE DIMENSIONAL PRINTING

(71) Applicant: University of Florida Research Foundation, Incorporated, Gainesville, FL (US)

(72) Inventors: Yong Huang, Gainesville, FL (US); Yifei Jin, Gainesville, FL (US); Ashley M. Compaan, Gainesville, FL (US); Wenxuan Chai, Gainesville, FL (US); Chengcheng Liu, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 17/527,790

(22) Filed: Nov. 16, 2021

(65) Prior Publication Data
US 2022/0176639 A1    Jun. 9, 2022

Related U.S. Application Data

(62) Division of application No. 16/334,202, filed as application No. PCT/US2017/052020 on Sep. 18, 2017, now Pat. No. 11,207,841.
(Continued)

(51) Int. Cl.
| | |
|---|---|
| *B29C 64/40* | (2017.01) |
| *B33Y 10/00* | (2015.01) |
| *B33Y 30/00* | (2015.01) |
| *B33Y 70/00* | (2020.01) |
| *B29C 64/20* | (2017.01) |
| *B29C 64/106* | (2017.01) |

(Continued)

(52) U.S. Cl.
CPC ............. *B29C 64/40* (2017.08); *B29C 64/00* (2017.08); *B29C 64/106* (2017.08); *B29C 64/112* (2017.08); *B29C 64/20* (2017.08); *B33Y 10/00* (2014.12); *B33Y 30/00* (2014.12); *B33Y 70/00* (2014.12); *B29K 2105/0061* (2013.01); *B29K 2995/0056* (2013.01)

(58) Field of Classification Search
None
See application file for complete search history.

(56) References Cited

U.S. PATENT DOCUMENTS

| | | | |
|---|---|---|---|
| 8,470,231 B1 | 6/2013 | Dikovsky et al. | |
| 11,207,841 B2 * | 12/2021 | Huang | B33Y 70/00 |
| 2015/0010461 A1 | 1/2015 | Cronin | |

FOREIGN PATENT DOCUMENTS

| | | |
|---|---|---|
| WO | WO-2014/017421 A2 | 2/2015 |
| WO | WO-2015/111366 A1 | 7/2015 |

(Continued)

OTHER PUBLICATIONS

International Searching Authority, International Search Report for International Application No. PCT/US2017/052020, dated Nov. 24, 2017, (3 pages), Commissioner for Patents, United States Patent and Trademark Office, USA.

(Continued)

*Primary Examiner* — Robert J Grun
(74) *Attorney, Agent, or Firm* — Alston & Bird LLP

(57) ABSTRACT

Embodiments of the present disclosure provide for three dimensional printing apparatuses, methods of three dimensional printing, and the like.

20 Claims, 33 Drawing Sheets

Related U.S. Application Data

(60) Provisional application No. 62/414,881, filed on Oct. 31, 2016, provisional application No. 62/396,258, filed on Sep. 19, 2016.

(51) Int. Cl.
    *B29C 64/112*     (2017.01)
    *B29C 64/00*     (2017.01)
    *B29K 105/00*     (2006.01)

(56) References Cited

FOREIGN PATENT DOCUMENTS

| | | |
|---|---|---|
| WO | WO-2016/090286 A1 | 6/2016 |
| WO | WO-2016/130953 A1 | 8/2016 |
| WO | PCT/US2017/052020 | 9/2017 |

OTHER PUBLICATIONS

International Searching Authority, Written Opinion for International Application No. PCT/US2017/052020, dated Nov. 24, 2017, (9 pages), Commissioner for Patents, United States Patent and Trademark Office, USA.

Kruth, J.P. et al. "Progress in Additive Manufacturing and Rapid Prototyping," *CIRP Annals Manufacturing Technology*, vol. 47, No. 2, Jan. 1, 1998, pp. 525-540.

Guo Nannan et al. "Additive Manufacturing: Technology, Applications and Research Needs," *Frontiers of Mechanical Engineering*, vol. 8, No. 3, Sep. 2013, pp. 215-243.

Ringeisen, Bradley R. et al. (2015) "Cell and Organ Printing Turns 15: Diverse Research to Commercial Transitions," *MRS Bulletin*, vol. 38, Oct. 2013, pp. 834-843.

Huang, Yong et al. "Additive Manufacturing: Current State, Future Potential, Gaps and Needs, and Recommendations," *ASME Journal of Manufacturing Science and Engineering*, vol. 137, Feb. 2015, pp. 014001-1-014001-10.

Siqueira, Gilberto et al. (2017) "Cellulose Nanocrystal Inks for 3D Printing of Textured Cellular Architectures" *Advanced Functional Materials*, vol. 27, No. 12:1604619, Mar. 2017, pp. 1-10.

Jin, Yifei et al. "Self-Supporting Nanoclay as Internal Scaffold Material for Direct Printing of Soft Hydrogel Composite Structures in Air," *ACS Applied Materials & Interfaces*, vol. 9, May 24, 2017, pp. 17456-17465.

Duarte-Campos, Daniela F. et al. "Three-Dimensional Printing of Stem Cell-Laden Hydrogels Submerged in a Hydrophobic High-Density Fluid," *Biofabrication*, (2013), vol. 5:015003, pp. 1-11.

Wu, Willie et al. "Omnidirectional Printing of 3D Microvascular Networks," *Advanced Materials*, vol. 23, (2011), pp. 178-183.

Highley, Christopher B. (2015) "Direct 3D Printing of Shear-Thinning Hydrogels into Self-Healing Hydrogels" *Advanced Materials*, vol. 27, (2015), pp. 5075-5079.

Bhattacharjee, Tapomoy et al. "Writing in the Granular Gel Medium," *Science Advances*, vol. 1:1500655, Sep. 25, 2015, pp. 1-6.

Jin, Yifei et al. "Granular Gel Support-Enabled Extrusion of Three-Dimensional Alginate and Cellular Structures," *Biofabrication*, vol. 8, No. 2: 025016, Jun. 3, 2016, pp. 1-21.

Hinton, Thomas J. et al. "3D Printing PDMS Elastomer in a Hydrophilic Support Bath via Freeform Reversible Embedding," *ACS Biomaterials Science & Engineering*, vol. 2, May 4, 2016, pp. 1781-1786.

Hinton, Thomas J. et al. "Three-Dimensional Printing of Complex Biological Structures by Freeform Reversible Embedding of Suspended Hydrogels" Science Advances, Oct. 23, 2015, vol. 1, No. 9:1500758, pp. 1-10.

Mourchid, A. et al. "Phase Diagram of Colloidal Dispersions of Anisotropic Charged-Particles-Equilibrium Properties, Structure, and Rheology of Laponite Suspensions" *Langmuir*, vol. 11, (1995), pp. 1942-1950.

Mourchid, A. et al. "On Viscoelastic, Birefringent, and Swelling Properties of Laponite Clay Suspensions: Revisited Phase Diagram," *Langmuir*, vol. 14, Jun. 4, 1998, pp. 4718-4723.

Dawson, Jonathan I. et al. "Clay Gels for the Delivery of Regenerative Microenvironments," *Advanced Materials*, vol. 23, (2011), pp. 3304-3308.

Gaharwar, Akhilesh K. et al. (2010) "Assessment of Using Laponite® Cross-linked Poly (Ethylene Oxide) for Controlled Cell Adhesion and Mineralization" *Acta Biomaterialia*, vol. 7, No. 2, Feb. 2011, pp. 568-577.

Gaharwar, Akhilesh K. et al. "Bioactive Silicate Nanoplatelets for Osteogenic Differentiation of Human Mesenchymal Stem 2 Cells," *Advanced Materials*, vol. 25, (2013), pp. 3329-3336.

Mihaila, Silvia M. et al. "The Osteogenic Differentiation of SSEA-4 Sub-Population of Human Adipose Derived Stem Cells Using Silicate Nanoplatelets," *Biomaterials*, vol. 35, Aug. 12, 2014, pp. 9087-9099.

Kerativitayanan, Punyavee et al. "Elastomeric and Mechanically Stiff Nanocomposites From Poly(glycerol sebacate) and Bioactive Nanosilicates," Acta Biomateriala, vol. 26, Aug. 18, 2015, pp. 34-44.

Xavier, Janet R. et al. (2015) "Bioactive Nanoengineered Hydrogels for Bone Tissue Engineering: a Growth-Factor-Free Approach," *ACS Nano*, vol. 9, No. 3, Feb. 12, 2015, pp. 3109-3118.

Pignon, Frederic et al. "Thixotropic Behavior of Clay Dispersions: Combinations of Scattering and Rheometric Techniques" *Journal of Rheology*, vol. 42, Aug. 11, 1998, pp. 1349-1373.

Conrad, Jacinta C. et al. "Structure of Colloidal Gels During Microchannel Flow" *Langmuir*, vol. 24, (Jun. 5, 2008), pp. 7628-7634.

Willenbacher, Norbert. "Unusual Thixotropic Properties of Aqueous Dispersions of Laponite RD," *Journal of Colloid and Interface Science*, vol. 182, No. 0494, (1996), pp. 501-510.

Gibaud, Thomas et al. "Shear-Induced Fragmentation of Laponite Suspensions," *Soft Matter*, vol. 5, Jul. 1, 2009, pp. 3026-3037.

Xu, Changxue et al. "Predictive Compensation-Enabled Horizontal Inkjet Printing of Alginate Tubular Constructs," *Manufacturing Letters*, vol. 1, Oct. 3, 2013, pp. 28-32.

Christensen, Kyle et al. "Freeform Inkjet Printing of Cellular Structures with Bifurcations," *Biotechnology & Bioengineering*, vol. 112, No. 5, May 2015, pp. 1047-1055.

Xiong, Ruitong et al. (2015) "Freeform Drop-on-Demand Laser Printing of 3D Alginate and Cellular Constructs," *Biofabrication*, vol. 7, No. 4:045011, Dec. 22, 2015, pp. 1-13.

Morris, Edwin R. et al. "Chiroptical and Stoichiometric Evidence of a Specific, Primary Dimerisation Process in Alginate Gelation" *Carbohydrate Research*, vol. 66, (1978), pp. 145-154.

Braschler, Thomas et al. "Link Between Alginate Reaction Front Propagation and General Reaction Diffusion Theory," *Analytical Chemistry*, vol. 83, Feb. 25, 2011, pp. 2234-2242.

Wedlock, David J. et al. "Comparison of Molecular Weight Determination of Sodium Alginate by Sedimentation-Diffusion and Light Scattering," *International Journal of Biological Macromolecules*, vol. 8, (1986), pp. 57-61.

Xu, Changxue et al. (2012) "Scaffold-Free Inkjet Printing of Three-Dimensional Zigzag Cellular Tubes," *Biotechnology & Bioengineering*, vol. 109, No. 12, Dec. 2012, pp. 3152-3160.

Moller, Peder et al. "An Attempt to Categorize Yield Stress Fluid Behaviour," *Philosophical Transactions of the Royal Society of London A: Mathematical, Physical and Engineering Sciences*, vol. 367, No. 1909, Dec. 28, 2009, pp. 5139-5155.

Divoux, Thibaut et al. "Transient Shear Banding in a Simple Yield Stress Fluid," *Physical Review Letters*, vol. 104 No. 20:208301, May 18, 2010, pp. 1-4.

Lee, David et al. "Investigating the Microstructure of a Yield-Stress Fluid by Light Scattering," *Physical Review E*, vol. 83: 031401, Mar. 10, 2011, pp. 1-8.

Ovarlez, G. et al. "On the Existence of a Simple Yield Stress Fluid Behavior," *Journal of Non-Newtonian Fluid Mechanics*, vol. 193, (2013), pp. 68-79.

Putz, A.M.V. et al. (2008) "Settling of an Isolated Spherical Particle in a Yield Stress Shear Thinning Fluid," *Physics of Fluids*, vol. 20, No. 3, Mar. 12, 2008, pp. 33102-33300.

(56) References Cited

OTHER PUBLICATIONS

Dimitriou, Christopher J. et al. "Describing and Prescribing the Constitutive Response of Yield Stress Fluids Using Large Amplitude Oscillatory Shear Stress (LAOStress)," *Journal of Rheology*, vol. 57, No. 1, Jan. 4, 2013, pp. 27-70.

Parmar, K.P.S. et al. "Electrorheological Suspensions of Laponite in Oil: Rheometry Studies," *Langmuir*, vol. 24, No. 5, Jan. 24, 2008, pp. 1814-1822.

Mironov, Vladimir et al. (2009) "Organ Printing: Tissue Spheroids as Building Blocks," *Biomaterials*, vol. 30, Jan. 26, 2009, pp. 2164-2174.

Ozbolat, Ibrahim T. et al. "Bioprinting Toward Organ Fabrication: Challenges and Future Trends," IEEE Transactions on Biomedical Engineering, vol. 60, No. 3, Mar. 2013, pp. 691-699.

Landers, Rudiger et al. "Rapid Prototyping of Scaffolds Derived From Thermoreversible Hydrogels and Tailored for Applications in Tissue Engineering," *Biomaterials*, vol. 23, Jul. 2, 2002, pp. 4437-4447.

Fedorovich, Natalja E. et al. "Three-Dimensional Fiber Deposition of Cell-Laden, Viable, Patterned Constructs for Bone Tissue Printing" *Tissue Engineering: Part A*, vol. 14, No. 1, (2008), pp. 127-133.

Chang, Carlos C. et al. "Direct-Write Bioprinting Three-Dimensional Biohybrid Systems for Future Regenerative Therapies," *Journal of Biomedical Materials Research Part B: Applied Biomaterials*, vol. 98, No. 1, Jul. 2011, pp. 160-170.

Zein, Iwan et al. "Fused Deposition Modeling of Novel Scaffold Architectures for Tissue Engineering Applications," *Biomaterials*, vol. 23, No. 4, Feb. 15, 2002, pp. 1169-1185.

Hockaday, L.A. et al. "Rapid 3D Printing of Anatomically Accurate and Mechanically Heterogeneous Aortic Valve Hydrogel Scaffolds," *Biofabrication*, vol. 4, No. 3:035005, Aug. 23, 2012, pp. 1-12.

Bertassoni, Luiz E. et al. "Direct-Write Bioprinting of Cell-Laden Methacrylated Gelatin Hydrogels," *Biofabrication*, vol. 6, No. 2:024105, Apr. 3, 2014, pp. 1-11.

Khalil, Saif et al. "Biopolymer Deposition for Freeform Fabrication of Hydrogel Tissue Constructs" *Materials Science & Engineering C*, vol. 27, No. 3, Apr. 1, 2007, pp. 469-478.

Ozbolat, Ibrahim T. et al. "Current Advances and Future Perspectives in Extrusion-Based Bioprinting," *Biomaterials*, vol. 76, Jan. 1, 2016, pp. 321-343.

Gaharwar, Akhilesh K. et al. "Shear-Thinning Nanocomposite Hydrogels for the Treatment of Hemoithage" *ACS Nano*, vol. 8, No. 10, Sep. 15, 2014, pp. 9833-9842.

Saharwar A. et al. "Nanoclay-Enriched Poly (ϵ-caprolactone) Electrospun Scaffolds for Osteogenic Differentiation of Human Mesenchymal Stem Cells," *Tissue Engineering: Part A*, vol. 20, Nos. 15-16, (2014), pp. 2088-2101.

Wang, Qigang et al. "High-Water-Content Mouldable Hydrogels by Mixing Clay and a Dendritic Molecular Binder," *Nature*, vol. 463, Jan. 21, 2010, pp. 339-343.

Du, Juan et al. "Tough Dual Nanocomposite Hydrogels with Inorganic Hybrid Crosslinking," *Soft Matter*, vol. 12, (Jan. 5, 2016), pp. 1649-1654.

Soussot, P et al. "Coexistence of Liquid and Solid Phases in Flowing Soft-Glassy Materials," *Physical Review Letters*, vol. 88, No. 21:218301, May 8, 2002, pp. 1-4.

Baghdadi, Hossein A. et al. "Rheology and Gelation Kinetics in Laponite Dispersions Containing Poly (ethylene oxide)," *Journal of Polymer Science Part B: Polymer Physics*, vol. 43, (2005), pp. 233-240.

Chen, Guang-Xin et al. "Clay Functionalization and Organization for Delamination of the Silicate Tactoids in Poly ($_L$-lactide) Matrix," Macromolecular Rapid Communications, vol. 26, Mar. 21, 2005, pp. 899-904.

Chang, Chien-Wen et al. "PEG/Clay Nanocomposite Hydrogel: a Mechanically Robust Tissue Engineering Scaffold," *Soft Matter*, vol. 6, May 13, 2010, pp. 5157-5164.

Gaharwar, Akhilesh K. et al. "Highly Extensible, Tough, and Elastomeric Nanocomposite Hydrogels from Poly(ethylene glycol) and Hydroxyapatite Nanoparticles," *Biomacromolecules*, vol. 12, Mar. 17, 2011, pp. 1641-1650.

Wu, Chia-Jung et al. "Mechanically Tough Pluronic F127/Laponite Nanocomposite Hydrogels from Covalently and Physically Cross-Linked Networks," *Macromolecules*, vol. 44, Sep. 19, 2011, pp. 8215-8224.

Fan, Quan et al. "Amperometric Phenol Biosensor Based on Laponite Clay-Chitosan Nanocomposite Matrix," *Biosensors & Bioelectronics*, vol. 22, (2007), pp. 816-821.

Yang, Huixia et al. "Composite Hydrogel Beads based on Chitosan and Laponite: Preparation, Swelling, and Drug Release Behaviour," *Iranian Polymer Journal*, vol. 20, (2011), pp. 479-490.

Ghadiri, M. et al. "Physico-Chemical, Mechanical and Cytotoxicity Characterizations of Laponite®/Alginate Nanocomposite," *Applied Clay Science*, vol. 85, Oct. 2, 2013, pp. 64-73.

Schexnailder, Patrick J. et al . "Tuning Cell Adhesion by Incorporation of Charged Silicate Nanoparticles as Cross-Linkers to Polyethylene Oxide" *Macromolecular Bioscience*, vol. 10, (2010), pp. 1416-1423.

Gaharwar, Akhilesh K. et al. "Transparent, Elastomeric and Tough Hydrogels from Poly(ethylene glycol) and Silicate Nanoparticles," Acta Biomaterialia, vol. 7, Jul. 30, 2011, pp. 4139-4148.

Hossein, Hosseini et al. "Rheological Properties of Thermoresponsive Nanocomposite Hydrogels," *Journal of Applied Polymer Science*, vol. 133:43123 (2016), pp. 1-6.

Gaharwar, Akhilesh K. et al. (2014) "Nanocomposite Hydrogels for Biomedical Applications," *Biotechnology & Bioengineering*, vol. 111, (2014), pp. 441-453.

Carrow, James K. et al. "Bioinspired Polymeric Nanocomposites for Regenerative Medicine," *Macromolecular Chemistry and Physics*, vol. 216, No. 3, Feb. 2015, pp. 248-264.

Paul, Arghya. "Nanocomposite Hydrogels: an Emerging Biomimetic Platform for Myocardial Therapy and Tissue Engineering," *Nanomedicine*, vol. 10, No. 9, (2015), pp. 1371-1374.

Zebrowski, J. et al. "Shake-Gels: Shear-Induced Gelation of Laponite-PEO Mixtures," *Colloids & Surfaces A*, vol. 13, (2003), pp. 189-197.

Loizou, Elena et al. "Large Scale Structures in Nanocomposite Hydrogels," *Macromolecules*, vol. 38, (2005), pp. 2047-2049.

Loizou, Elena et al. "Dynamic Responses in Nanocomposite Hydrogels," *Macromolecules*, vol. 39, (2006), pp. 1614-1619.

Schexnailder, Patrick et al. "Nanocomposite Polymer Hydrogels," Colloid and Polymer Science, vol. 287, No. 1, Jan. 2009, pp. 1-11.

Pawar, Nisha et al. "Surface Selective Binding of Nanoclay Particles to Polyampholyte Protein Chains," *The Journal of Chemical Physics*, vol. 131, Jul. 23, 2009, pp. 045103-1-045103-10.

Hong, Sungmin et al. (2015) "3D Printing of Highly Stretchable and Tough Hydrogels Into Complex, Cellularized Structures," *Advanced Materials*, vol. 27, (2015), pp. 4035-4040.

Gladman, A. Sydney et al. "Biomimetic 4D Printing," *Nature Materials*, vol. 15, Jan. 25, 2016, pp. 413-418.

Bettinger, Christopher J. et al. (2009) "Engineering Substrate Topography at the Micro-and Nanoscale to Control Cell Function," *Angewandte Chemie International Edition*, vol. 48, No. 30, Jul. 13, 2009, pp. 5406-5415.

Murphy, Sean V. et al. "3D Bioprinting of Tissues and Organs" *Nature Biotechnology*, vol. 32, No. 8, Aug. 5, 2014, pp. 773-785.

Pati, Falguni et al. "3D Bioprinting of Tissue/Organ Models," *Angewandte Chemie International Edition*, vol. 55, No. 15, Apr. 4, 2016, pp. 4650-4665.

Mandrycky, Christian et al. (2016) "3D Bioprinting for Engineering Complex Tissues," *Biotechnology Advances*, vol. 34, Dec. 23, 2015, pp. 422-434.

Li, M.G. et al. "Modeling of Flow Rate, Pore Size, and Porosity for the Dispensing-Based Tissue Scaffolds Fabrication" *Journal of Manufacturing Science and Engineering*, vol. 131:034501, Jun. 2009, pp. 1-5.

Kang, K.H. et al. (2013) "Quantitative Optimization of Solid Freeform Deposition of Aqueous Hydrogels," *Biofabrication*, vol. 5, No. 3:335001, May 2, 2013, pp. 1-13.

(56) References Cited

OTHER PUBLICATIONS

Wang, Xiaohong et al. "Optimizing the Fabrication Processes for Manufacturing a Hybrid Hierarchical Polyurethane-Cell/Hydrogel Construct," *Journal of Bioactive and Compatible Polymers*, vol. 28, No. 4, Jul. 2013, pp. 303-319.

Kolesky, David B. et al. "3D Bioprinting of Vascularized, Heterogeneous Cell-Laden Tissue Constructs," *Advanced Materials*, vol. 26, (2014), pp. 3124-3130.

Duan, Bin et al. "3D Bioprinting of Heterogeneous Aortic Valve Conduits with Alginate/Gelatin Hydrogels," *Journal of Biomedical Materials Research Part A*, (2013), vol. 101A, pp. 1255-1264.

Choi, Young Seon et al. "Study on Gelatin-Containing Artificial Skin: I. Preparation and Characteristics of Novel Gelatin-Alginate Sponge," *Biomaterials*, vol. 20, (1999), pp. 409-417.

Rosellini, Elisabetta et al. "Preparation and Characterization of Alginate/Gelatin Blend Films for Cardiac Tissue Engineering," *Journal of Biomedical Materials Research Part A: an Official Journal of the Society for Biomaterials, the Japanese Society for Biomaterials, and the Australian Society for Biomaterials and the Korean Society for Biomaterials*, vol. 91, No. 2, pp. 447-453.

Dong, Zhanfeng et al. "Alginate/Gelatin Blend Films and Their Properties for Drug Controlled Release" *Journal of Membrane Science*, vol. 280, (2006), pp. 37-44.

Fadnavis, Nitin W. et al. "Gelatin Blends With Alginate: Gels for Lipase Immobilization and Purification," *Biotechnology Progress*, vol. 19, (2003), pp. 557-564.

Haraguchi, Kazutashi et al. "Nanocomposite Hydrogels: a Unique Organic-Inorganic Network Structure with Extraordinary Mechanical, Optical, and Swelling/De-swelling Properties," *Advanced Materials*, vol. 14, No. 16, Aug. 16, 2002, pp. 1120-1124.

Fan, Lihong et al. "Preparation and Characterization of Alginate/Gelatin Blend Fibers," *Journal of Applied Polymer Science*, vol. 96, (2005), pp. 1625-1629.

*Wohlers Report 2013: Additive Manufacturing and 3D Printing State of the Industry*, Wohlers Associats, Inc. (2013), Fort Collins, Colorado.

"ASTM International Committee F42 on Additive Manufacturing Technologies," ASTM F2792-10 Standard Terminology for Additive Manufacturing Technologies, (2009), (1 page), West Conshohocken, PA.

Mourchid, Ahmed et al. "Sol-Gel Transition of Colloidal Suspensions of Anisotropic Particles of Laponite," *Faraday Discussions*, vol. 101, (1995), pp. 275-285.

Gibaud, Thomas et al. "Influence of Boundary Conditions on Yielding in a Soft Glassy Material," *Physical Reviiew Letters*, vol. 101, No. 25:258302, (2008), (4 pages).

Pignon, Frédéric et al. "Yield Stress Thixotropic Clay Suspension: Investigations of Structure by Light, Neutron, and X-Ray Scattering," *Physical Review E*, vol. 56, No. 3, Sep. 1997, pp. 3281-3289.

Gaharwar, Akhilesh K. et al. "Highly Extensible Bio-Nanocomposite Films with Direction-Dependent Properties," *Advanced Functional Materials*, vol. 20, Dec. 3, 2010, pp. 429-436.

Schmidt-Nielsen, Knut. "Scaling in Biology: the Consequences of Size," *Journal of Experimental Zoology Part A: Ecological Genetics and Physiology*, vol. 194, (1975), pp. 287-307.

Lee, Jia Min et al. "A Preliminary Model of Time-Pressure Dispensing System for Bioprinting Based on Printing and Material Parameters: This Paper Reports a Method to Predict and Control the Width of Hydrogel Filament for Bioprinting Applications," *Virtual and Physical Prototyping*, vol. 10, No. 1, Nov. 20, 2014, pp. 3-8.

U.S. Appl. No. 16/334,202, filed Mar. 18, 2019, U.S. Pat. No. 11,207,841.

* cited by examiner

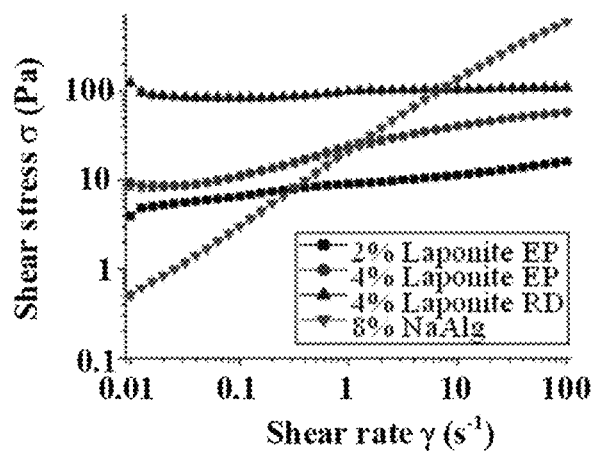
FIG. 1.1A
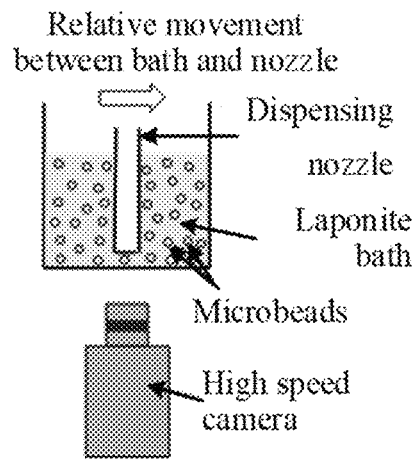
FIG. 1.1B
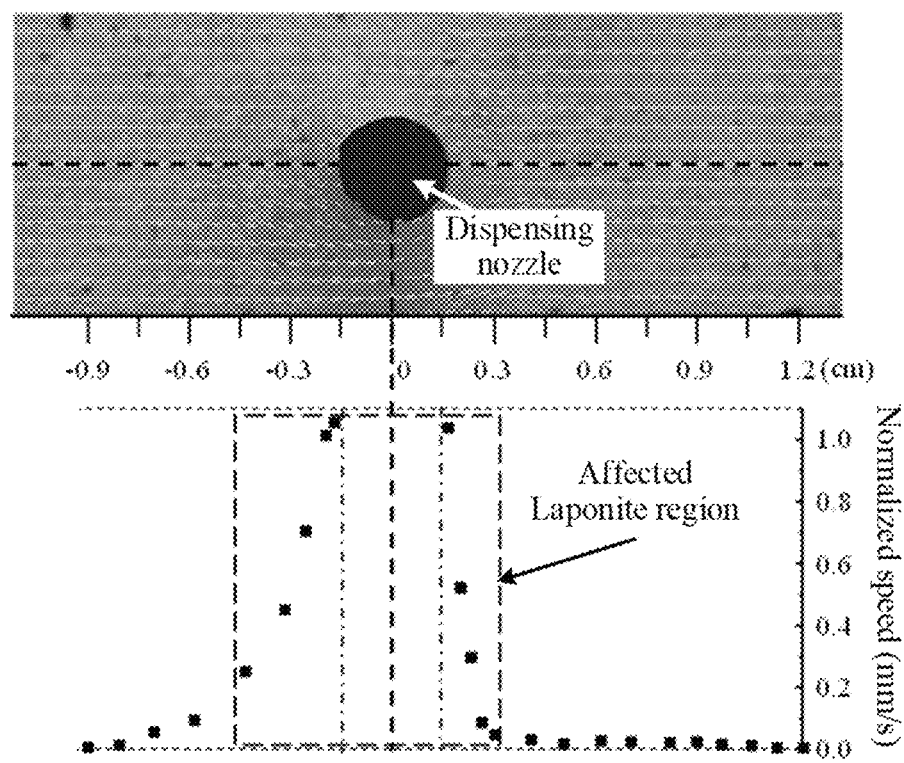
FIG. 1.1C

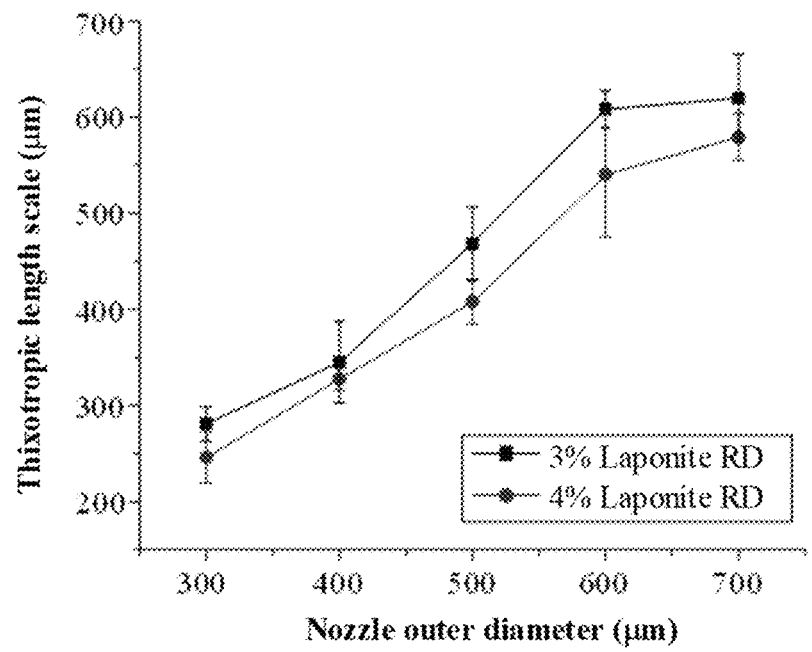
FIG. 1.1D
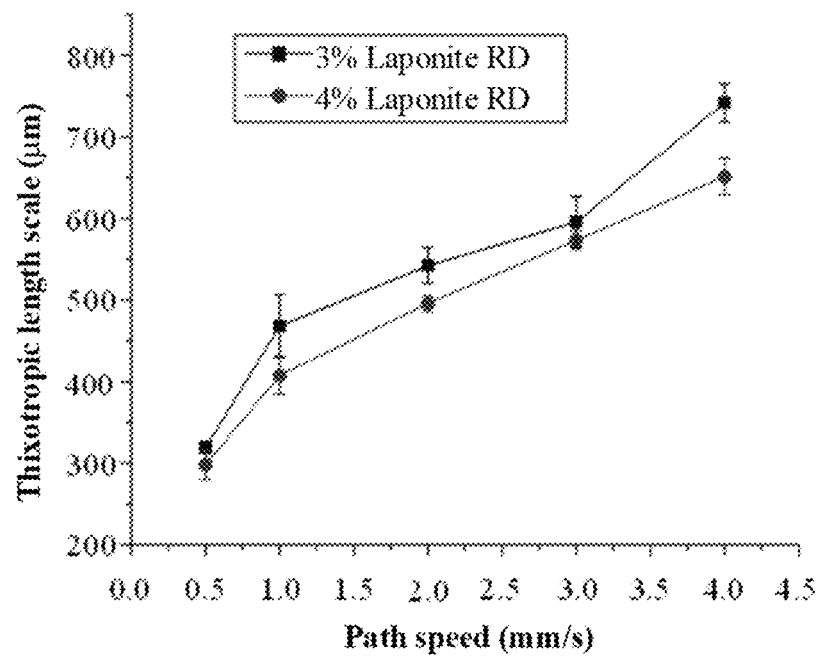
FIG. 1.1E

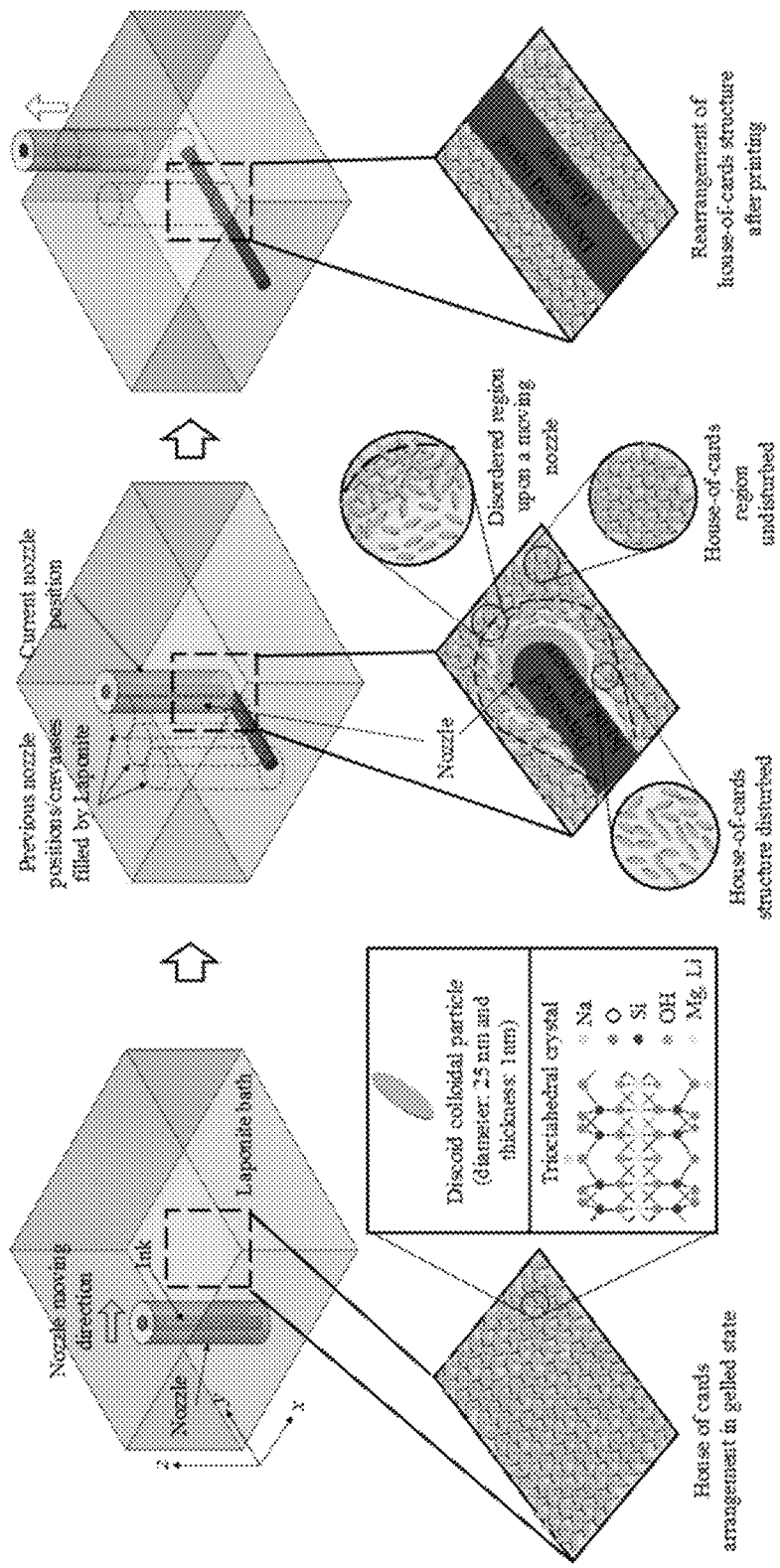
FIG. 1.2

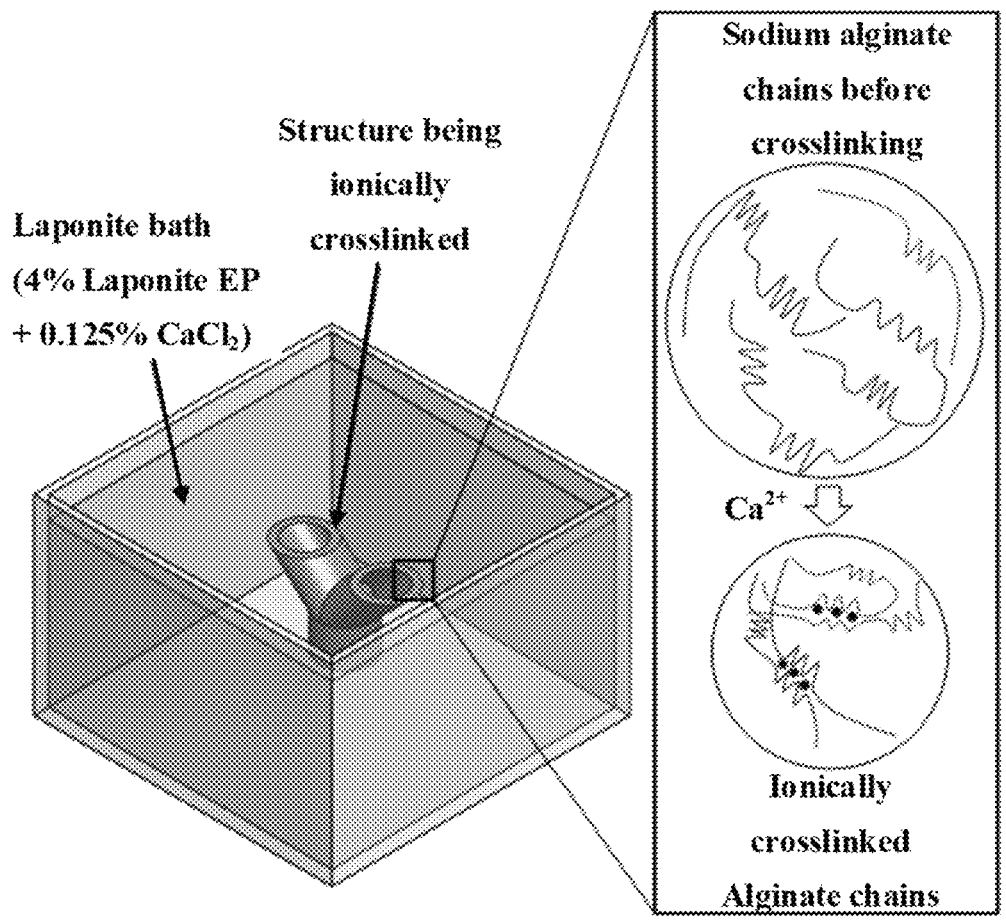
FIG. 1.3A
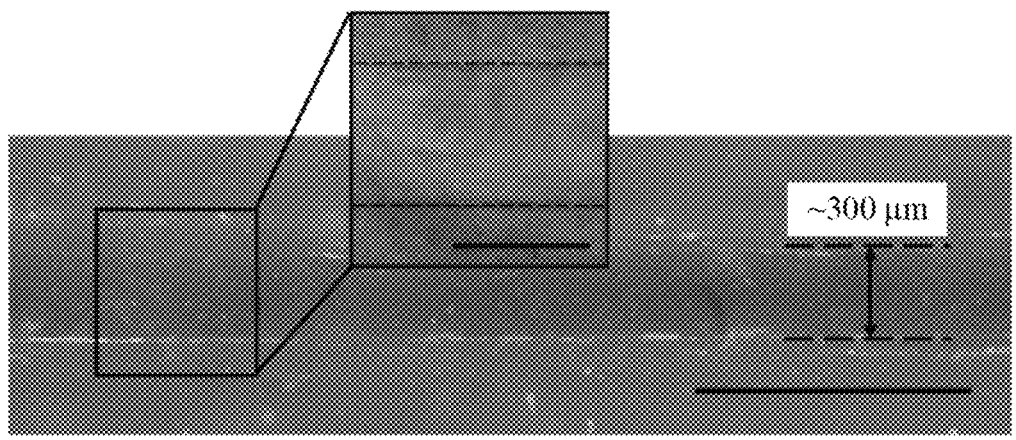
FIG. 1.3B

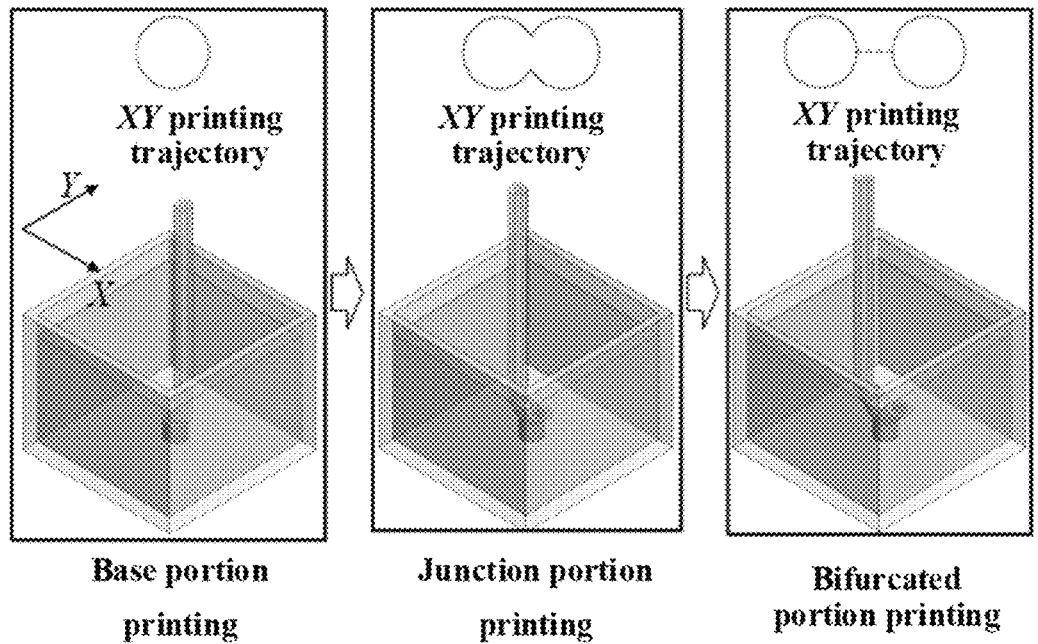
FIG. 1.3C
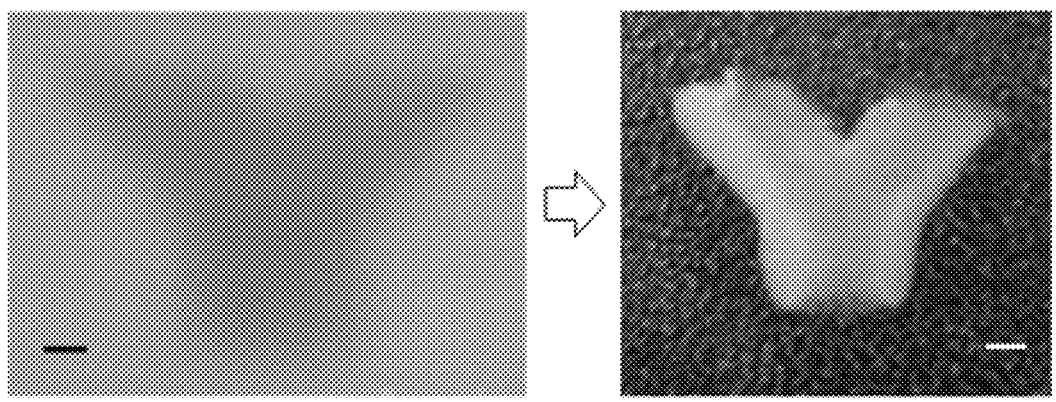
FIG. 1.3D
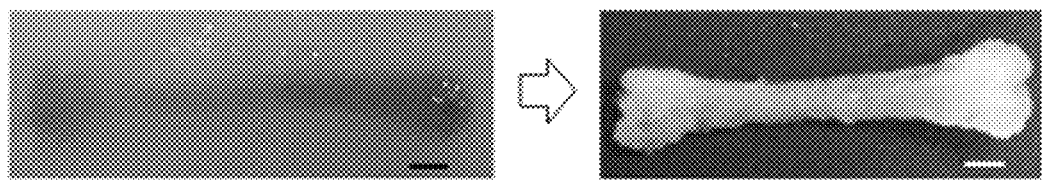
FIG. 1.3E

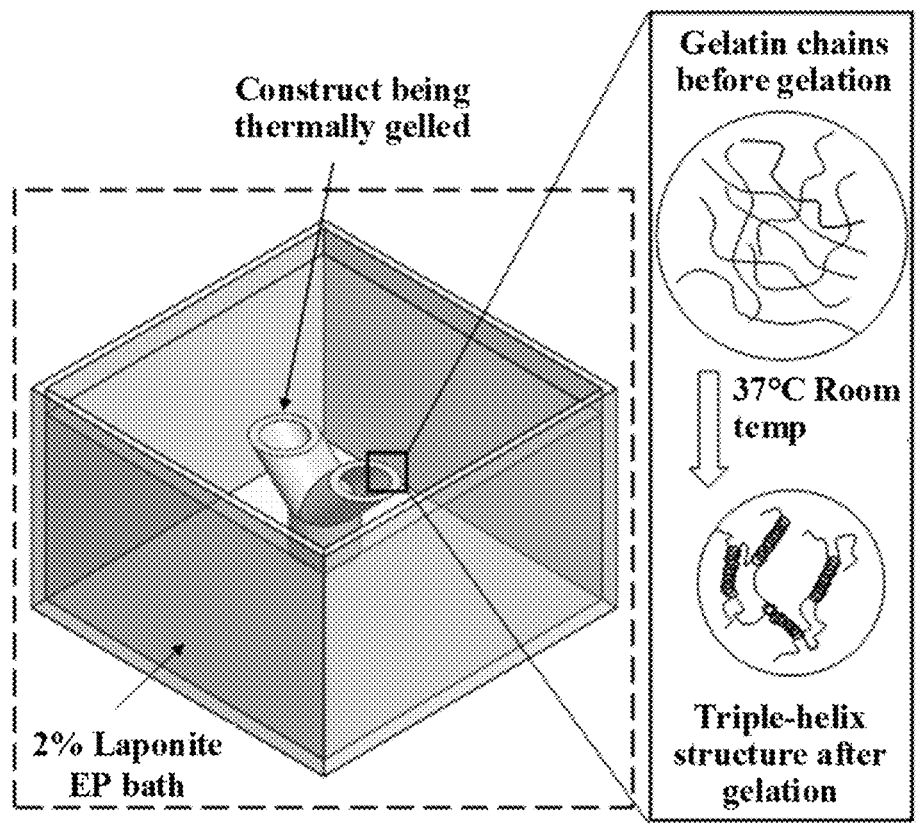
FIG. 1.4A
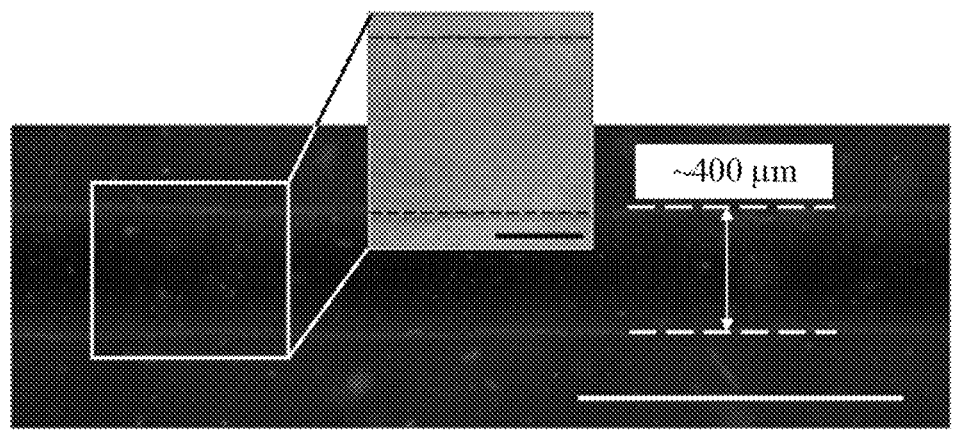
FIG. 1.4B

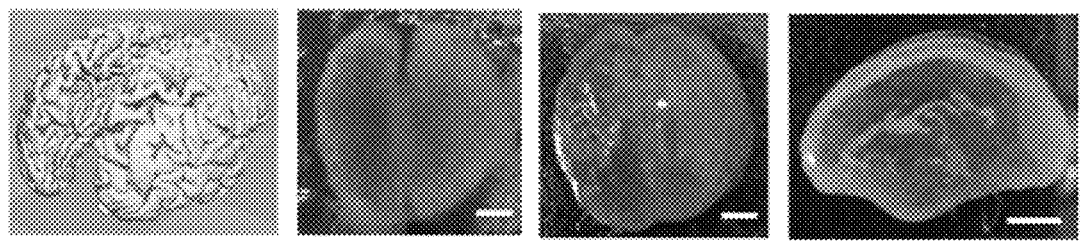
FIG. 1.4C
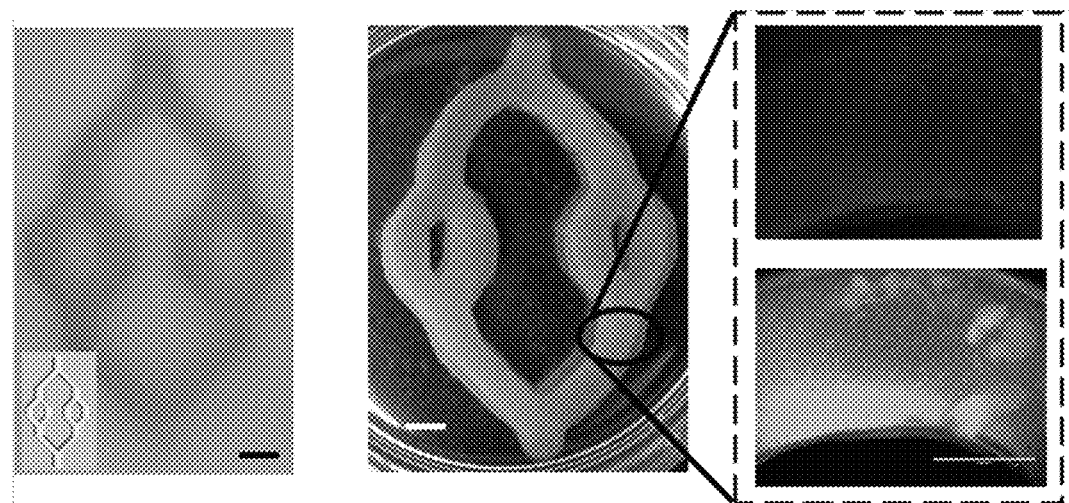
FIG. 1.4D
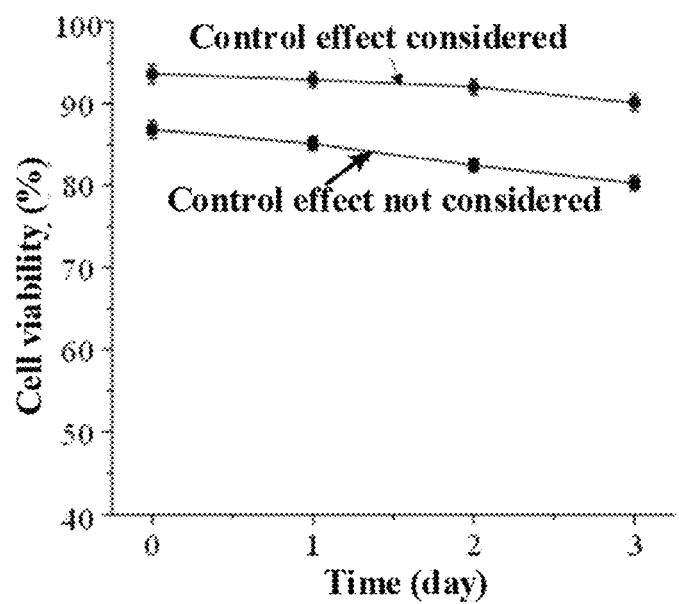
FIG. 1.4E

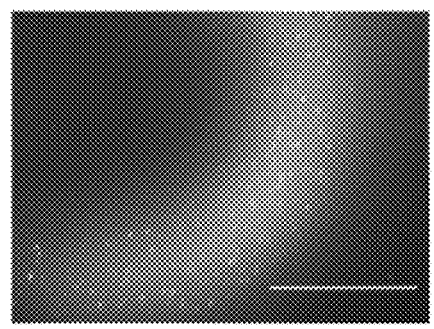
FIG. 1.4F
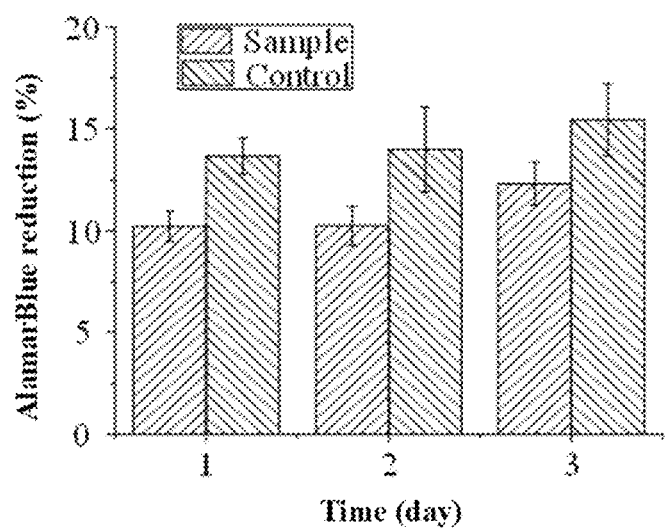
FIG. 1.4G
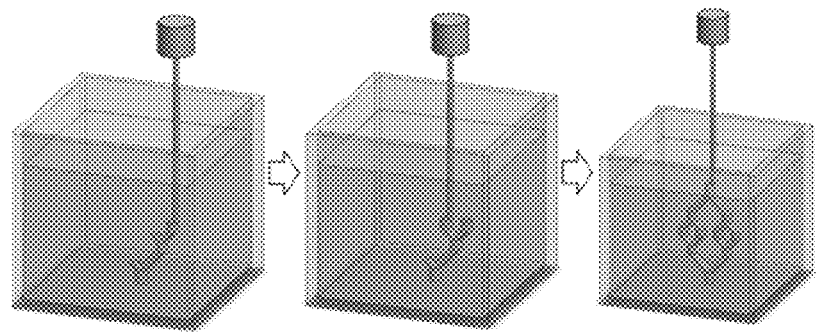
FIG. 1.4H

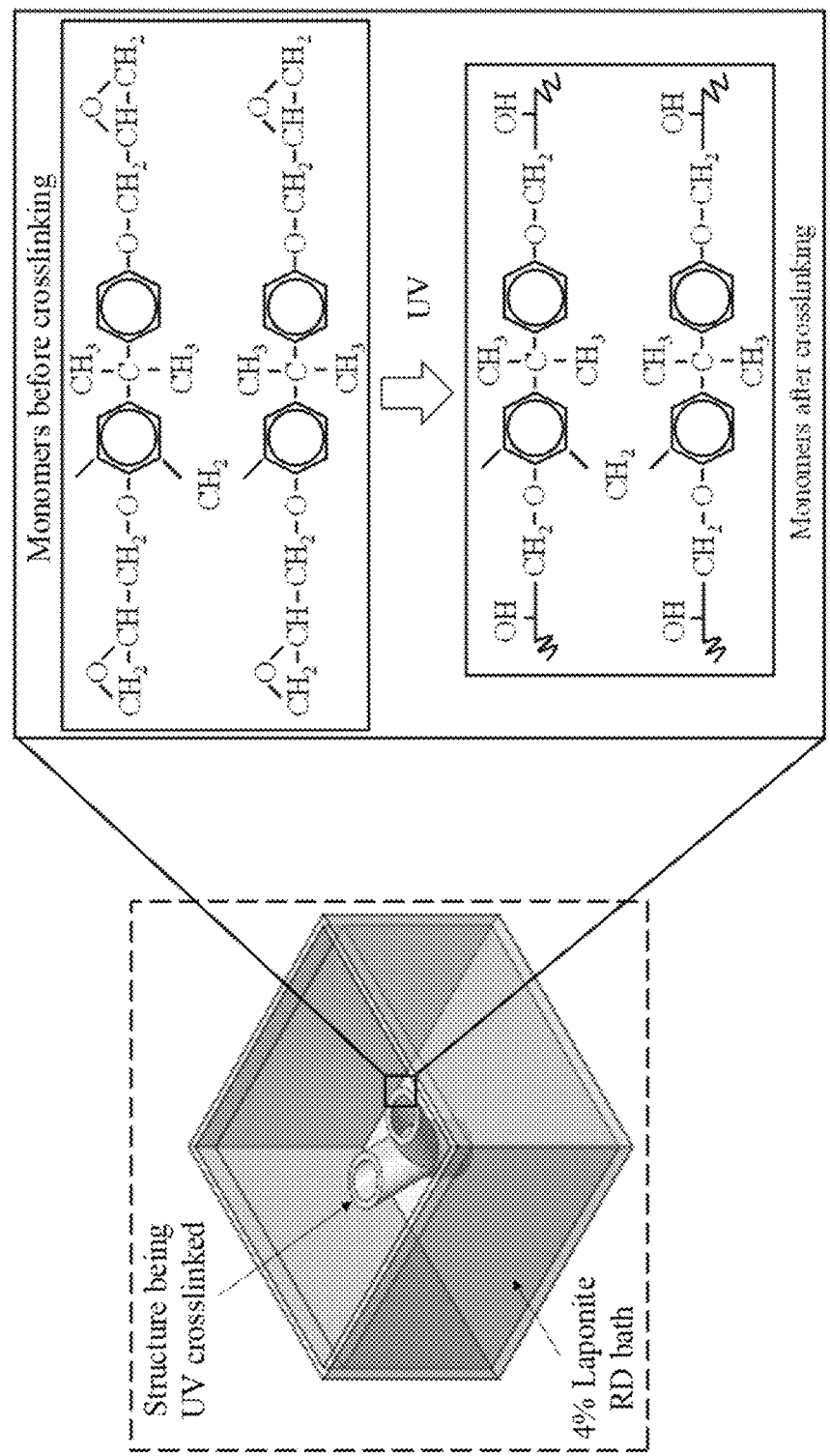
FIG. 1.5A

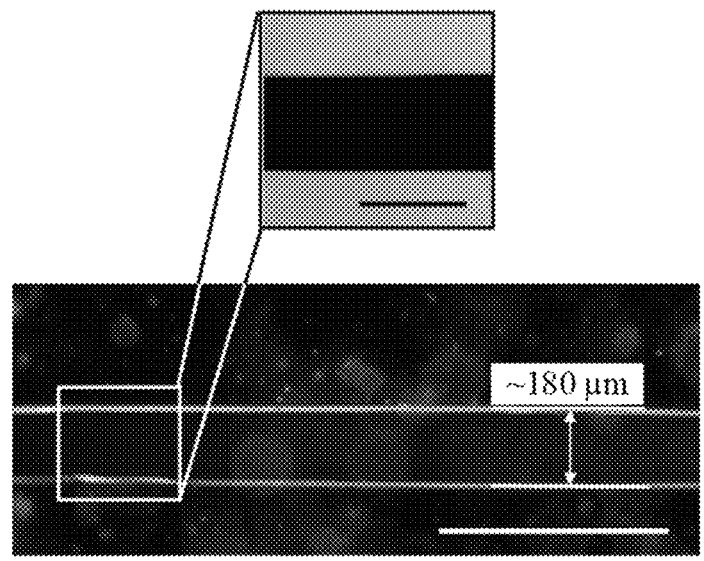
FIG. 1.5B
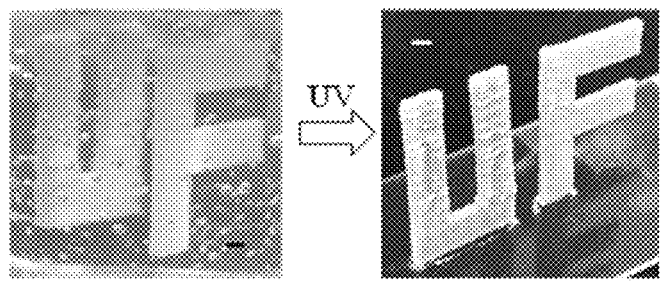
FIG. 1.5C
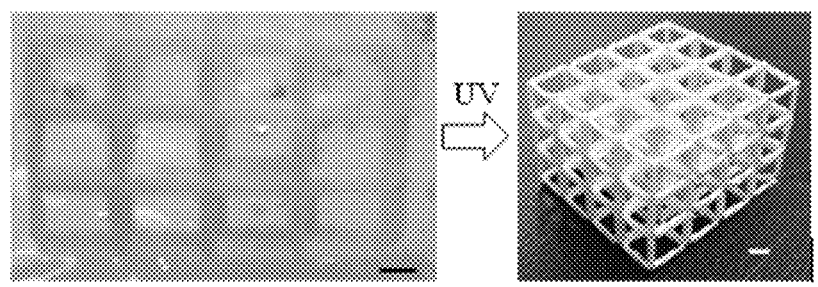
FIG. 1.5D

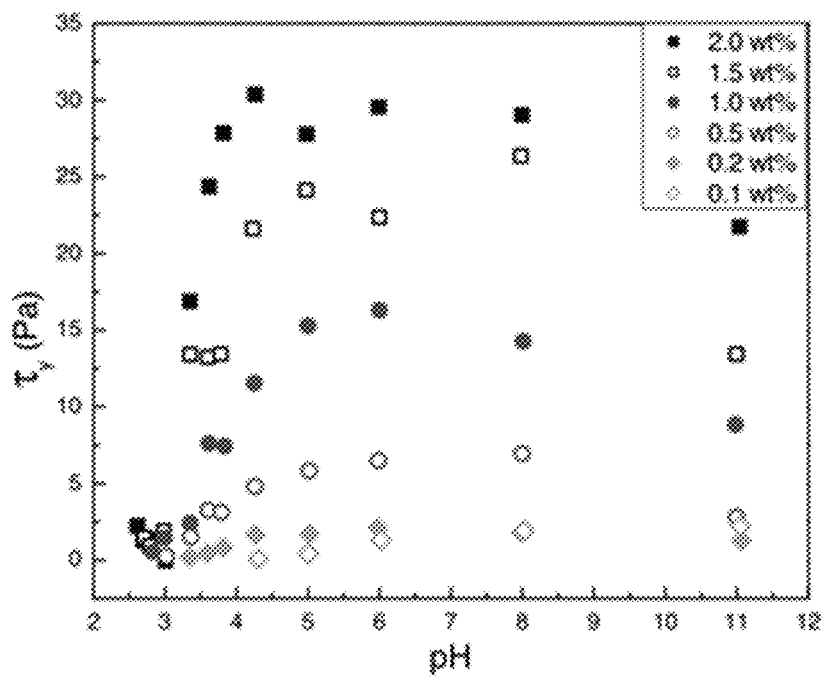
FIG. 2.1
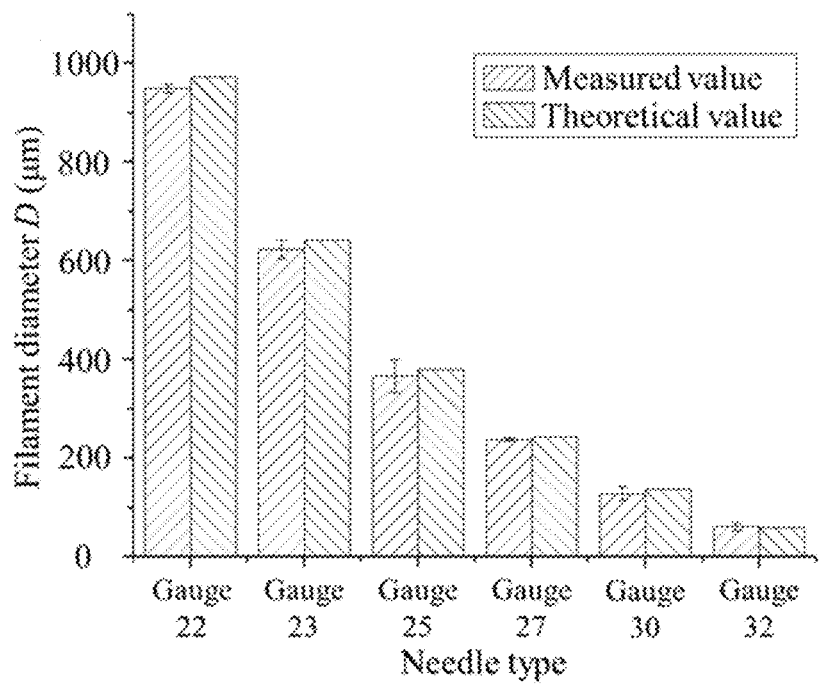
FIG. 2.2A

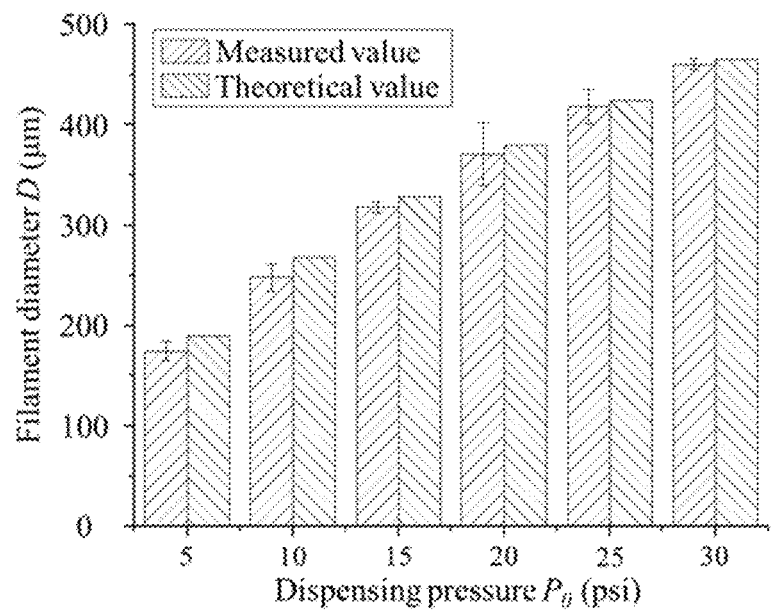
FIG. 2.2B
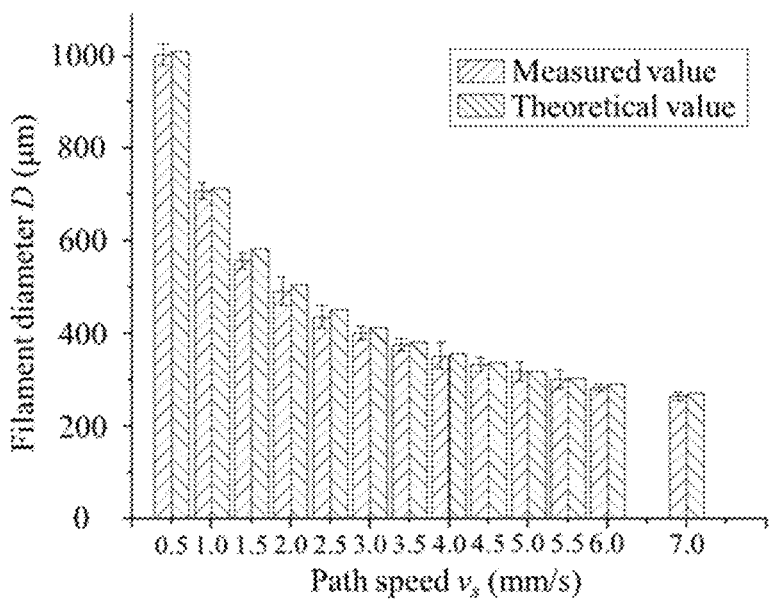
FIG. 2.2C

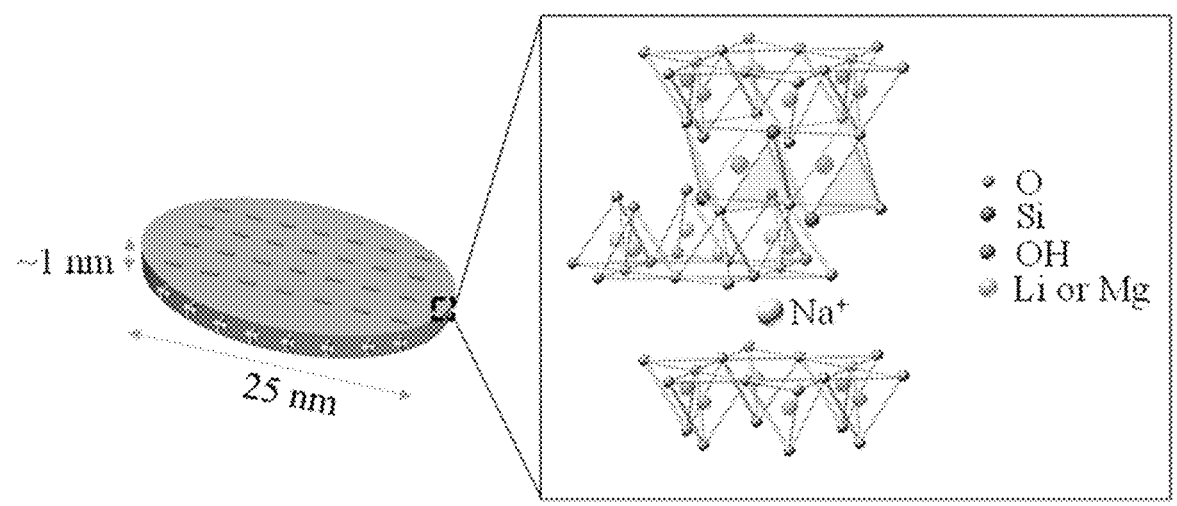
FIG. 3.1A
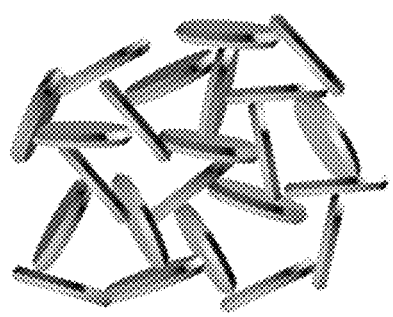
Gel formation:
House-of-cards
structure
FIG. 3.1B

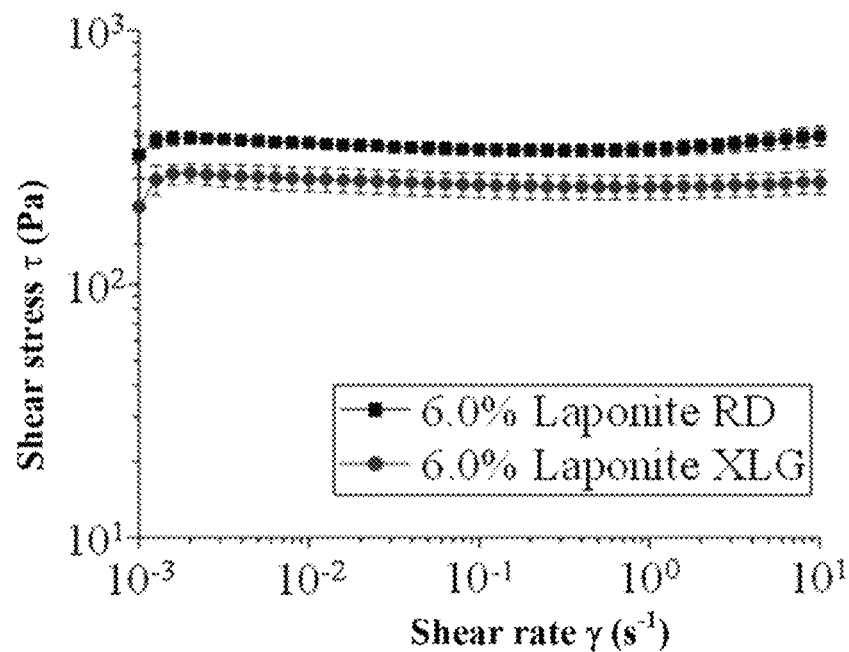
FIG. 3.1C
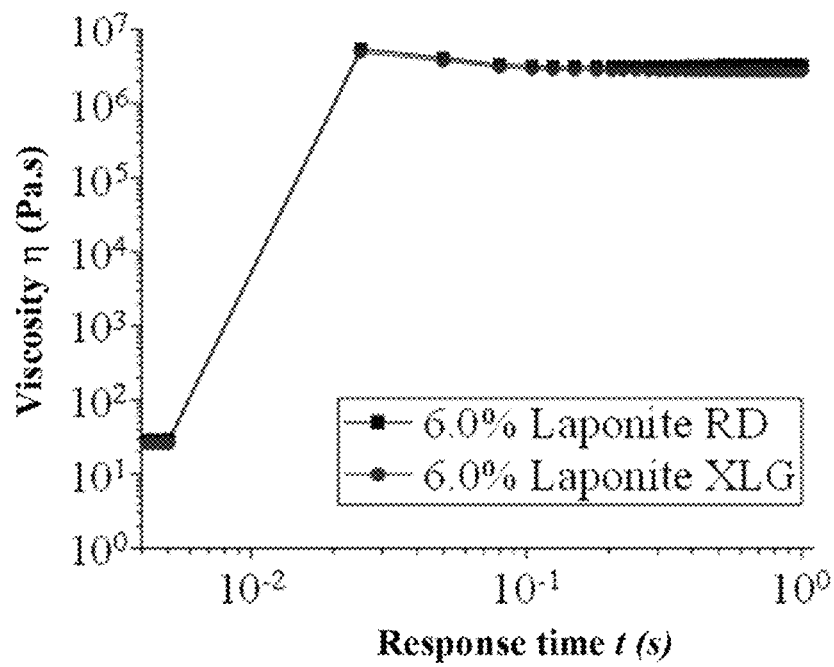
FIG. 3.1D

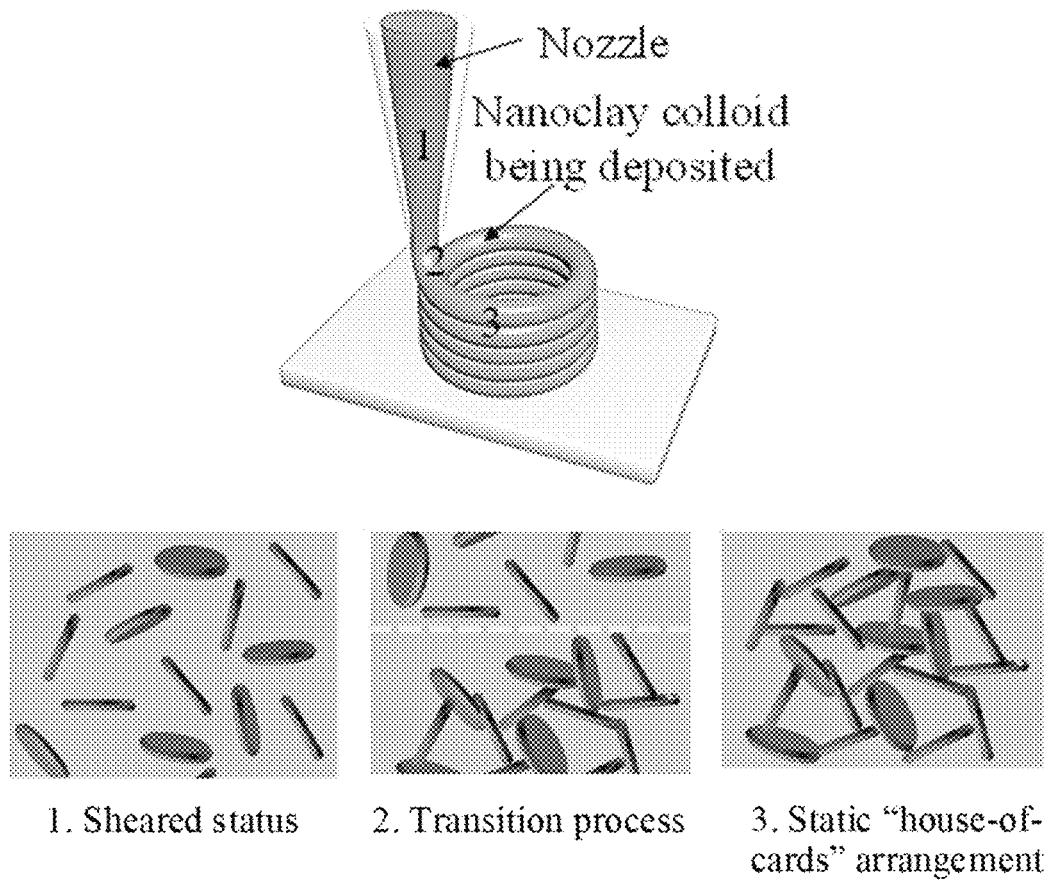
FIG. 3.1E
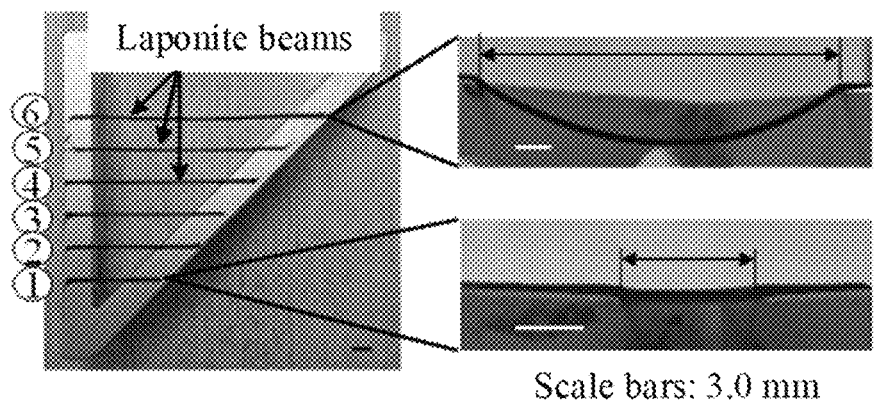
FIG. 3.2A

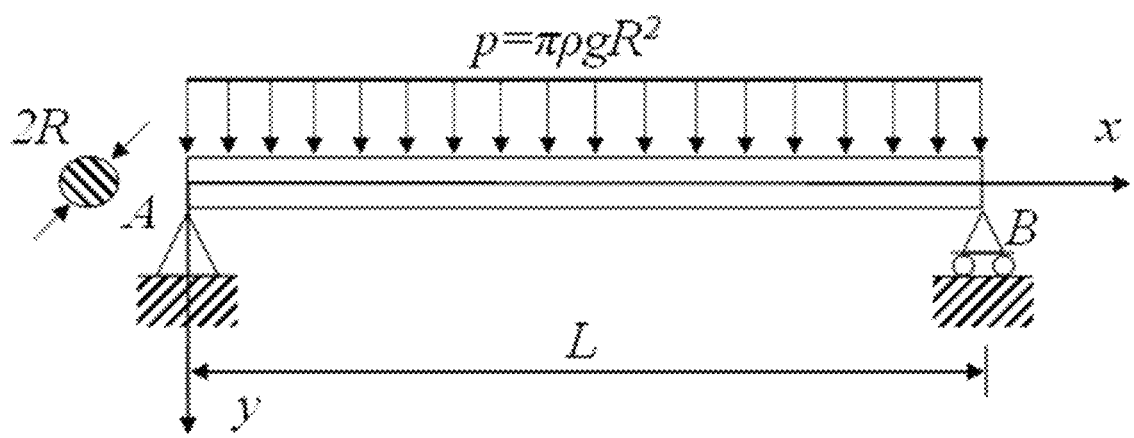
FIG. 3.2B
FIG. 3.2C
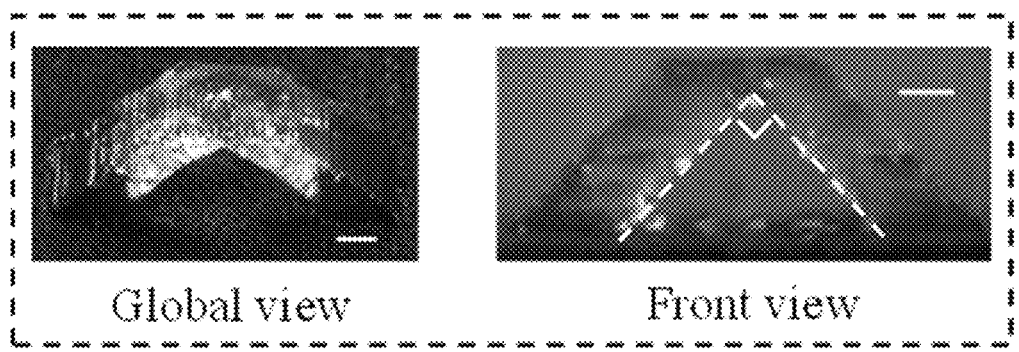
FIG. 3.2D

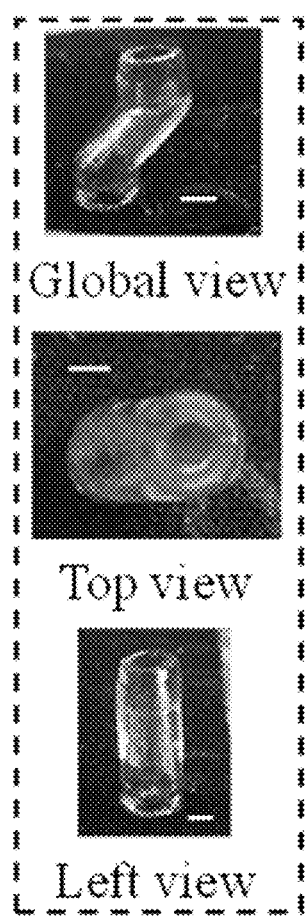
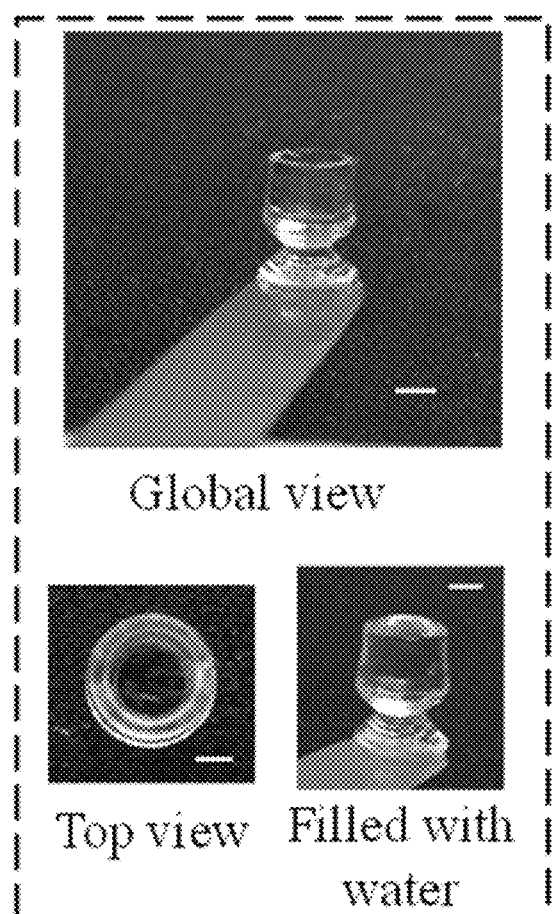
FIG. 3.2E
FIG. 3.2F

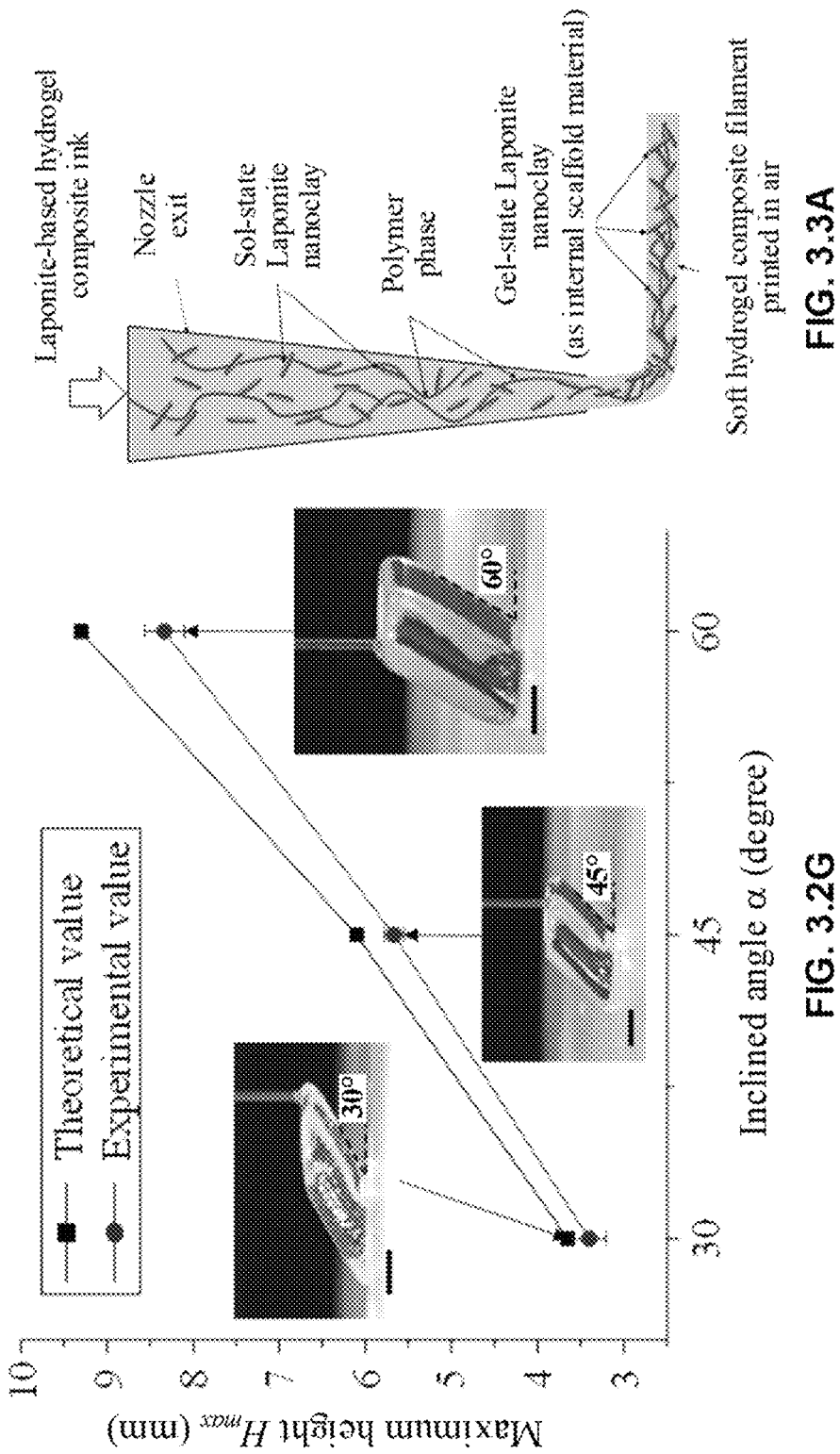
FIG. 3.3A
FIG. 3.2G

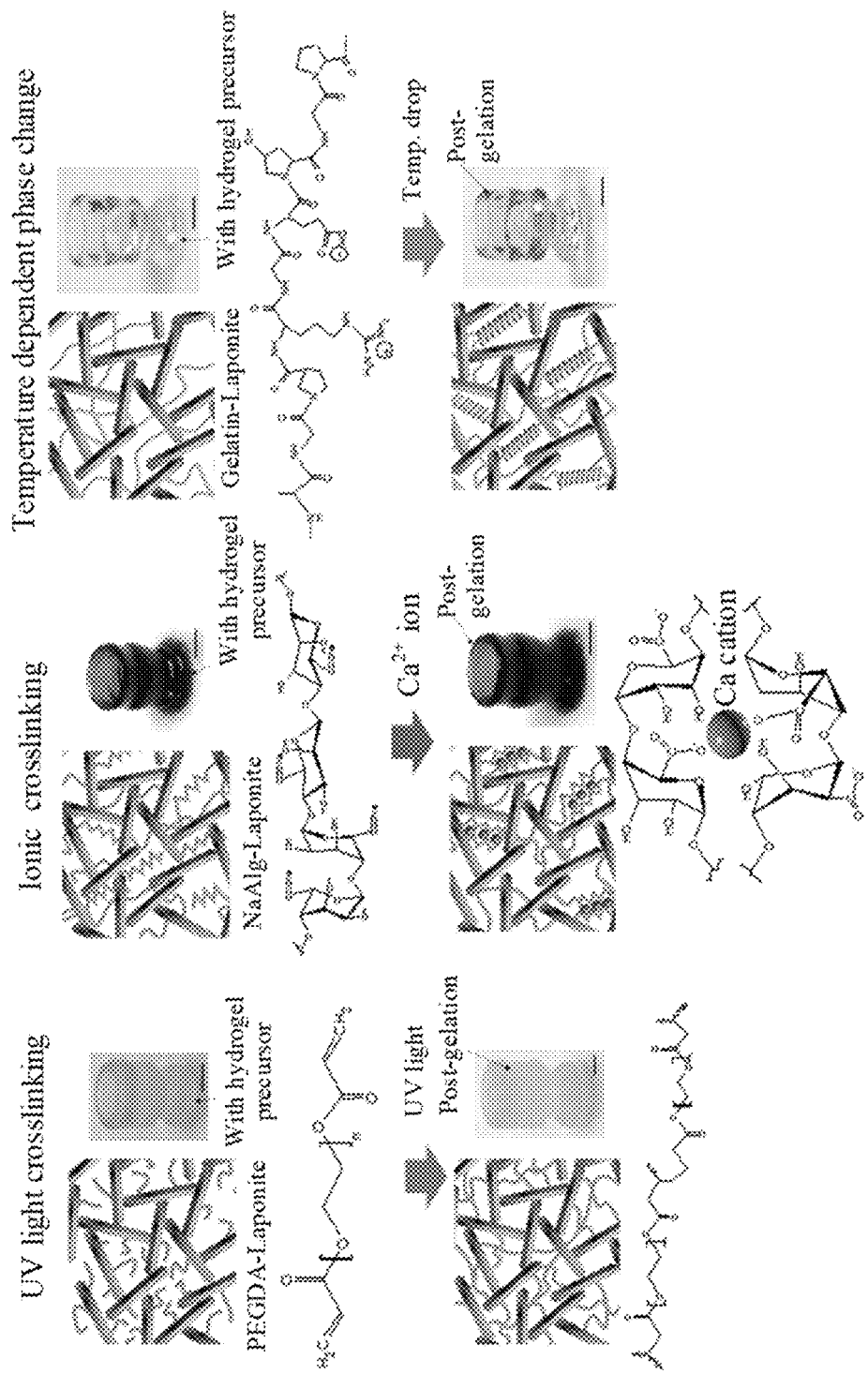
FIG. 3.3B  FIG. 3.3C  FIG. 3.3D

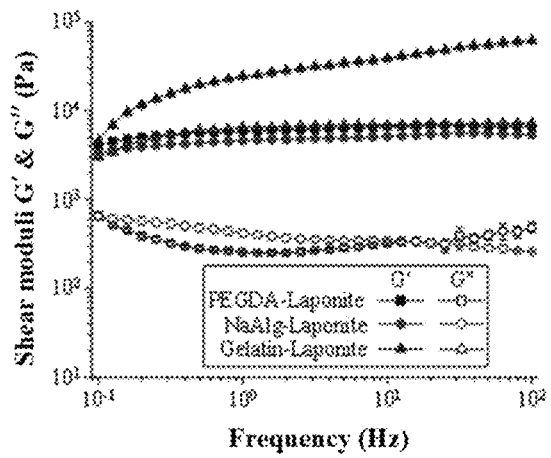
FIG. 3.3E
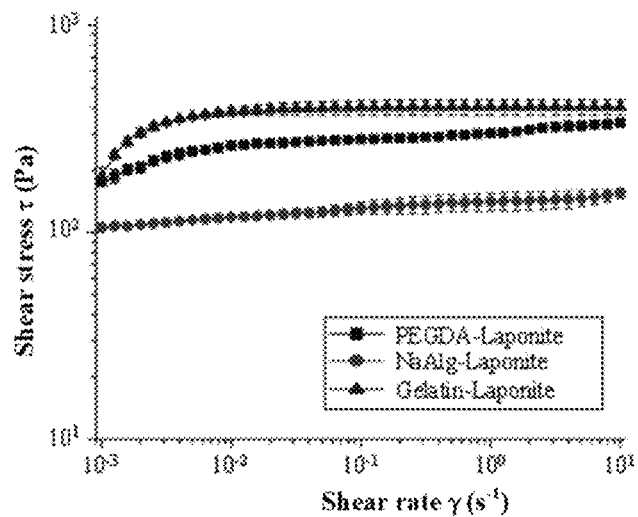
FIG. 3.3F
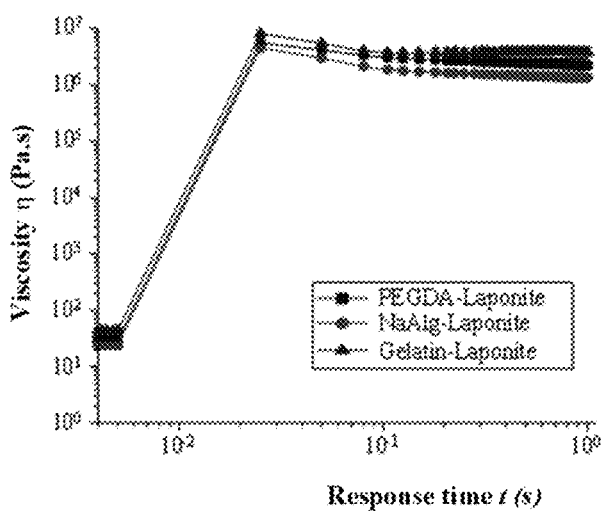
FIG. 3.3G

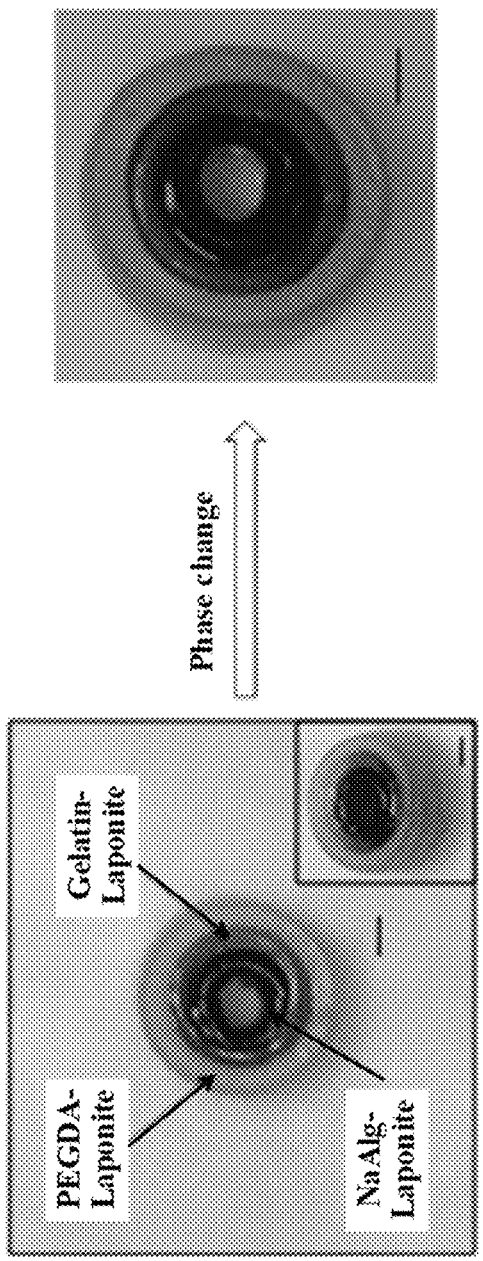
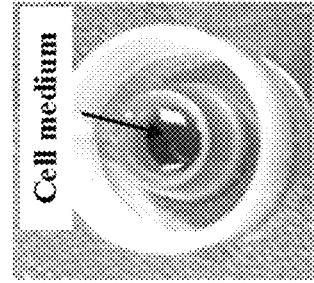
FIG. 3.3H
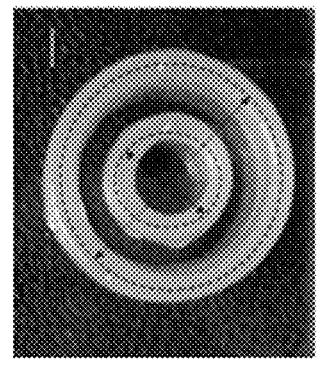
FIG. 3.3I
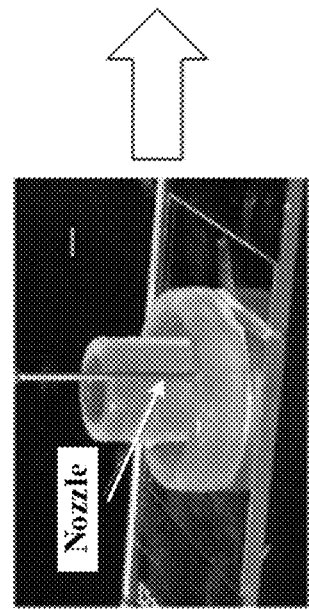

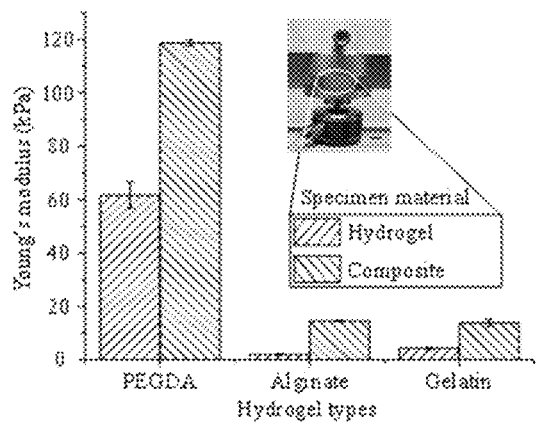
FIG. 3.4A
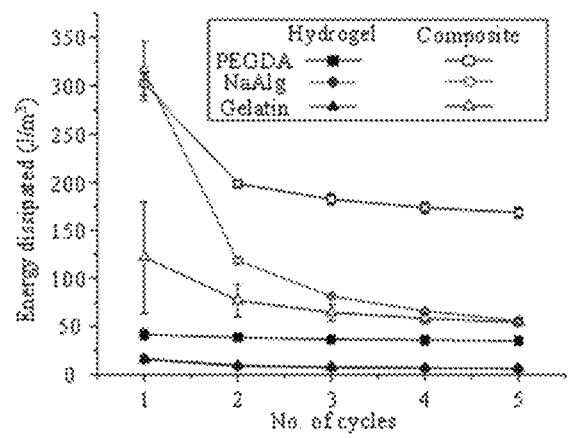
FIG. 3.4B
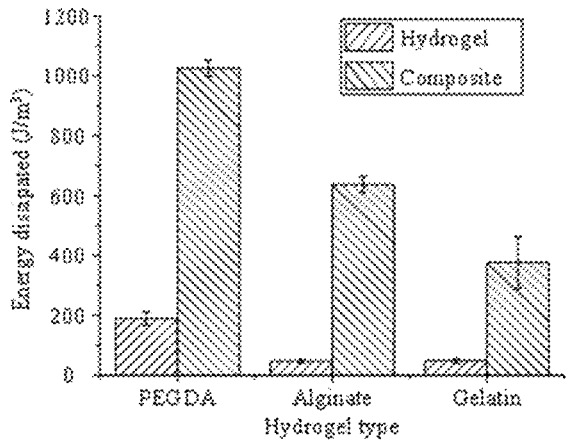
FIG. 3.4C

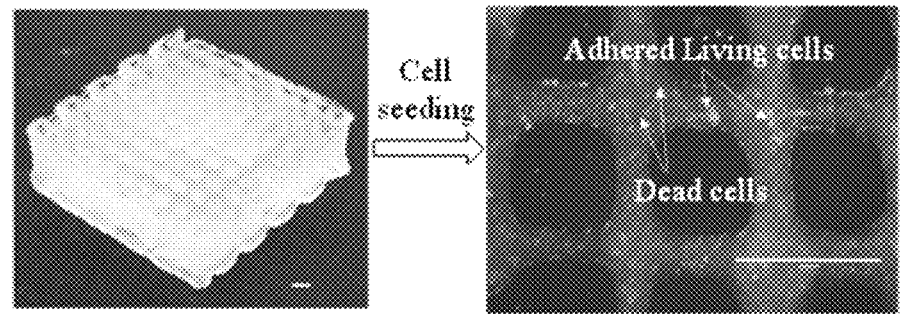
FIG. 3.5A
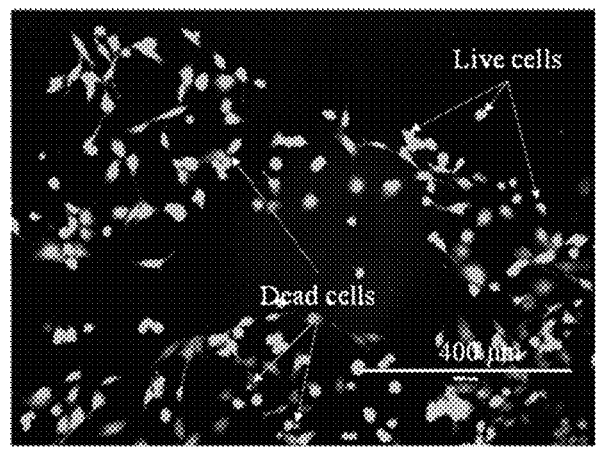
FIG. 3.5B
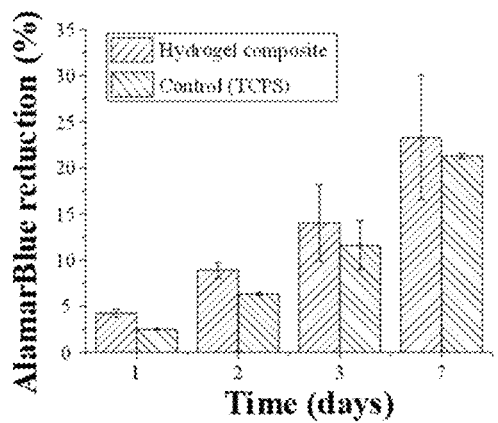
FIG. 3.5C
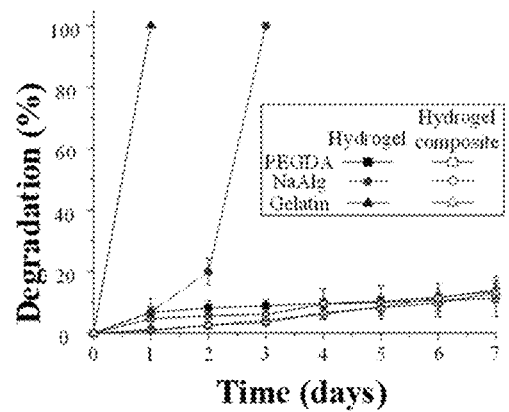
FIG. 3.5D

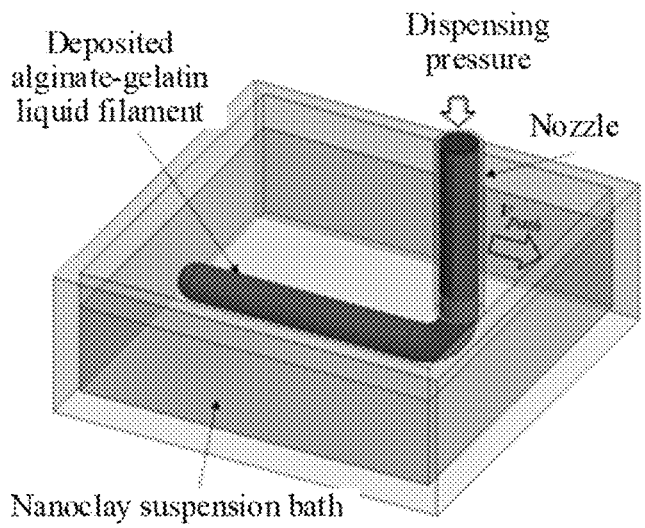
FIG. 4.1
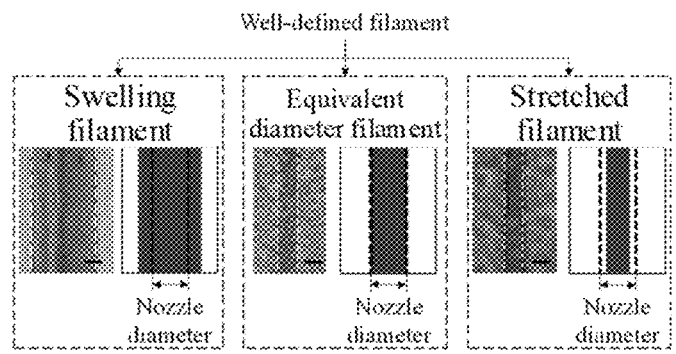
FIG. 4.2A
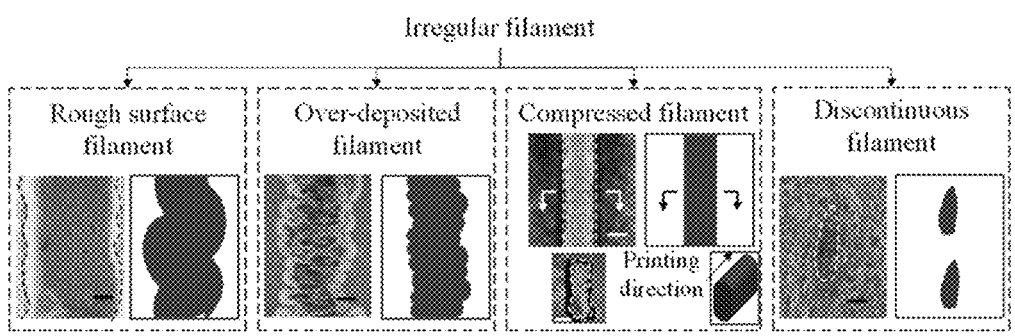
FIG. 4.2B

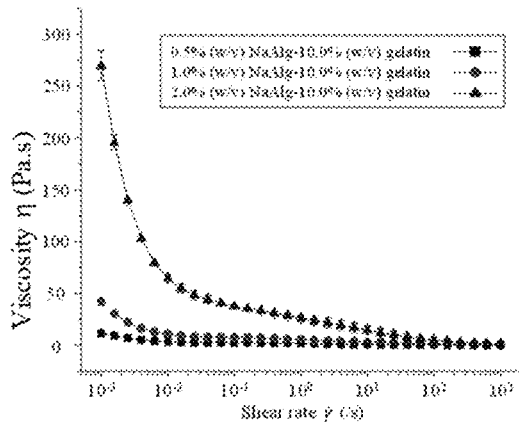
FIG. 4.3A
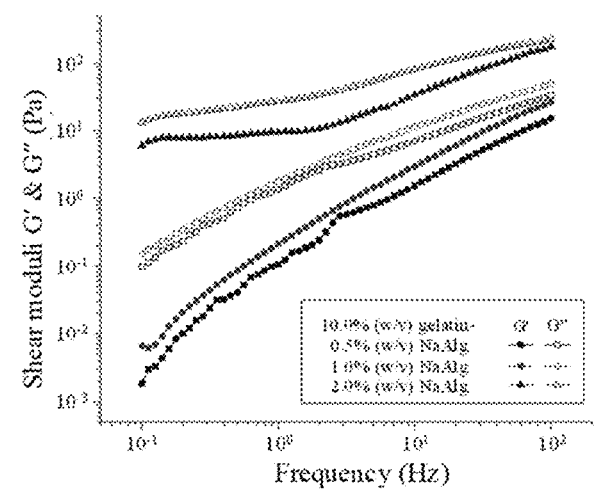
FIG. 4.3B
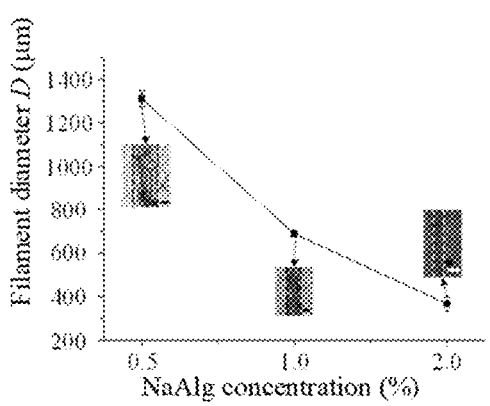
FIG. 4.4A
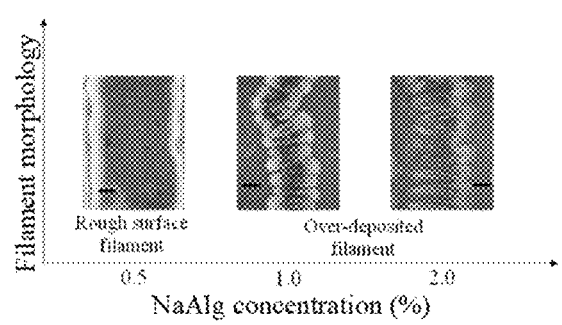
FIG. 4.4B

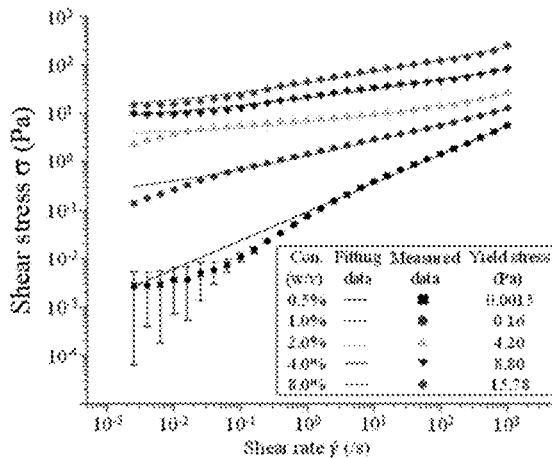
FIG. 4.5A
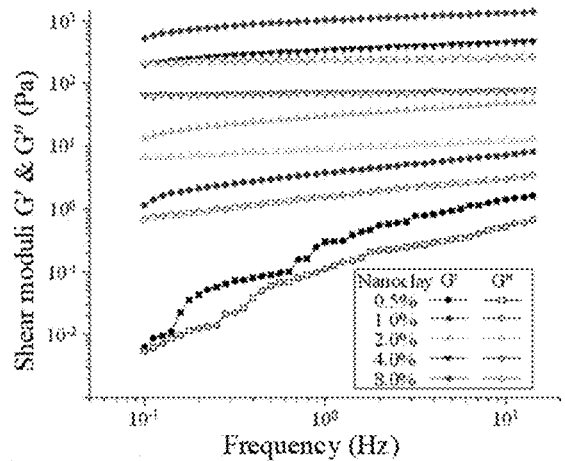
FIG. 4.5B
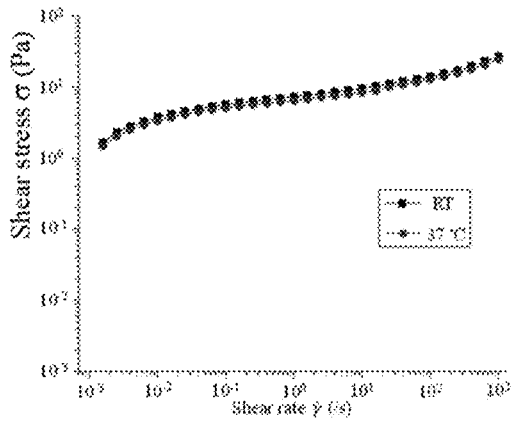
FIG. 4.5C
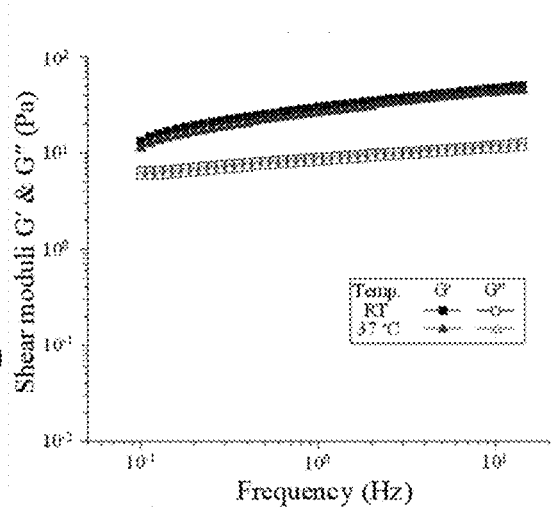
FIG. 4.5D

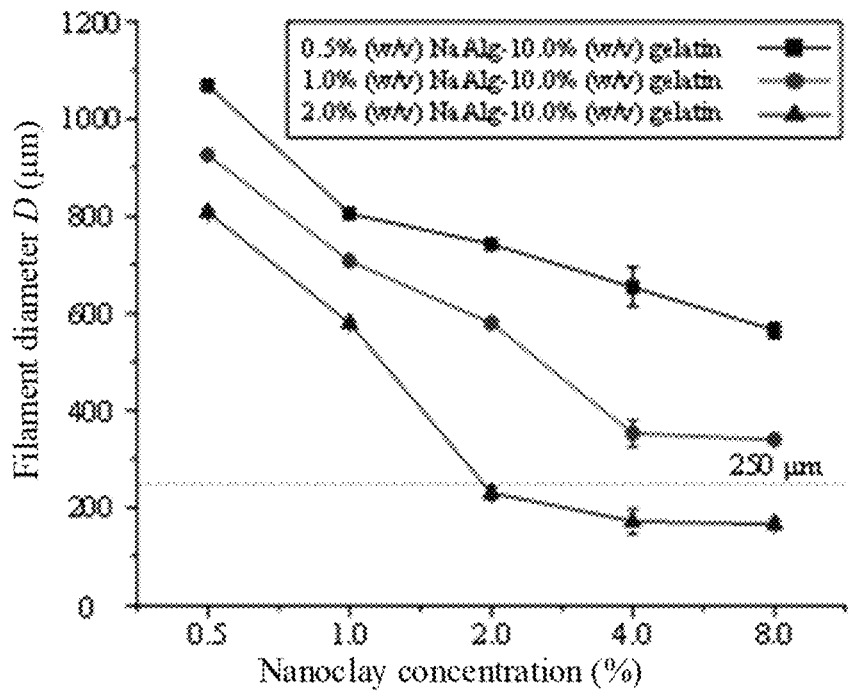
FIG. 4.6A
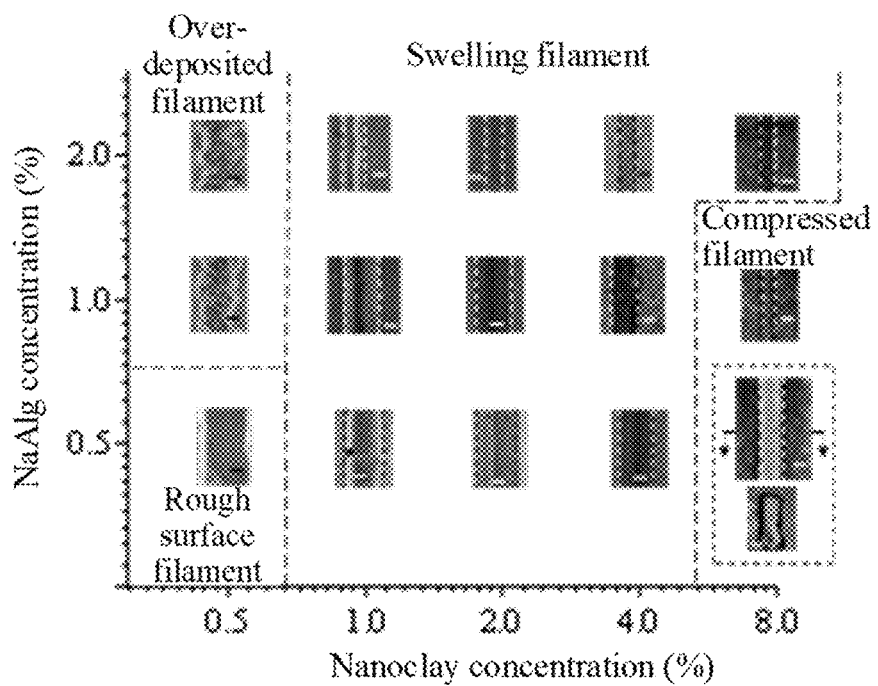
FIG. 4.6B

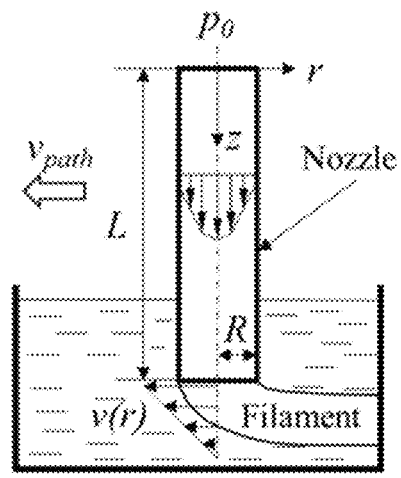
FIG. 4.7
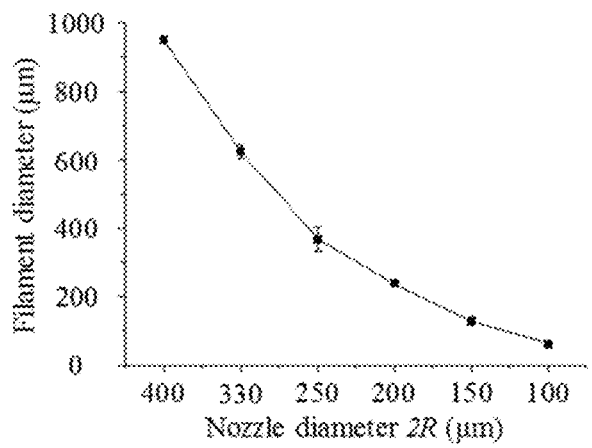
FIG. 4.8A
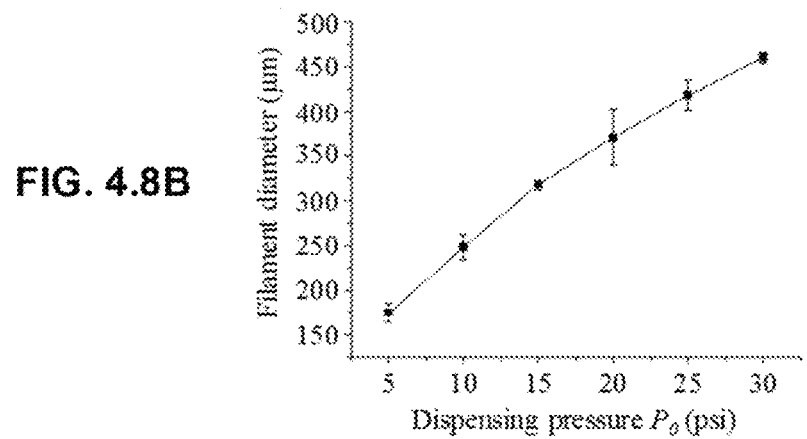
FIG. 4.8B

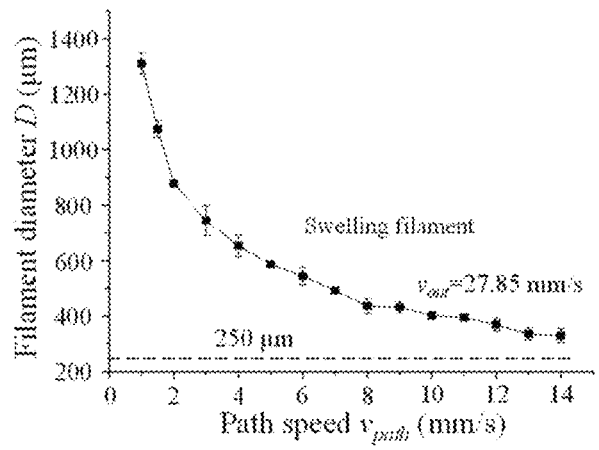
FIG. 4.9A
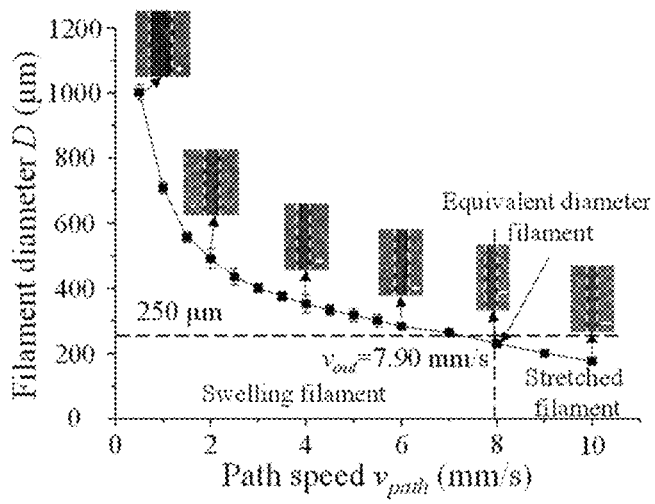
FIG. 4.9B
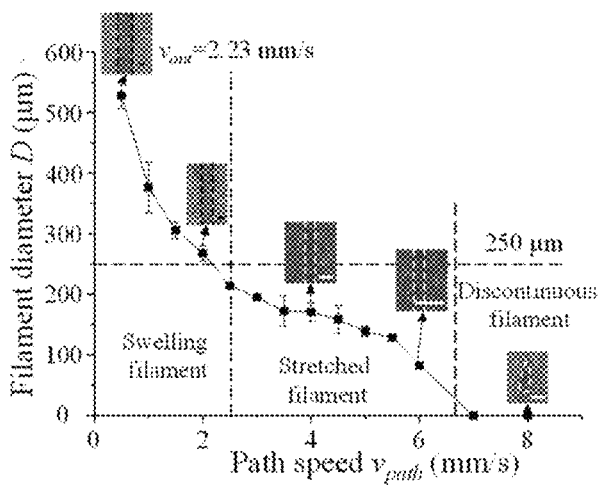
FIG. 4.9C

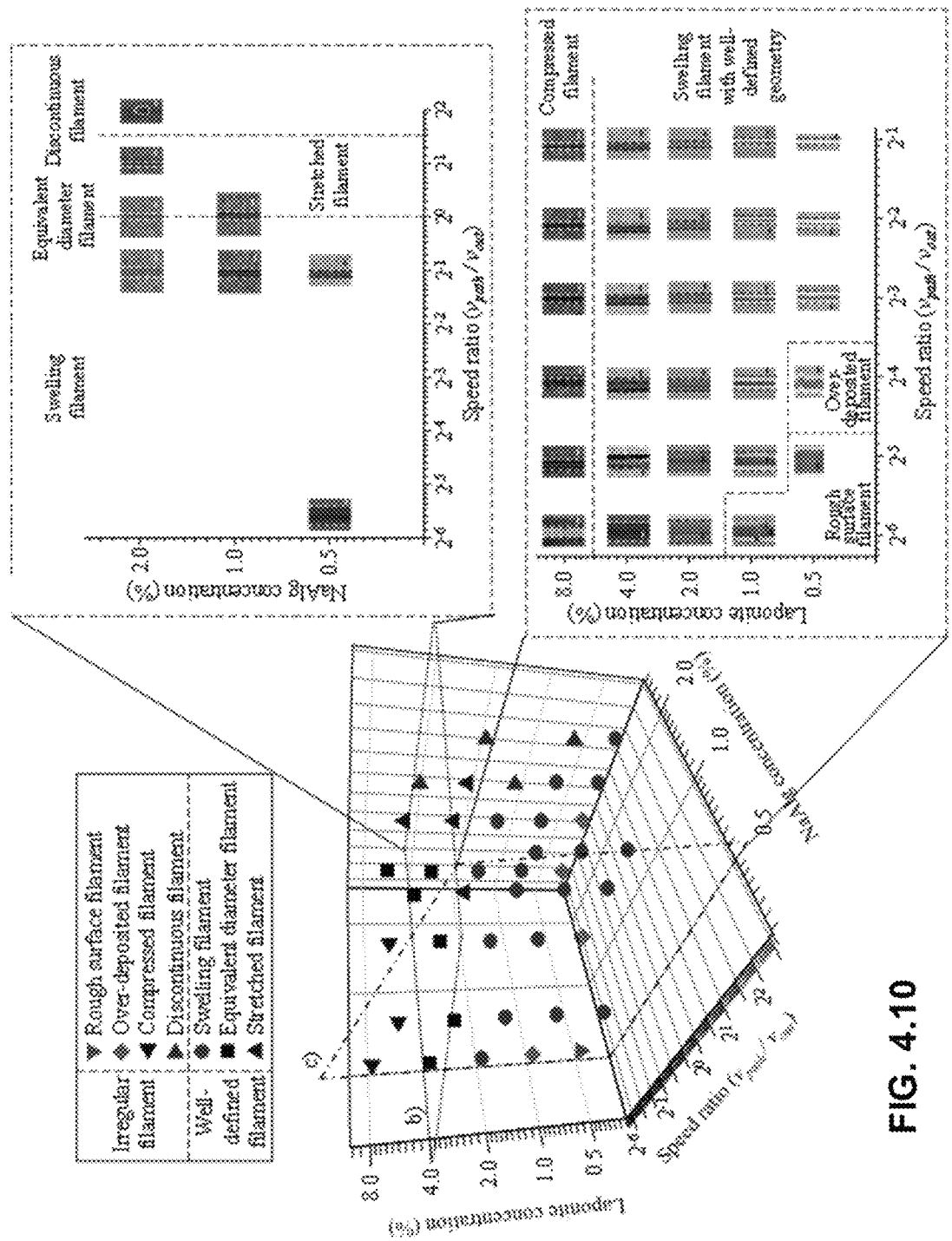
FIG. 4.10

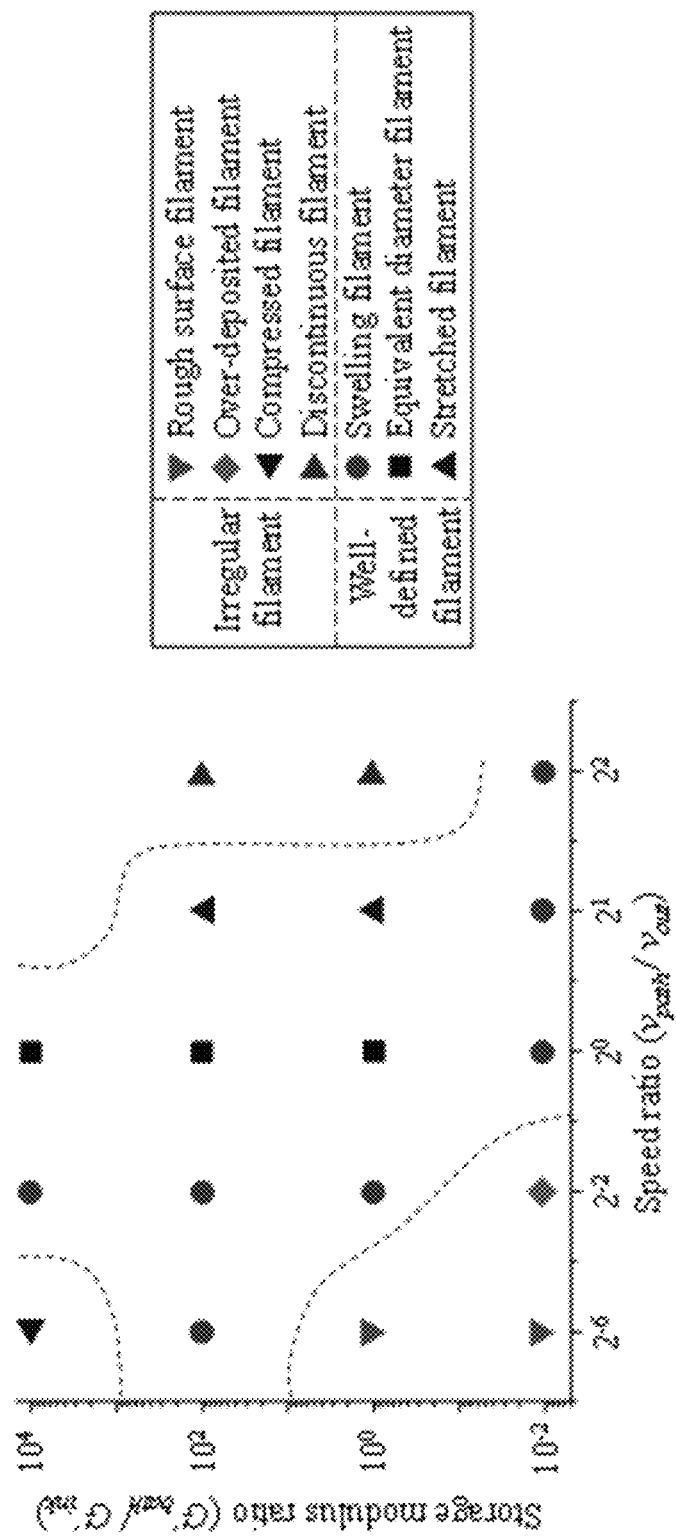
FIG. 4.11

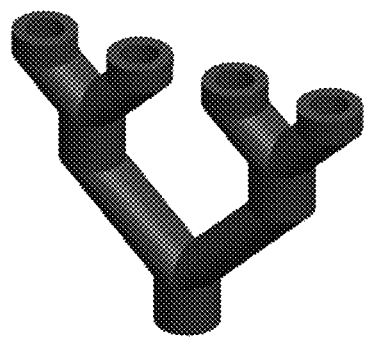 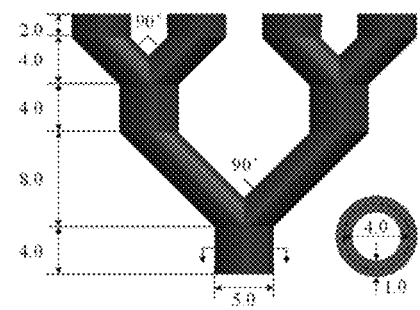
FIG. 4.12A    FIG. 4.12B
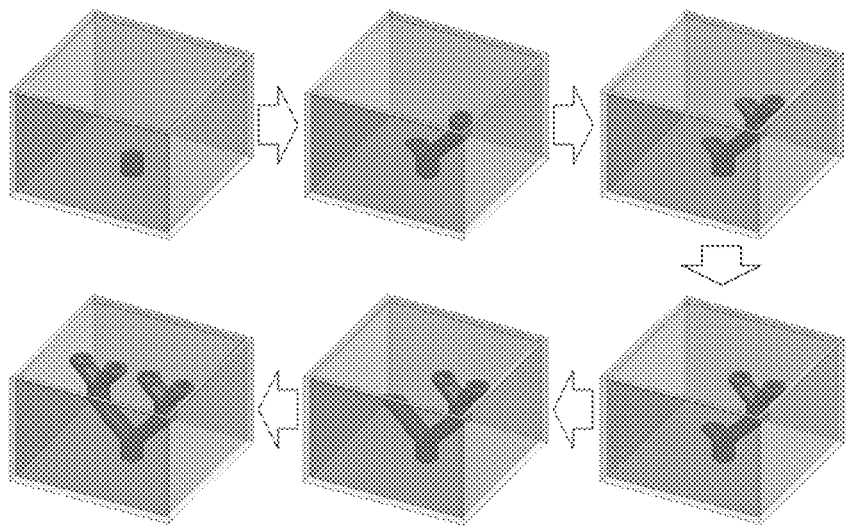
FIG. 4.12C
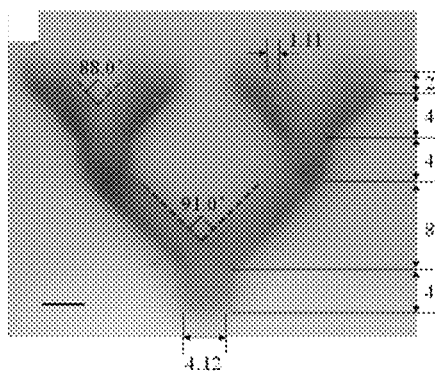 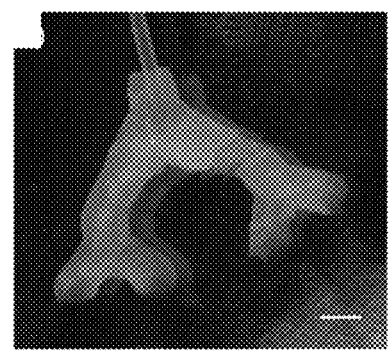
FIG. 4.12D    FIG. 4.12E

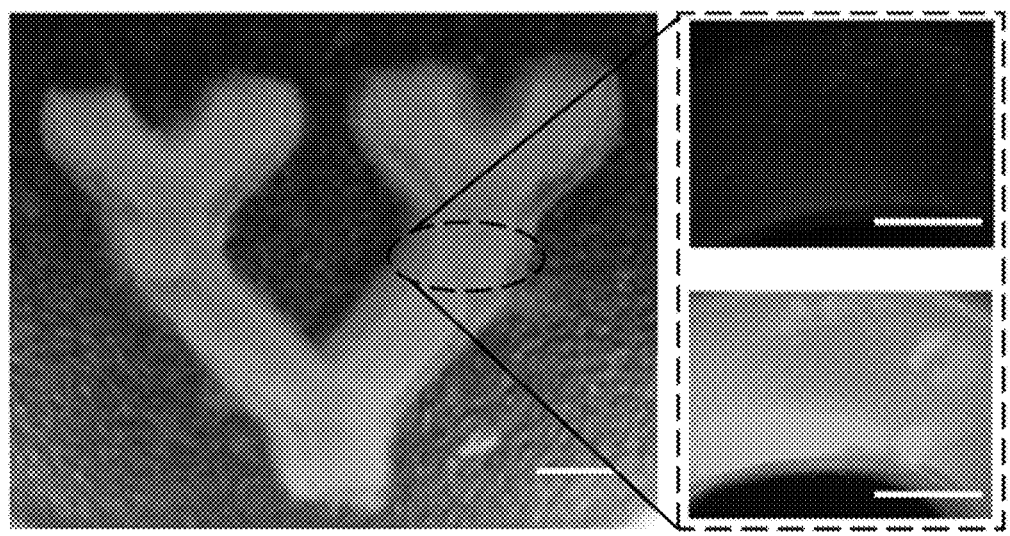
FIG. 4.13A
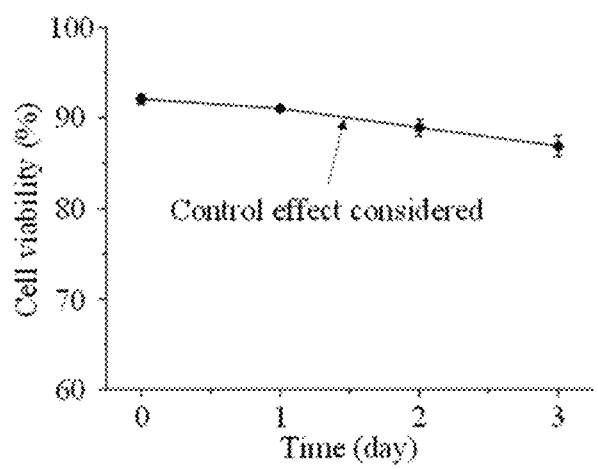
FIG. 4.13B
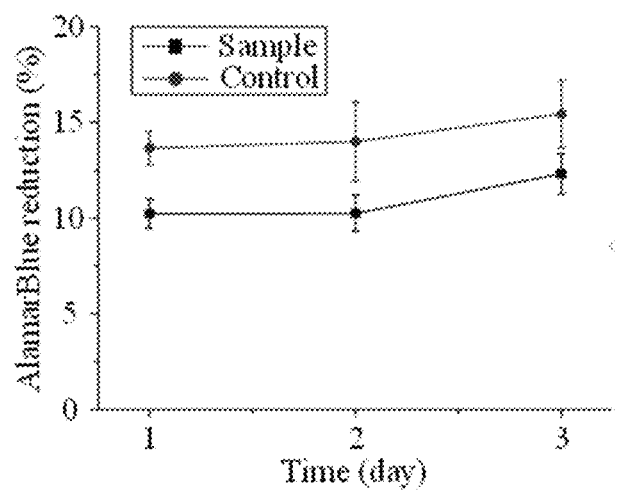
FIG. 4.13C

METHODS AND SYSTEMS OF THREE DIMENSIONAL PRINTING

CROSS REFERENCE TO RELATED APPLICATIONS

This application is a divisional of U.S. Non-Provisional patent application Ser. No. 16/334,202, filed Mar. 18, 2019 and entitled "Systems and Methods of Three Dimensional Printing," which is a 35 U.S.C. § 371 National Stage Application of International Patent Application Serial No. PCT/US2017/052020, filed Sep. 18, 2017, which claims priority to, and the benefit of, U.S. Provisional Application Ser. No. 62/396,258, filed Sep. 19, 2016 and also claims priority to, and the benefit of, U.S. Provisional Application Ser. No. 62/414,881, filed Oct. 31, 2016, the entire disclosures of each of which are hereby incorporated herein by reference in their entireties.

BACKGROUND 3D printing enables the freeform fabrication of complex structures from various build materials and provides an effective and efficient way to produce low-volume, customized products with complicated geometries and advanced material properties and functions. Material extrusion is the most widely used form of 3D printing due to its easy implementation, high efficiency, and the wide range of extrudable materials; fused deposition modeling (FDM) is one of its popular implementations. However, several complications still limit the wide use of this traditional approach.

SUMMARY

Embodiments of the present disclosure provide for methods three dimensional printing, methods of three dimensional printing, and the like.

One aspect of the disclosure, among others, encompasses a three dimensional printing system, comprising: a support bath including a support material, wherein the support material has a gel-like state when a stress applied to the support material is less than a yield stress, wherein the support material has a free-flow state when the stress applied to the support material is above the yield stress, wherein when the stress applied to the support material changes from above the yield stress to below the yield stress, the support material returns to the gel-like state; and a printing device for delivering a plurality of discrete volumes of a liquid to the support bath, wherein each discrete volume of liquid can be delivered to a specified voxel, where each specified voxel corresponding to a discrete volume of liquid can be in a different location, wherein as each discrete volume of liquid can be delivered in the support bath, the support material supports the discrete volume of liquid, wherein the plurality of discrete volumes of liquid build material form a liquid three dimensional structure, wherein prior to delivering the plurality of discrete volumes of the liquid build material to each specified voxel, the support material in each specified voxel can be in the gel-like state, wherein as the printing devices moves to each specified voxel the printing produces stress applied to the support material in that specified voxel that is above the yield stress so that upon printing each discrete volume of the liquid build material in each specified voxel the support material in each specified voxel converts into the free-flow state, wherein the support material flows out of each specified voxel as the discrete volume of the liquid build material can be printed to each specified voxel, wherein after each discrete volume of the liquid build material can be printed to each specified voxel, the support material in the free-flow state transforms back to the gel-like state to support the discrete volume of the liquid build material once the stress applied to the support material is below the yield stress. In various aspects, the support material can be a smectite material. In an aspect, the smectite material can be selected from the group consisting of: montmorillonite (MMT), nontronite, Saponite, hectorite, and a combination thereof. In an aspect, the support material can be Laponite EP®, Laponite RD®, Laponite XLG®, Laponite XL21®, Laponite D®, or a combination thereof.

Another aspect of the disclosure, among others, encompasses a method to form a three dimensional structure, comprising: a) providing a support bath including a support material, wherein the support material has a gel-like state when a stress applied to the support material is less than a yield stress, wherein the support material has a free-flow state when the stress applied to the support material is above the yield stress, wherein as the stress applied to the support material changes from above the yield stress to below the yield stress, the support material returns to the gel-like state; b) printing a first liquid in a first voxel, wherein prior to printing the first liquid in the first voxel, the support material in the first voxel is in the gel-like state, wherein the printing produces stress applied to the support material that is above the yield stress so that upon printing the first liquid in the first voxel the support material in the first voxel converts into the free-flow state, wherein the support material flows out of the first voxel as the first liquid is printed, wherein the support material in the free-flow state transforms back to the gel-like state to support the first liquid in the first voxel when the stress applied is below the yield stress; c) repeating step b) for a plurality of voxels, wherein the liquid in the plurality of voxels is part of a liquid three dimensional structure; and d) causing a phase change in the liquid three dimensional structure to form the three dimensional structure, which can be removed from the support material. In various aspects, the support material can be a smectite material. In an aspect, the smectite material can be selected from the group consisting of: montmorillonite (MMT), nontronite, Saponite, hectorite, and a combination thereof. In an aspect, the support material can be Laponite EP®, Laponite RD®, Laponite XLG®, Laponite XL21®, Laponite D®, or a combination thereof.

Another aspect of the disclosure, among others, encompasses a three dimensional printing system, comprising: a precursor build material comprising a hydrogel precursor and a support material, wherein the precursor build material has a gel-like state when a stress applied to the precursor build material is less than a yield stress, wherein the precursor build material has a free-flow state when the stress applied to the precursor build material is above the yield stress, wherein when the stress applied to the precursor build material changes from above the yield stress to below the yield stress, the precursor build material returns to the gel-like state; and a printing device for delivering a plurality of discrete volumes of the precursor build material, wherein each discrete volume of precursor build material is delivered to a specified voxel, where each specified voxel corresponding to a discrete volume of precursor build material in a different location, wherein after each discrete volume of precursor build material is delivered, the precursor build material is self-supporting, wherein the plurality of discrete volumes of precursor build material form a precursor build material three dimensional structure, wherein prior to delivering the plurality of discrete volumes of the precursor build material to each specified voxel, the precursor build material is in the gel-like state, wherein as the printing device delivers the precursor build material to each specified voxel the printing produces stress applied to the precursor build material that is above the yield stress so that upon printing each discrete volume the precursor build material converts into the free-flow state, wherein after each discrete volume of the precursor build material is printed to each specified voxel, the precursor build material in the free-flow state transforms back to the gel-like state and is self-supporting, wherein the three dimensional printing system does not include a support bath. In various aspects, the support material can be a smectite material. In an aspect, the smectite material can be selected from the group consisting of: montmorillonite (MMT), nontronite, Saponite, hectorite, and a combination thereof. In an aspect, the support material can be Laponite RD®, Laponite XLG®, or a combination thereof. In various aspects, the hydrogel precursor is selected from the group consisting of: alginate, gelation, chitosan, collagen, Matrigel, poly (ethylene glycol), polyvinyl alcohol, Pluronic, and a combination thereof.

Another aspect of the disclosure, among others, encompasses a method to form a three dimensional structure, comprising: a) providing a precursor build material comprising a hydrogel precursor and a support material, wherein the precursor build material has a gel-like state when a stress applied to the precursor build material is less than a yield stress, wherein the precursor build material has a free-flow state when the stress applied to the precursor build material is above the yield stress, wherein when the stress applied to the precursor build material changes from above the yield stress to below the yield stress, the precursor build material returns to the gel-like state; b) printing the first precursor build material in a first voxel without a support bath, wherein prior to printing the first precursor build material in the first voxel, the first precursor build material is in the gel-like state, wherein the printing produces stress applied to the first precursor build material that is above the yield stress so that upon printing the first precursor build material in the first voxel the first precursor build material converts into the free-flow state, wherein the first precursor build material flows into the first voxel as the first precursor build material is printed, wherein the first precursor build material in the free-flow state transforms back to the gel-like state when the stress applied is below the yield stress; c) repeating step b) for a plurality of voxels, wherein the first precursor build material in the plurality of voxels is part of a precursor build material three dimensional structure; and d) causing a phase change in the precursor build material three dimensional structure to form the three dimensional structure. In various aspects, the support material can be a smectite material. In an aspect, the smectite material can be selected from the group consisting of: montmorillonite (MMT), nontronite, Saponite, hectorite, and a combination thereof. In an aspect, the support material can be Laponite RD®, Laponite XLG®, or a combination thereof. In various aspects, the hydrogel precursor is selected from the group consisting of: alginate, gelation, chitosan, collagen, Matrigel, poly (ethylene glycol), polyvinyl alcohol, Pluronic, and a combination thereof.

Another aspect of the disclosure, among others, encompasses a composition comprising: a precursor build material comprising a hydrogel precursor and a support material, wherein the precursor build material has a gel-like state when a stress applied to the precursor build material is less than a yield stress, wherein the precursor build material has a free-flow state when the stress applied to the precursor build material is above the yield stress, wherein when the stress applied to the precursor build material changes from above the yield stress to below the yield stress, the precursor build material returns to the gel-like state. In various aspects, the support material can be a smectite material. In an aspect, the smectite material can be selected from the group consisting of: montmorillonite (MMT), nontronite, Saponite, hectorite, and a combination thereof. In an aspect, the support material can be Laponite RD®, Laponite XLG®, or a combination thereof. In various aspects, the hydrogel precursor can be selected from the group consisting of: alginate, gelation, chitosan, collagen, Matrigel, poly (ethylene glycol), polyvinyl alcohol, Pluronic, and a combination thereof.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 1.1A illustrates examples of shear stress as a function of shear rate of Laponite and alginate (NaAlg) according to various examples described herein.

FIG. 1.1B illustrates an example schematic of the Laponite bath response to the moving nozzle according to various examples described herein.

FIG. 1.1C illustrates an example of a velocity field due to the relative movement between the Laponite bath and nozzle (top) and the average flow speed along the relative movement direction (bottom) according to various examples described herein.

FIG. 1.1D illustrates an example of thixotropic length scale as a function of nozzle outer diameter according to various examples described herein.

FIG. 1.1E illustrates an example of thixotropic length scale as a function of nozzle path speed according to various examples described herein.

FIG. 1.2 illustrates an example schematic of extrusion printing in a nanoclay bath of colloidal Laponite according to various examples described herein.

FIG. 1.3A illustrates an example of alginate structure printing with an alginate structure printed and then ionically crosslinked in a Laponite EP-CaCl$_2$ bath according to various examples described herein.

FIG. 1.3B illustrates an example morphology of an alginate filament printed in a Laponite EP bath and a magnified view (inset) according to various examples described herein.

FIG. 1.3C illustrates an example of alginate structure printing with layer-by-layer printing procedure for Y-shaped tubular structures according to various examples described herein.

FIG. 1.3D illustrates an example of a Y-shaped tubular alginate structure as printed in the Laponite EP-CaCl$_2$ bath (left) and crosslinked Y-shaped tubular alginate structure (right) according to various examples described herein.

FIG. 1.3E illustrates an example of an alginate bone structure (humerus) as printed (left) in the Laponite EP-CaCl$_2$bath and crosslinked alginate bone structure (right) according to various examples described herein.

FIG. 1.4A illustrates an example of a gelatin structure printed and then thermally crosslinked in a Laponite EP bath according to various examples described herein.

FIG. 1.4B illustrates an example morphology of a gelatin filament printed in the Laponite EP bath and a magnified view (inset) according to various examples described herein.

FIG. 1.4C illustrates an example of a brain model as designed (left), thermally gelled brain structure in the Laponite EP bath (center, left) and top (center, right) and side (right) views of thermally gelled brain structure after Laponite rinsing according to various examples described herein.

FIG. 1.4D illustrates an example of a printed microvascular network in the Laponite bath (left) and microvascular network model (inset) and crosslinked fibroblast-based gelatin-alginate construct (right) according to various examples described herein.

FIG. 1.4E illustrates an example of post-printing cell viability information according to various examples described herein.

FIG. 1.4F illustrates an example of cell adhesion and proliferation after three-day incubation according to various examples described herein.

FIG. 1.4G illustrates an example of metabolic activity of cells during three-day incubation according to various examples described herein.

FIG. 1.4H illustrates an example of a printing procedure of microvascular network by proposed "localized layer-by-layer" approach according to various examples described herein.

FIGS. 1.5A-D illustrate examples of SU-8 printing according to various examples described herein.

FIG. 2.1 illustrates an example of yield stress as a function of pH for different Carbopol concentrations according to various examples described herein.

FIGS. 2.2A-C illustrate examples of the effects of printing conditions on the filament diameter according to various examples described herein.

FIG. 3.1A illustrates an example of a single Laponite platelet and its idealized structural formula according to various examples described herein.

FIG. 3.1B illustrates an example of a Laponite gel formation: "house-of-cards" arrangement according to various examples described herein.

FIG. 3.1C illustrates an example of yield stress of nanoclay colloidal suspensions using steady rate sweep testing according to various examples described herein.

FIG. 3.1D illustrates an example of a thixotropic response time of nanoclay colloidal suspensions using transient step shear rate testing according to various examples described herein.

FIG. 3.1E illustrates examples of schematics of nanoclay-enabled printing approach according to various examples described herein.

FIGS. 3.2A-G illustrate examples of complex structure fabrication using the Laponite nanoclay-enabled extrusion printing approach according to various examples described herein.

FIGS. 3.3A-D illustrate example schematics of interactions between and pre- and post-gelation hydrogel composite cups of PEGDA and Laponite, NaAlg and Laponite, and gelatin and Laponite according to various examples described herein.

FIGS. 3.3E-G illustrate example rheology measurements of three composite hydrogel precursor colloids: shear moduli as a function of frequency, shear stress as a function of shear rate, and viscosity as a function of thixotropic response time according to various examples described herein.

FIG. 3.3H illustrates an example of Laponite-based triple-walled heterogeneous hydrogel composite structure according to various examples described herein.

FIG. 3.3I illustrates an example of a printed concentric cannular PEGDA-Laponite structure according to various examples described herein.

FIGS. 3.4A-C illustrate examples of effects of nanoclay on the mechanical stiffness and cell adhesion and proliferation according to various examples described herein.

FIG. 3.5A illustrates examples of cell adhesion and proliferation on the surface of 3D printed hydrogel composite scaffold according to various examples described herein.

FIG. 3.5B illustrates examples of cell adhesion and proliferation on the surface of hydrogel composite sheet with living cells and dead cells according to various examples described herein.

FIG. 3.5C illustrates an example of metabolic activity of seeded cells according to various examples described herein.

FIG. 3.5D illustrates an example of a degradation rate of hydrogels and hydrogel composites after 7-day incubation according to various examples described herein.

FIG. 4.1 illustrates an example schematic of filament deposition in a nanoclay bath according to various examples described herein.

FIGS. 4.2A and 4.2B illustrate representative images and schematics of seven types of filaments according to various examples described herein.

FIG. 4.3A illustrates an example of viscosity of alginate-gelatin blends with different concentrations as a function of shear rate according to various examples described herein.

FIG. 4.3B illustrates an example of shear moduli of alginate-gelatin blends with different concentrations as a function of frequency according to various examples described herein.

FIG. 4.4A illustrates an example of filament diameter as a function of alginate concentration in a 4.0% (w/v) nanoclay bath according to various examples described herein.

FIG. 4.4B illustrates an example of filament morphology of different alginate concentrations in a 0.5% (w/v) nanoclay bath according to various examples described herein.

FIGS. 4.5A-D illustrate examples of rheological property measurement of nanoclay suspensions with different concentrations according to various examples described herein.

FIG. 4.6A illustrates an example of filament diameter as a function of nanoclay concentration when extruding alginate-gelatin blends with different alginate concentrations according to various examples described herein.

FIG. 4.6B illustrates an example of filament morphology of extruded alginate-gelatin blends with different alginate concentrations in nanoclay baths with different concentrations according to various examples described herein.

FIG. 4.7 illustrates an example schematic of dispensing process in a nanoclay bath according to various examples described herein.

FIG. 4.8A illustrates example measurements of filament diameter as a function of nozzle diameter according to various examples described herein.

FIG. 4.8B illustrates example measurements of filament diameter as a function of dispensing pressure according to various examples described herein.

FIGS. 4.9A-C illustrate example effects of path speed on filament formation and representative images according to various examples described herein.

FIG. 4.10 illustrates an example of an overall phase diagram of filament formation (left), an example two dimensional phase diagram of filament formation in a 4.0% (w/v) nanoclay bath (right, top), and an example two dimensional phase diagram of filament formation phase diagram of printing 0.5% (w/v) alginate-10.0% (w/v) gelatin in nanoclay baths with different concentrations (right, bottom) according to various examples described herein.

FIG. 4.11 illustrates an example phase diagram based on the material-property dimensionless number and operating-condition dimensionless number according to various examples described herein.

FIGS. 4.12A-E illustrate cellular vascular construct printing according to various examples described herein.

FIG. 4.13A illustrates an example of a crosslinked fibroblast-based alginate-gelatin construct according to various examples described herein.

FIG. 4.13B illustrates an example of post-printing cell viability (with one +/−standard deviation error bars) according to various examples described herein.

FIG. 4.13C illustrates an example of metabolic activity of cells of printed vascular constructs during three-day incubation according to various examples described herein.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of chemistry, physics, fluid dynamics, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of chemistry, physics, fluid dynamics, and the like. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion:

Embodiments of the present disclosure provide for systems and methods for forming three dimensional structures. In an embodiment, the three dimensional structure can be a liquid three dimensional structure and in another embodiment, the three dimensional structure can be a precursor build material three dimensional structure, both of which can undergo a phase or state change to convert to the three dimensional structure.

Embodiments of the present disclosure are advantageous in that they overcome some of the problems associated with current methods of three dimensional printing where a support material is used. For example, other techniques require the use of additional components such as fluid fillers, additives to mitigate ionic sensitivity, and/or components that must be used in a reaction to cure the three dimensional structure. As a result, the types of build materials that can be used to form the three dimensional structure are limited since they can undergo a reaction or other deleterious interaction with the components used with the support material or solidification conditions can have a detrimental impact on the support material.

In contrast, an embodiment of the present disclosure can use a support material that does not negatively interact with a wide variety of build materials, shows good physical and chemical stability and provides excellent support for the build material as it is printed so that a phase change (e.g., curing) can occur after all of the build material is printed. As a result, complex three dimensional structures can be formed with a wide variety of build materials that otherwise cannot be accomplished using other techniques.

In another embodiment, a precursor build material including a hydrogel precursor and a support material can be used to print a precursor build material three dimensional structure that is self-supporting. As a result, a rapid solidification process is not needed. In addition, a support bath is not needed during the printing process of the precursor build material three dimensional structure to support the printed material.

Embodiments of the present disclosure can print three dimensional structures having a wide range of shapes and sizes. For example, three dimensional structures having regions that do not have direct support from the build material below might otherwise collapse, but the support material prevents the build material from collapsing. In addition, structures having hollow regions that are not supported by the build material can be printed and supported by the support material. In regard to the precursor build material three dimensional structure, as the precursor build material three dimensional structure is printed, each portion printed is self-supported in that no other materials or mechanisms are needed to support each portion or the entire structure.

In an effort to overcome some of the disadvantages associated with current material extrusion-based three dimensional printing techniques, support materials have been found to enable a "printing-then-solidification" technique, as disclosed herein, where the printed liquid three dimensional structure does not undergo any phase change until the complete three dimensional structure is fabricated. In an embodiment, it may be desirable to cause a phase change of different portions of the three dimensional structure at different times, and embodiments of the present method can be modified to accommodate this approach.

Now having described embodiments of the present disclosure in general, additional details are provided for embodiments of the present disclosure.

A) Support Bath:

In general, during fabrication (printing of the build material), the structure, as it is formed in a layer-by-layer process (or voxel-by-voxel process), is stabilized by a support material. As each discrete volume of build material is printed to selected regions, the support material in that region undergoes a gel-to-sol change so that the support material readily flows as a result of an external force (e.g., printing (e.g., movement of the print head, extrusion of the build material, and the like)) higher than the yield stress of the support material. Once the stress applied to the support material is less than the yield stress, the fluidized support material returns to its gel-like state as it fills any regions (e.g., crevasses) that are not filled in by the printed build material. In other words, the "bulk" support material surrounding the printed build material successfully holds or secures each printed feature in place when the stress applied abates or is otherwise removed. The print system can then print additional build material in a new location, which can be repeated until the liquid three dimensional structure is completely formed. Since the printed liquid three dimensional structure can remain fluid until the whole structure is fabricated, the interface between two or more sequentially or simultaneously printed regions can be eliminated.

In order to use the widest variety of build materials, the support material should have one or more of the following: ion insensitivity, UV transparency, and thermal stability. In addition, the support material should be easy to remove in order to harvest the printed object after solidification. For bio-printing applications, the support material should also be biocompatible. Additional details regarding the support material and the build material are provided herein and in the Examples.

In an embodiment, the three dimensional printing system includes a support bath and a printing device. The printing device can include an extrusion based three dimensional printing device. In an embodiment, the printing device includes one or more extrusion tips, apertures, or print heads that can dispense the build material. The printing device can also include some auxiliary systems such as pneumatic control system, build material supplying system, heating and temperature control system, and curing/gelation/solidification system. The printing device can include commercial products such as 3Dn series and tabletop series from nScrypt, 3D-Bioplotter from Envision TEC, BioBots from Biobots, and Fab@Home from Fab@Home. Additional features or aspects of the printing device will be discussed herein, such as the speed of the movement of the extrusion tip, the pressure and speed of the build material coming out of the extrusion tip, and the like. Generally, the speed range of the print head can be about 0.5 mm/s to 5.0 mm/s depending on the rheological properties (e.g., viscosity) of build material, and the speed range of build material varies at the same level with the speed range of the print head. In this regard, the speed of the print head can be selected based on variables of the system.

In an embodiment, the support bath (e.g., reservoir) can be a container in which a three dimensional structure can be constructed and which can hold a support material. The support bath can be made of plastic, metal, a composite or other appropriate material that is compatible with the printing device, support material, and build material and can range in size depending upon the particular application. In an embodiment, the support bath includes one or more pumps or mechanisms to introduce or remove the support material, temperature control to modify the temperature of the support material and/or the build material, and the like.

The support material is in a gel-like state when a stress applied (or is under no applied stress) to the support material is less than a yield stress of the support material, whereas the support material is in a free-flow state when the stress applied to the support material is above the yield stress. Once the stress applied to the support material changes from above the yield stress to below the yield stress, the support material immediately returns to the gel-like state.

In context of three dimensional printing, the printing device can deliver a plurality of discrete volumes of a liquid (a build material) to a specified voxel in the support bath. Each specified voxel corresponds to a different location, so that a plurality of voxels (including the build material in the voxel) form the liquid three dimensional structure. When a discrete volume of liquid is delivered to a particular voxel, the support material in that particular voxel changes from the gel-like state to the free-flow state so that the support material flows out of the particular voxel as the discrete volume of liquid occupies the voxel. Once a particular discrete volume of liquid is delivered, the support material supports the discrete volume of liquid as it changes from the free-flow state back to the gel-like state as the support material is no longer subject to the applied stress, in other words, the stress applied is less than the yield stress.

In regard to this context, the word "support" or "supports" refers to the ability or characteristic of the support material to conform around regions (e.g., crevices) that the discrete volume of liquid is not occupying and holding the liquid in the voxel to which it was printed. In addition, support includes buoyant support of each of the voxels as they are formed and of the liquid three dimensional structure during and after it is formed.

In regard to this context, the word "voxel" refers to an addressable volume to which the printing device can deliver the build material. One can consider the volume of the support bath having a plurality of voxels, each voxel having unique three dimensional coordinates (e.g., the coordinate can be defined by the x, y, and z-axis). In an embodiment, a voxel can have a volume of about 0.000785 µL to 0.785 µL. In an embodiment, the voxel can have a length, a width, and a height, each independently of one another of about 0.1 mm to 1.0 mm. In an embodiment, the voxel can also have a diameter (if it has a spherical-like structure) of about 0.1 mm to 1.0 mm. In an aspect, the voxel can have a polyhedron or a substantially (e.g., about 70 to 99%) polyhedron three dimensional structure. In an aspect, the voxel can have a cubic or a substantially (e.g., about 70 to 99%) cubic three dimensional structure. In an aspect, the voxel can have a cuboid or substantially (e.g., about 70 to 99%) a cuboid three dimensional structure. In an aspect, the voxel can have a spherical or a substantially (e.g., about 70 to 99%) spherical three dimensional structure. A combination of voxels having the build material in each voxel forms the liquid three dimensional structure.

This process can be repeated for each voxel that is used to form the liquid three dimensional structure and areas not occupied by the build material are occupied by the support material. In other words, the support material supports the liquid three dimensional structure, which can then be undergo a state change (e.g., curing, gelation, crosslinking, or a combination thereof) to form a three dimensional structure.

In an embodiment, the state change of the liquid three dimensional structure to the three dimensional structure can be induced by increasing or decreasing the ambient temperature to the glass-transition temperature of build materials, applying light radiation, providing ions to the build materials, and/or adjusting the pH values of build materials.

As stated above, the support material has a yield stress. A material which hardly flows if the imposed stress is below some critical value but easily flows at high shear rates at stresses above this value is called a yield stress fluid and the stress value that marks this transition is called the yield stress. One way to describe yield stress behavior is using the Herschel-Bulkley model, which describes the rheological behavior of the yield stress fluid as: $\sigma=\sigma_0+k\dot{\gamma}^n$, where $\sigma$ is the shear stress, $\dot{\gamma}$ is the shear rate, $\sigma_0$ is the yield stress, k is the consistency index and n is the flow index. If $\sigma<\sigma_0$, the yield stress fluid behaves as a solid, otherwise it behaves as a fluid.

As described in the Examples, each support material has a yield stress. The support material can be selected based on the parameters including the yield stress and the expected stress applied to the support material by the printing device. The Examples provide some specific examples that can be considered, but the application and scope of the claims are not limited by these examples and the scope is intended to extend to various support materials having characteristics consistent with the present disclosure.

In regard to the stress applied by the print device, the stress applied can be the result of the movement of the print head, dispensing pressure applied to build materials, and/or physical constraints of extrusion tip(s).

In an embodiment, when the support material is dispersed in water, electrostatic repulsive force prevents direct contact of particles (e.g., nanoparticles) of the support material and restricts the motion of the particles such that an ordered array extends through the entire volume of the suspension of the support material. This forms a structured fluid and leads to yield-stress behavior, especially when the concentration of support material (e.g., smectite minerals) is sufficiently high.

In an embodiment, the support material can include smectite minerals, which may be referred to as nanoclays in some instances. Smectite minerals are the most commonly used nanoclay minerals in various bio-related applications. The most important members of the smectite group are montmorillonite (MMT), nontronite, Saponite, and hectorite, and all of them are good candidates for the proposed printing-then-solidification/curing/gelation methodology.

Montmorillonite is a 2:1 clay with a chemical formula of $(Na,Ca)_{0.33}(Al,Mg)_2(Si_4O_{10})(OH)_2 \cdot nH_2O$, which has two tetrahedral sheets of silica sandwiching a central octahedral sheet of alumina. The particles are plate-shaped with an average diameter of about 0.5 to 2 µm or about 1 µm and a thickness of about 8 to 12 nm or about 9.6 nm. In montmorillonite, the 2:1 phyllosilicate structure leads to more than 50% octahedral charge; its cation exchange capacity is due to isomorphous substitution of Mg for Al in the central alumina plane. The substitution of lower valence cations in such instances leaves the nearby oxygen atoms with a net negative charge that can attract cations.

Nontronite is an iron rich member of the smectite group of clay minerals. Nontronites typically have a chemical composition consisting of more than about 30% $Fe_2O_3$ and less than about 12% $Al_2O_3$. A typical structural formula for nontronite is $Ca_{0.5}(Si_7Al_{0.8}Fe_{0.2})(Fe_{3.5}Al_{0.4}Mg_{0.1})O_{20}(OH)_4$. The dioctahedral sheet of nontronite is composed mainly of trivalent iron ($Fe^{3+}$) cations. The tetrahedral sheet is composed mainly of silicon ($Si^{4+}$), but can have substantial substitution of either $Fe^{3+}$ or $Al^{3+}$, or combinations of these two cations. Thus, most layer charge is located in the tetrahedral sheet and balanced by divalent calcium ($Ca^{2+}$) or magnesium ($Mg^{2+}$).

Saponite, a trioctahedral mineral of the smectite group, is built from two $SiO_4$ tetrahedral layers and one $MgO_6$ octahedral layer arranged in a TOT sandwich (T stands for tetrahedral layer and O stands for octahedral layer). Substitution of Si by Al in the T layer creates a negative charge which can be compensated by cations such as $Na^+$ located in the interlayer space. The chemical formula of Saponite is $Ca_{0.25}(Mg,Fe)_3((Si,Al)_4O_{10})(OH)_2 \cdot n(H_2O)$.

Hectorites are trioctahedral smectites similar to montmorillonite, but with some $Mg^{2+}$ substituted for $Li^+$ in the octahedral sheet and trace amounts of $Al^{3+}$ in place of $Si^{4+}$ in the tetrahedral sheets, leading to a general composition of $Na_{0.3}(Mg_{3-x}Li_x)(Si_4)O_{10}(OH)_2$. Because natural clay materials are generally heterogeneous and contaminated with various impurities, synthetic processes have been developed to produce pure materials of certain types.

For example, Laponite ($Na_{0.7}Si_8Mg_{5.5}Li_{0.3}O_{20}(OH)_4$), a commercially-available synthetic hectorite, is a hydrous sodium lithium magnesium silicate consisting of monodisperse nanoscale platelets, about 0.5 to 15 nm or about 1 nm thick and about 20 to 30 nm or about 25 nm in diameter. When mixed with water, individual platelets disperse readily to form colloidal suspensions. Sodium ions dissociate from the individual platelets, leaving the faces of each disc negatively charged; hydroxide ion dissociation at the edges results in a slight positive charge. This charge distribution drives Laponite platelets to adopt a stable "house-of-cards" arrangement as the aqueous Laponite suspension equilibrates, resulting in a transparent suspension with a yield stress.

In an embodiment, the support material can be in the commercially sold Laponite family of materials (e.g., Laponite EP®, Laponite RD®, Laponite XLG®, Laponite XL21® and Laponite D®). These materials offer a versatile yield-stress support material for the printing of liquid build materials with different solidification, curing, and/or gelation mechanisms. Laponite is a synthetic nanoclay that is widely used in personal care products, coatings, and industrial applications. As a result of carefully controlled synthesis, it consists of crystalline nanoscale platelets with very low polydispersity. Laponite's wide range of yield stress at different grades and concentrations and the good stability in yield stress make it an excellent support material for different liquid build materials. After disruption by an external stimulus, the Laponite colloid is able to rapidly return to equilibrium under typical printing conditions as demonstrated in an imaging study. This unique yield-stress material property is explored for liquid extrusion printing for the first time. Laponite colloidal baths permit repeated retracing of dispensing nozzle because reversible liquefaction occurs locally without changing their overall rheological properties. To evaluate its thixotropy and recovery capability during and after nozzle movement, the motion of microbeads embedded in the Laponite colloid is imaged as the colloid reservoir is translated relative to a fixed nozzle.

As described in more detail in the Examples, it was found that only the nanoclay Laponite colloid around the dispensing nozzle flows upon the nozzle movement, and the affected thixotropic region is limited to twice the characteristic length (nozzle radius). Such a thixotropic behavior ensures that liquid build materials are supported (e.g., surrounded and trapped in place) immediately after being deposited in the support material, enabling precisely controlled structural features to be printed.

In an embodiment, the build material can include materials that can be dispensed using the printer device as well as materials that do not interact strongly with the support material, where such interaction may destroy the electrostatic balance inside the support material and can disrupt the "house-of-cards" structure. In an embodiment, the build material can be selected from the following with consideration of the support material being used: natural polymers including alginate, gelatin, chitosan, collagen, Matrigel, agarose and fibrin as well as synthetic polymers including poly (ethylene glycol), polyvinyl alcohol, pluronic, SU-8 and polydimethylsiloxane.

B) Self-Supporting Three Dimensional Structure:

An embodiment of the present disclosure includes a precursor build material that includes a hydrogel precursor and a support material. It should be noted that while the support material is separate from the build material in A), the support material is a component of the precursor build material in B). Inclusion of the support material in the precursor build material provides the precursor build material with self-supporting properties similar to that of the support material as described above. In this regard, the precursor build material has a gel-like state when a stress applied to the precursor build material is less than a yield stress, while the precursor build material has a free-flow state when the stress applied to the precursor build material is above the yield stress. When the stress applied to the precursor build material changes from above the yield stress to below the yield stress, the precursor build material returns to the gel-like state from the free-flow state.

As mentioned above in A), when the support material is dispersed in water, electrostatic repulsive force prevents direct contact of particles (e.g., nanoparticles) of the support material and restricts the motion of the particles such that an ordered array extends through the entire volume of the suspension of the support material. This forms a structured fluid and leads to yield-stress behavior, especially when the concentration of support material (e.g., smectite minerals) is sufficiently high. In an embodiment, the support material can include smectite minerals, which may be referred to as nanoclays in some instances. Smectite minerals are the most commonly used nanoclay minerals in various bio-related applications. The most important members of the smectite group are montmorillonite (MMT), nontronite, Saponite, and hectorite. Additional details about the support material are described in A) above. In an embodiment, the support material is about six to eight weight percent of the precursor build material.

In an embodiment, the hydrogel precursor can be selected from: natural hydrogels including alginate, gelatin, chitosan, collagen, Matrigel, and the like as well as synthetic hydrogels including poly(ethylene glycol), polyvinyl alcohol, Pluronic and the like. Once the three dimensional structure of hydrogel precursor is printed, the hydrogel precursor can be converted into a solid state according to its applicable gelation mechanism(s). In an embodiment the gelation or solidification mechanisms can be selected from: thermal gelation, ultraviolet or any light-activated curing, ionic crosslinking, a combination thereof, and the like. In an embodiment, the hydrogel precursor is about 0.5 to 15 weight percent of the precursor build material.

An embodiment of the present disclosure includes a three dimensional printing system for the self-supporting three dimensional structure. In an embodiment, the three dimensional printing system includes a printing device and an optional support bath container, however, support material is not used in the support bath structure, rather the support bath structure can be used to protect the three dimensional structure being printed. The printing device can include an extrusion based three dimensional printing device. In an embodiment, the printing device includes one or more extrusion tips, apertures, or print heads that can dispense the build material. The printing device can also include some auxiliary systems such as pneumatic control system, build material supplying system, heating and temperature control system, and curing/gelation/solidification system. The printing device can include commercial products such as 3Dn series and tabletop series from nScrypt, 3D-Bioplotter from Envision TEC, BioBots from Biobots, and Fab@Home from Fab@Home. Additional features or aspects of the printing device will be discussed herein, such as the speed of the movement of the extrusion tip, the pressure and speed of the build material coming out of the extrusion tip, and the like. Generally, the speed range of the print head can be about 0.5 mm/s to 5.0 mm/s depending on the rheological properties (e.g., viscosity) of build material, and the speed range of build material varies at the same level with the speed range of the print head. In this regard, the speed of the print head can be selected based on variables of the system.

In an embodiment, the printing system includes the printing device for delivering a plurality of discrete volumes of the precursor build material, each discrete volume of precursor build material is delivered to a specified voxel. In an embodiment, each specified voxel corresponding to a discrete volume of precursor build material in a different location. After each discrete volume of precursor build material is delivered, the precursor build material is self-supporting. The plurality of discrete volumes of precursor build material form a precursor build material three dimensional structure.

Prior to delivering the plurality of discrete volumes of the precursor build material to each specified voxel, the precursor build material is in the gel-like state. As the printing device delivers the precursor build material to each specified voxel the printing produces stress applied to the precursor build material that is above the yield stress so that upon printing each discrete volume the precursor build material converts into the free-flow state. After each discrete volume of the precursor build material is printed to each specified voxel, the precursor build material in the free-flow state transforms back to the gel-like state and is self-supporting.

An embodiment of the present disclosure includes a method to form a three dimensional structure using the precursor build material. A first precursor build material is printed in a first voxel without a support bath. Prior to printing the first precursor build material in the first voxel, the first precursor build material is in the gel-like state. The printing produces stress applied to the first precursor build material that is above the yield stress so that upon printing the first precursor build material in the first voxel the first precursor build material converts into the free-flow state. The first precursor build material flows into the first voxel as the first precursor build material is printed. After the first precursor build material is printed, the first precursor build material transforms back to the gel-like state once the stress applied is below the yield stress. The process can be performed for a plurality of voxels, wherein the resulting structure formed is a precursor build material three dimensional structure that is self-supporting.

Subsequently, a phase change or state change can be caused in the precursor build material three dimensional structure to form the three dimensional structure. In an embodiment, the phase change can include curing, gelation, crosslinking, or a combination thereof to form a three dimensional structure. In an embodiment, the phase change of the precursor build material three dimensional structure to the three dimensional structure can be performed by increasing or decreasing the ambient temperature to the glass-transition temperature of build materials, applying light radiation, providing ions to the build materials, and/or adjusting the pH values of build materials.

It should be noted that a nanoclay, Laponite, has been used as a physical crosslinker, which is also sometimes viewed as a rheological additive, to make printable/injectable inks for various fabrications processes. However, the nanoclay has not been used as a support material or scaffold material as in this embodiment. These Laponite-based printing studies are a type of "solidification-while-printing" approach, which is fundamentally different from the proposed "printing-then-solidification" approach described herein.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example 1

Additive manufacturing (AM), commonly known as 3D printing, enables the freeform fabrication of complex structures from various build materials and provides an effective and efficient way to produce low-volume, customized products with complicated geometries and advanced material properties and functions[1-5]. Of seven AM techniques[5,6], material extrusion is the most widely used due to its easy implementation, high efficiency, and the wide range of extrudable materials; fused deposition modeling (FDM) is one of its popular implementations. When using directly extruded liquid build materials for extrusion-based fabrication, however, several complications still limit the wide use of the traditional "solidification/curing/gelation-while-printing" approach, in which each layer is completely solidified/cured/gelled prior to the deposition of the next layer. First, the extrusion nozzle may clog due to its short standoff distance, especially when printing ionically cross-linkable materials since surface tension brings the gelation agent to the nozzle and clogs it. Second, it is difficult to simultaneously print support structures to hold the part being fabricated while undergoing a liquid-solid phase change. Third, the interfacial strength between two sequential layers limits the mechanical strength of printed structures if the deposition speed is not optimized.

To enable material extrusion as a versatile printing technique for liquid build materials, a Laponite nanoclay yield-stress colloid serves as a functional support bath material to enable an alternative "printing-then-solidification/curing/gelation" methodology in which a three-dimensional (3D) structure does not undergo any phase change until the complete structure is fabricated. For convenience, we refer to this printing approach as "printing-then-solidification" herein. During fabrication, the printed structure is stabilized by a support bath which readily flows when an external force higher than its yield stress is applied, such as that exerted by a moving extrusion nozzle. Once the nozzle moves on, the fluidized support material fills any crevasses in its wake and then returns to its gel-like behavior. This bulk support material successfully holds each printed feature in place when surface tension and gravitational forces are lower than the yield stress of support material. Then, the whole liquid structure is solidified in situ by applying applicable crosslinking mechanisms. Finally, the solidified structure is harvested from the support bath for any further processing as needed. Since the printed structure can remain fluid until the whole structure is fabricated, the interface between two sequentially printed layers can be eliminated, if needed. It is noted that some extrusion-based printing approaches have been innovated to directly print 3D liquid structures in air before crosslinking[7,8], but such approaches mainly rely on the development of new ink materials with the yield-stress property. As such, there is still a need to develop a versatile fabrication approach to extrusion print various liquid build materials other than yield-stress materials.

Development of functional support materials has been of great interest for liquid material extrusion. Such materials range from hydrophobic fluids which provide buoyant support[9] to photopolymerizable hydrogel matrixes which hold a feature being printed[10] to reversibly crosslinked guest-host hydrogels which heal around a traveling nozzle as well as printed material[11] to packed gel particles including granular Carbopol microgels[12-14] and gelatin particles[15]. While some of the aforementioned support materials[10-15] can be potentially utilized for the proposed "printing-then-solidification" approach, their applications for "printing-then-solidification," unfortunately, are limited by the use of additional fluid filler[10], ionic sensitivity[13], working temperature range[15], or the possible reaction with the guest-host hyaluronic acid hydrogel[11]. For the two promising yield-stress support materials (Carbopol microgels[12-14] and gelatin particles[15]), unfortunately, the ionic sensitivity of Carbopol microgels prevents their use for ionic crosslinking material printing while the melting temperature of gelatin particles (37° C.) limits the printing of thermo-sensitive materials with higher working temperature in a gelatin particle bath.

The majority of commonly used liquid build materials solidify in response to one of three stimuli: multivalent ions, ultraviolet (UV) radiation-induced free radicals, or temperature. Therefore, an ideal support material is expected to feature ion insensitivity, UV transparency, and/or thermal stability. Furthermore, it should be easy to remove in order to harvest the printed object after solidification. For bioprinting applications, the support material should also be biocompatible.

This study investigates the feasibility of Laponite nanoclay, a member of the smectite mineral family, as a versatile yield-stress support bath material for the printing of liquid build materials, in particular, biomaterials with different solidification/curing/gelation mechanisms using the "printing-then-solidification" approach.

Laponite Utilized as the Support Bath Material for Extrusion Printing

Laponite is a synthetic nanoclay which is widely used in personal care products, coatings, and industrial applications. As a result of carefully controlled synthesis, it consists of crystalline ($Na_{0.7}Si_8Mg_{5.5}Li_{0.3}O_{20}(OH)_4$) in the form of nanoscale platelets (nanosilicates), approximately 1 nm thick and 25 nm in diameter, with very low polydispersity. Although they aggregate in the dry state, individual platelets disperse readily in aqueous solutions to form colloidal suspensions. Sodium ions dissociate from the individual platelets, leaving the faces of each disc negatively charged; hydroxide ion dissociation at the edges results in a slight positive charge. This charge distribution drives Laponite platelets to adopt a stable "house-of-cards" arrangement as the aqueous Laponite suspension equilibrates, resulting in a transparent suspension with a yield stress. This yield stress is a result of the threshold energy required to disrupt the "house-of-cards" before the suspension can flow. Since the charge distribution leads to the formation of the "house-of-cards" arrangement at given Laponite concentrations, ionic impurities in the Laponite suspension may affect its rheological properties due to the influence of the ionic strength on electrostatic interactions[16, 17]. As reported, the addition of ionic solution such as sodium chloride (NaCl) may vary the concentration threshold to form the "house-of-cards" arrangement especially for Laponite RD dispersions at lower volume fractions (~$10^{-3}$)[17]. Herein, to avoid the influence of ionic impurities, deionized water is used as the solvent to prepare Laponite suspensions. As measured, the rheological properties of Laponite suspensions (FIG. 1.1A) verify Laponite as a typical yield-stress material, behaving like a Kelvin-Voigt linear solid with damping in frequency sweeps.

Laponite's wide range of yield stress at different grades and concentrations and the good stability in yield stress make it an excellent support material for different liquid build materials. After disruption by an external stimulus, the Laponite colloid is able to rapidly return to equilibrium under typical printing conditions as demonstrated in an imaging study. This unique yield-stress material property is explored for liquid extrusion printing for the first time. Two types of Laponite have been investigated in this study: Laponite RD for acellular structure printing, and Laponite EP for bioprinting. It should be noted that various Laponite materials including RD and XLG have been commonly used for various tissue engineering applications as scaffold or build materials[18-23], and the reason that we use Laponite EP is its bath has a pH value close to neutral and can be readily used for bioprinting; in addition, organic modification reduces its ionic sensitivity, which enables Laponite EP to be mixed with some ionic solutions while retaining its original rheological properties. Since Laponite RD is more viscous (FIG. 1.1A) and transparent than Laponite EP, the imaging study is based on Laponite RD. When the nozzle travels in the Laponite bath at typical path speeds from 0.25 to 25.00 mm/s, no crevasse is observed in the wake of the moving nozzle, demonstrating that the Laponite colloid fills the crevasse immediately.

Particle Imaging Velocimetry Analysis of Printing in a Laponite Bath

Laponite colloidal baths permit repeated retracing of a dispensing nozzle because reversible liquefaction occurs locally without changing their overall rheological properties. Under stressed conditions, the localized "house-of-cards" arrangement of Laponite suspensions around the nozzle tip is disrupted; it rapidly recovers to the original structure when the applied stress falls below the yield stress. Such time-dependent structural change is termed thixotropy and its breakdown and recovery time scales depend on the physico-chemical conditions (such as volume fraction, pH, and ionic strength). Specifically, for some Laponite suspensions with lower volume fractions (such as 0.5%-0.8% (v/v) Laponite XLG) the breakdown time scales consist of a very short structural orientation time scale (~0.1 s) and a long structural disaggregation time scale (~100 s), and the recovery time scales consist of a very short structural disorientation time scale and a much longer structural aggregation and arrangement time scale (ranging from a few hours to several days).[24]

To evaluate the thixotropy and recovery capability of high concentration Laponite suspensions used in this study during and after nozzle movement, the motion of microbeads embedded in the Laponite colloid is imaged as the colloid reservoir is translated relative to a fixed nozzle. Videos captured using a high speed camera are analyzed by particle imaging velocimetry (PIV) to extract the velocity field around the nozzle as shown in FIG. 1.1B. It is found that only the nanoclay Laponite colloid around the dispensing nozzle flows upon the nozzle movement, and the affected thixotropic region is limited to twice the characteristic length (nozzle radius). As shown in FIGS. 1.1C and 1.1D, the thixotropic length scale increases with the nozzle diameter as well as the nozzle path speed, and the higher the Laponite concentration, the less sensitive the bath is to the nozzle movement. The ratio of thixotropic length scale to path speed (the slope in FIG. 1.1E) does not vary with the path speed, indicating that the Laponite bath recovers in the same amount of time regardless of the nozzle speed. Such a thixotropic behavior ensures that liquid build materials are trapped in place immediately after being deposited in the nanoclay colloid bath, enabling precisely controlled structural features. Compared with that of granular Carbopol particles[12] under similar test conditions (nozzle outer diameter and path speed), the thixotropic length scale of nanoclay colloids is shorter due to the nanoscale structure of Laponite nanoclay particles, indicating that Laponite is a promising support material for extrusion printing applications.

Printing Mechanism in a Laponite Bath

Shown in FIG. 1.2 is a schematic of extrusion printing in a nanoclay bath of colloidal Laponite. When writing in a Laponite bath, Laponite particles away from the nozzle retain the "house-of-cards" structure and maintain a gel status as shown in FIG. 1.2 (left). As the nozzle travels, Laponite particles at the nozzle tip are physically disturbed and disordered to fluidize around the nozzle tip (FIG. 1.2, center). Such a fluidlike transition of gel network structures during shear flow was carefully examined when silica colloidal gels were at low and high pressures during microchannel flow[25] and the stress range of some Laponite suspensions was determined by standard rheological measurements[26, 27]. As reported, it is found that at a low shear stress (such as 5 Pa for 3.0% (w/v) Laponite RD suspensions), the nanoclay suspension shows a typical gel or glass state, while at a high shear stress range (from 15 to 80 Pa for 3.0% (w/v) Laponite RD suspensions), it transits from a gel state to a sol state[27]. Once the nozzle travels through, the disturbed Laponite particles recover to the "house-of-cards" structure rapidly to trap the deposited liquid structure in place (FIG. 1.2, right). Finally, the whole printed liquid structure is solidified in the Laponite bath as the "printing-then-solidification" approach. After the printed structure is harvested from the Laponite bath, it can be further solidified (second-step solidification), if needed. The Laponite-enabled "printing-then-solidification" approach is further implemented in printing alginate structures in biocompatible Laponite EP based on the ionic gelation mechanism, gelatin structures in biocompatible Laponite EP based on the thermal gelation mechanism, and SU-8 structures in Laponite RD based on the UV gelation mechanism.

Alginate Structure Fabrication

First, tubular alginate structures are printed using sodium alginate solutions and gelled in a Laponite EP-calcium chloride ($CaCl_2$)) bath. Sodium alginate consists of a family of unbranched binary anionic copolymers of 1,4 linked β-D-mannuronic acid (M units) and α-L-guluronic acid (G units). It undergoes gelation when interacting with divalent ions such as $Ca^{2+}$ or trivalent ions such as $Al^{3+}$. Gelation occurs as such multivalent cations form interchain ionic bonds between G blocks, giving rise to a stable alginate network such as the calcium alginate network as shown in FIG. 1.3A. The selection criterion for Laponite concentration is whether the resulting Laponite bath is good as a yield-stress fluid for the proposed printing approach while the selection criterion for alginate concentration is whether the resulting alginate solution is printable. Thus, we select an 8.0% (w/v) alginate solution as the liquid build material due to its good extrusion printability as a model liquid ink and a 4.0% (w/v) Laponite EP suspension as the support bath material due to its suitable rheological properties. To evaluate the printing quality of alginate structures fabricated by the proposed approach, an alginate filament is deposited in the Laponite EP bath and the morphology of the filament is shown in FIG. 1.3B. Then, Y-shaped tubular structures, the simplified basic unit of vascular constructs[19-21], are designed and fabricated using an 8% (w/v) alginate solution. To avoid undesirable gelation of alginate during printing, the $CaCl_2$)concentration is carefully selected based on the stoichiometry and kinetics of the reaction[12] between sodium alginate and calcium cations. The optimal $CaCl_2$) concentration for the Laponite bath is selected as 0.125% (w/v) such that the time for the complete gelation of each deposited filament is longer than the printing time for a whole structure (approximately 6 minutes versus 5 minutes for this study). As such, each filament in the structure remains fluidic until the whole structure is printed to maximize the benefit of the "printing-then-solidification" approach for this ionically crosslinked material.

Herein 4% (w/v) Laponite EP mixed with 0.125% (w/v) $CaCl_2$) is used as the support colloidal bath, and the printing conditions are determined based on the calculation. The printing trajectories for the base, junction, and bifurcated portions of Y-shaped tubular structures as well as the printing procedure are illustrated FIG. 1.3C. Dashed lines indicate that the nozzle travels between discrete portions of a given layer without depositing material. A printed Y-shaped tube in the Laponite-$CaCl_2$) bath can be seen in FIG. 1.3D (left) and is then kept for 6 hours for complete gelation using the calcium cations in the bath. Residual Laponite is rinsed away using deionized water to retrieve the part as shown in FIG. 1.3D (right). The base portion of the Y-shaped structures has a mean diameter of 4 mm and a height of 4 mm, and the bifurcated portions have an inclination angle of 45°, a 4-mm mean diameter projected along the horizontal plane, and a 2-mm height. The total height of the Y-shaped structure is approximately 8 mm, and the mean wall thickness is approximately 1 mm. A comparison between the 3D model and 3D printed Y-shaped tube demonstrates the print fidelity of the alginate structure printed in the Laponite EP bath. In addition, as shown in FIG. 1.3E (left: as printed and right: crosslinked), a complex bone structure (humerus) is printed in the Laponite-$CaCl_2$) bath. While $CaCl_2$) is used as the crosslinking agent for alginate structure fabrication herein, it is also fine to use other cations such as $Al^{3+}$ for ionic crosslinking of applicable liquid build materials.

To demonstrate the excellent interfacial strength of structures fabricated by the proposed "printing-then-solidification" approach, tensile tests are performed on samples made by different fabrication approaches including casting, nanoclay-enabled printing, and conventional "solidification-while-printing". In addition, two path strategies are utilized to make the samples including the printing path parallel (longitudinal) to the stretching direction and perpendicular (horizontal) to the stretching direction and the effects of printing path on the mechanical properties are investigated. Both Young's modulus and fracture strength of samples made by the "printing-then-solidification" approach are only slightly lower than those of cast samples, but are pronouncedly higher than those of samples made by the conventional "solidification-while-printing" approach. It also indirectly indicates that there is only little residual Laponite nanoclay, if any, trapped between the filaments during printing.

Gelatin-Based Cellular Structure Fabrication

The Laponite EP bath is further utilized to print structures made from thermosensitive materials such as gelatin. For biological applications, the ink is made from gelatin, which is derived from collagen, a stiff helical protein with the repeating amino acid sequence glycine-$X_1$-$X_2$ in which $X_1$ and $X_2$ are often proline and hydroxyproline. Upon cooling below ~35° C., some segments in gelatin adopt the triple helical conformation, forming junctions between gelatin molecules, which result in a bulk thermal hydrogel, as shown in FIG. 1.4A. Herein we extrude gelatin at elevated temperature (37° C.) into a 37° C. Laponite EP bath and then gel it at room temperature. Due to the poor extrudability of gelatin at 37° C., 2.0% (w/v) alginate is added, which also enhances the structural integrity of living structures during incubation. Accordingly, a 2.0% (w/v) Laponite EP suspension is used as the support bath material due to its suitable rheological properties. After gelatin is thermally gelled, we remove structures from the Laponite EP bath, rinse using an aqueous sodium chloride (NaCl) solution to remove any residual Laponite, and immerse in a 37° C. $CaCl_2$) bath to crosslink sodium alginate. Since we do not want to UV cure printed living constructs, gelatin methacrylate (GelMA) is not used herein and will be tested in a future study.

Before the fabrication of complex gelatin-alginate structures, a gelatin-alginate filament is printed in the Laponite EP bath and an image of the filament is captured immediately after deposition (before crosslinking) to show the printing quality of printed gelatin-alginate structures in the Laponite EP bath. From FIG. 1.4B and its inset, the surface of the filament is very smooth, and no fuzzy edge phenomenon is observed. Then, several complex structures are fabricated using the gelatin-alginate ink. In addition to simple tubular structures, a brain model with a height of approximately 10.0 mm, a length of 15.0 mm and a width of 4.5 mm is fabricated using the gelatin-alginate ink in a 2% (w/v) Laponite EP bath. As shown in FIG. 1.4C, the brain model as designed (left) and the thermally gelled brain structure in the Laponite EP bath (center left). The next images in FIG. 1.4C, show top (center right) and side (right) views of the brain-like structure after being thermally gelled at room temperature and rinsed using sodium chloride. After ionic crosslinking in a $CaCl_2$) bath, the surface morphology of the printed brain structure is analyzed and compared with the 3D model to prove the print fidelity of the proposed fabrication approach. Since the printed structure is soft and flexible, the printing quality might be affected during printing as well as the deformation during post-treatment. It is anticipated that a higher printing quality is possible by further optimizing the printing hardware, using a smaller-diameter nozzle, and/or fine slicing of 3D models.

The printing approach is further implemented for cellular construct fabrication, and a fibroblast-laden gelatin-alginate microvascular network as shown in FIG. 1.4D is printed using the proposed printing approach. Turning to FIG. 1.4D, the right image shows the well-defined liquid gelatin-based microvascular network in the Laponite bath with a wall thickness of ~0.8 mm, compared with the computerized design model (inset). After cleaning the residual Laponite suspension from the surface and within the lumen, cell-related investigations are conducted and degradation of the structure is investigated. The residual Laponite, if present, is considered biocompatible[18-23] for living cells. FIG. 1.4D (center) illustrates the crosslinked structure stained with Hoechst 33342 for all fibroblasts (right top) and fluorescein diacetate (FDA) for living fibroblasts (right bottom). As seen from FIG. 1.4E, the cell viability immediately after printing is 93.6% and remains above 90.0% (90.2%) with control effect considered, and the cell viability can be further improved by optimizing the printing conditions. The cell morphology after three-day incubation and the metabolic activity during the three-day incubation are shown in FIGS. 1.4F and 1.4G to further demonstrate the biocompatibility and contaminant-free nature of the proposed fabrication approach. It is noted that cells may not spread well in a gelatin-alginate environment while still alive. Since gelatin is selected as a thermosensitive model hydrogel to validate the proposed biofabrication approach, intensive biological evaluation of printed cells may be studied using other applicable hydrogels and/or necessary growth cues. Specifically, to improve the printing efficiency of such large spanning structures, a "localized layer-by-layer" printing procedure is proposed and the cell-laden microvascular network is fabricated using this printing strategy (FIG. 1.4H).

SU-8 Structure Fabrication

Liquid photosensitive materials are also widely used in 3D printing, and Laponite is further tested to extrusion print SU-8 resin, a difficult-to-print epoxy-based negative photoresist based on the UV gelation mechanism as shown in FIG. 1.5A. When a printed structure is exposed to UV light, the epoxide monomers of SU-8, stimulated by curing agents, are transformed from a low-molecular weight melt to a highly crosslinked network. To retain liquid SU-8 structures in situ, a 4.0% (w/v) Laponite RD suspension is selected as the support bath. One SU-8 filament is printed in the Laponite RD bath and imaged immediately after deposition (before crosslinking) to show the printing quality of printed SU-8 structures in the Laponite RD bath. From FIG. 1.5B and its inset, the surface of the filament is very smooth, and there is a clear boundary between the Laponite bath and the SU-8 filament. After investigating the effects of nozzle step displacement on the structure quality, we select the step displacements along the x and z directions ($d_x$ and $d_z$) such that $R < d_x$, $d_z < \sqrt{2}R$, where R is the filament radius. Then various SU-8 structures as shown in FIGS. 1.5C and 1.5D are printed using the "localized layer-by-layer" deposition approach. The UF logo is printed in a Laponite RD bath with a designed height of 20.0 mm, thickness of 2.0 mm, and length of 12.0 mm. The fluidic UF logo in the Laponite bath can be seen in FIG. 1.5C. After printing, the UF logo in Laponite is exposed to UV light for crosslinking. After removing residual nanoclay colloid, the UF logo is baked to complete the curing process. Furthermore, a more complex lattice structure (FIG. 1.5D) is designed and fabricated, each cell measuring 4.0 mm×3.0 mm×3.0 mm. After the whole structure is printed, UV light is used to cure the fluidic structure to obtain the final structure as seen in FIG. 1.5D. The 3D model and 3D printed lattice structure are compared to illustrate the print fidelity of the SU-8 structure printed in the Laponite RD bath. For SU-8 printing, each deposited structure in the Laponite RD bath is exposed to UV light for 30 minutes to guarantee complete crosslinking. While the Laponite RD bath and other Laponite baths have good UV transparency, 30-minute cure time is selected to fully cure printed SU-8 structures, which have a much larger size scale than that during typical microfabrication, requiring a longer cure time.

The use of commercially available Laponite nanoclays may impact 3D printing by enabling the extrusion printing of a wide variety of build materials, including biomaterials due to its ion insensitivity, UV transparency, thermal stability, and biocompatibility. It is always a concern that aqueous materials may diffuse into the surrounding aqueous support bath during printing and post-printing processing. Fortunately, as measured printed filaments made of alginate and gelatin solutions don't diffuse significantly into the Laponite bath. The diameters of such filaments are monitored for 60 minutes when keeping in the Laponite EP bath, and it is found that the alginate and gelatin filament diameters only increase 5.8% and 13.3% (both less than 15.0%), respectively. Such filament diameter change caused by the diffusion can be predicted by Fick's second law:

$$\frac{\partial C}{\partial t} = D_c \frac{\partial^2 C}{\partial x^2},$$

where $C = C_{(x,t)}$ is the alginate concentration at length x from the surface at time t, and $D_c$ is the effective diffusion coefficient. Thus, the unidirectional diffusion can be expressed as:

$$C_{(x,t)} = C_0 \left[1 - \text{erf}\left(\frac{x}{2\sqrt{D_c t}}\right)\right],$$

where erf (~) is the error function. For the alginate filament diffusion case, $x \approx 0.5 \times 10^{-5}$ m, $C_0 = 8.0\%$ and $C_{(x,t)} \approx 7.5\%$. $D_c$ is dependent on many factors such as the temperature and molecular weight. Herein, $D_c \approx 10^{-13}$ m$^2$/s[33] to approximately calculate the diffusion time as t=2100 s=35 min, which is on the same order of the monitoring time scale. To accurately assess the resolution of a printed liquid filament in a nanoclay bath, the effects of the effective diffusion coefficient on the filament diameter as a function of time must be considered when determining the achievable printing resolution.

It is noted that achievable printing resolution is dependent on not only the particle size of colloids but also the local viscosity/diffusivity as discussed as well as surface energy, to name a few. While the nanoscale size of Laponite nanoclays (25 nm in diameter) may be advantageous in holding small features as deposited when comparing with the particle size of other thixotropic systems such as Carbopol microgels and gelatin microparticles (~5 and 50 μm, respectively), their achievable printing resolution should be further evaluated in a future study if the resolution is of interest. While the maximum printing speed as tested is 25.0 mm/s, which is based on the current printing configuration, the printing speed limit should be further investigated.

Conclusions

In summary, we report a Laponite-enabled "printing-then-solidification" approach which can be applied to fabricate complex 3D structures using various liquid build materials. For most soft structure fabrication applications, the printing precision is not of great concern. If the printing accuracy is of interest, possible structural deformation and swelling during and after printing should be carefully compensated. Future work may include the determination of achievable shape and feature size using the proposed Laponite-enabled "printing-then-solidification" approach. Generally, the pH value of Laponite suspensions is equal or higher than 7.0. When printing materials, in particular those with a pH value less than 7.0, it might lead to nozzle clogging, and special chemical treatment may be needed to accommodate incompatible extrusion chemistries. In addition, the effects of nanoclay properties, liquid build material properties and operating conditions on the printed features should be systematically investigated to further assess the versatility of the proposed fabrication approach. Future work may also include the investigation and development of non-aqueous Laponite colloids.

Methods:

Laponite Nanoclay Colloid Preparation

Laponite RD (pH≈10.0) and EP (pH≈7.0) (BYK Additives Inc., Gonzales, Tex.) were used as the support yield-stress materials for bath response observation and fabrication. Laponite suspensions were prepared by dispersing the appropriate amount of dry Laponite (RD or EP) powder in deionized water at room temperature. After continuous mixing for 90 min using an overhead stirrer (Thermo Fisher Scientific, Waltham, Mass.) at 500 rpm, the Laponite suspensions were stored in the dark in sealed containers to prevent degradation and evaporation and aged for one day. Before each use, the Laponite suspensions were centrifuged at 3000 rpm for 10 min to completely remove bubbles trapped in the suspensions. Specifically, both 3.0% and 4.0% (w/v) Laponite RD suspensions were used for Laponite bath response observation. For printing studies, 4.0% (w/v) Laponite RD suspension was used as the support yield-stress bath for SU-8 printing; 4.0% (w/v) Laponite EP suspension with $CaCl_2$ (0.125% (w/v)) was prepared by diluting stock Laponite EP (8.0% (w/v)) 1:1 (v:v) with aqueous 0.25% (w/v) $CaCl_2$ at room temperature and mixing thoroughly per the same protocol for Laponite suspension preparation and was used as the support material for alginate printing; and 2.0% (w/v) Laponite EP suspension was used for gelatin printing.

Build Material Preparation

For alginate structure printing, 8.0% (w/v) low molecular weight sodium alginate (NaAlg) (Sigma-Aldrich, St. Louis, Mo.) was prepared by dispensing the appropriate amount of dry alginate powder in deionized water at room temperature with continuous mixing using an overhead stirrer at 500 rpm for 60 min. For gelatin structure printing, gelatin (Type A, 300 bloom, from porcine skin, MP Biomedicals, Solon, Ohio) was used as the major constituent of the ink, and high molecular weight sodium alginate (Acros Organics, Waltham, Mass.) was added to improve its printability. The mixed stock solution (20.0% gelatin and 4.0% NaAlg (w/v)) was prepared by dispensing the required amount of each powder in deionized water (or Dulbecco's modified Eagle's medium (DMEM, Sigma-Aldrich, St. Louis, Mo.) for cell printing) at 37° C. with continuous stirring (at 500 rpm for 60 min) until completely dissolved, then combined 1:1 (v:v) with deionized water or suspended NIH-3T3 mouse fibroblasts ($1\times10^7$ cells/mL, ATCC, Rockville, Md.) in DMEM at 37° C. to make the final ink without or with cells (10.0% (w/v) gelatin, 2.0% (w/v) NaAlg, and $5\times10^6$ cells/mL 3T3 fibroblasts for the cellular ink). Fibroblast suspension was prepared as described in a previous study[34]. For SU-8 structure printing, photosensitive SU-8 2050 (MicroChem, Westborough, Mass.), having a viscosity of 12,900 cP, was used as received to fabricate SU-8 structures. For the printing quality evaluation of filaments printed in the Laponite baths, red color food dye was added at 1.0% (v/v) to all the liquid build materials to improve the visibility.

Printing System and Printing Protocols

The extrusion system was a micro-dispensing pump machine (nScrypt-3D-450, nScrypt, Orlando, Fla.). For gelatin printing, the 37° C. printing temperature was controlled using a heating tape (SRT051-020, Omega, Stamford, Conn.) with temperature control accuracy of ±0.1° C., a temperature controller (CSi32J-C24, Omega, Stamford, Conn.), and a thermocouple probe (JMQSS-040U-6, Omega, Stamford, Conn.). For SU-8 printing, a UV curing system (OmniCure Series 2000, wavelength: 320-500 nm, Lumen Dynamics, Mississauga, ON Canada) was used to cure the deposited structure in the Laponite bath.

A 25 gauge (250 μm inner diameter) dispensing tip (EFD Nordson, Vilters, Switzerland) was used to fabricate alginate, gelatin and SU-8 structures in the Laponite bath with a layer height of 200 μm. The printing pressure was $1.38\times10^5$ Pa (20 psi) for alginate and SU-8 printing and $1.03\times10^5$ Pa (15 psi) for gelatin printing. The path speed was 2.0 mm/s for alginate and gelatin printing and 1.0 mm/s for SU-8 printing. Specifically, for alginate printing, after crosslinking in the Laponite-$CaCl_2$ bath for 6 hours, the Y-shaped tubes and bone structure (humerus) were taken out of the bath, and the residual Laponite was removed by gently shaking it in a deionized water bath. For gelatin printing, the gelatin-alginate structure was thermally gelled in the Laponite bath at room temperature for 30 min, then moved to a 0.9% (w/v) NaCl bath to rinse away the residual Laponite, and finally crosslinked in a $CaCl_2$ bath at 37° C. for 15 minutes to crosslink the alginate component. For SU-8 printing, the deposited structure in the Laponite bath was exposed to UV light for 30 minutes for crosslinking; it was then taken out of the Laponite bath, cleaned of the residual Laponite using 5.0% (w/v) HCl, and baked at 90° C. for 30 minutes for the complete curing of SU-8. For filament printing, all the filaments were printed under the same printing conditions and kept in the Laponite baths without crosslinking. The images of the filaments were taken using an optical microscope (EVOS, XL Core, Thermo Fisher Scientific, Waltham, Mass.).

Digital 3D models for the various printing applications herein were designed using SolidWorks (Dassault Systemes SolidWorks Corp., Waltham, Mass.), and the code instructions were manually programmed accordingly except the 3D models of the bone (humerus) and brain structure, which were downloaded from Thingiverse (http://www.thingiverse.com/) directly as STL files and scaled down to 1:10 and sliced by Cura (https://ultimaker.com/) to generate the G-codes for 3D printing.

Cellular Constructs Fabrication and Cell Viability and Metabolic Activity Evaluation Cellular constructs were fabricated using the cellular ink (10.0% (w/v) gelatin, 2.0% (w/v) NaAlg, and $5\times10^6$ cells/mL 3T3 fibroblasts) in a Laponite EP bath (2.0% (w/v) and pH 7.0). Printing conditions and post-treatment were the same as those during gelatin printing. After three-day incubation, the cell morphology of printed tubes was examined by staining with fluorescein diacetate (FDA, Sigma, St. Louis, Mo.) and imaged using an EVOS FL fluorescence microscope (470 nm excitation and 525 nm emission, Thermo Fisher Scientific, Waltham, Mass.). The printed and/or incubated tubes were further liquefied using aqueous 0.055M sodium citrate (VWR, West Chester, Pa.) for cell viability testing; 30 µL of the liquefied suspension was mixed with 1 µL of 300 µg/mL FDA then incubated for 5 minutes at room temperature. Cell viability was measured by counting live cells (green) and dead (non-fluorescing) cells in image stacks. For metabolic activity testing, the cellular constructs were printed using the same printing protocol and incubated for three days while the same volume cellular bioink was kept as ungelled in a Petri dish as the control group. The metabolic activity of the cells in the printed constructs and the control group was evaluated using the alamarBlue assay (Thermo Scientific, Rockford, Ill.) on Days 1, 2, and 3 per the manufacturer's protocol. The resulting fluorescent intensity was recorded using a fluorescence microplate reader (Synergy HT, Biotek, Winooski, Vt.).

Observation of Laponite Bath Response and PIV Analysis of Velocity Field

Microbeads (polystyrene microspheres, 15 µm diameter, Polysciences, Warrington, Pa.) were mixed thoroughly with Laponite RD to make the testing solutions, which were 3.0% and 4.0% (w/v) Laponite RD baths, each containing $2.7 \times 10^6$ microbeads/mL (w/v). For crevasse filling observation, the nozzle traveled at typical path speeds from 0.25 to 25.00 mm/s while the colloid bath container was fixed. For the PIV study, the colloid bath container moved while the nozzle was fixed to have a relative motion between the nozzle and bath. Images and videos were captured using a high speed camera (Fastcam SA5, Photron, San Diego, Calif.) and the data was analyzed using the PIVlab module (Matlab, MathWorks, Natick, Mass.). For low path speed (0.25, 0.50, 1.00, 2.00, 3.00 and 4.00 mm/s) measurements, the frame rate for imaging was 125 fps (frame per second); for high path speed (25.00 mm/s), it was 10,000 fps.

References for Example 1

1. Kruth, J. P.; Leu, M. C.; Nakagawa, T. Progress in Additive Manufacturing and Rapid Prototyping *CIRP Ann. Manuf. Technol.* 1998, 47, 525-540.
2. Guo, N.; Leu, M. C. Additive Manufacturing: Technology, Applications and Research Needs *Front. Mech. Eng.* 2013, 8, 215-243.
3. Ringeisen, B. R.; Pirlo, R. K.; Wu, P. K.; Boland, T.; Huang, Y.; Sun, W.; Hamid, Q.; Chrisey, D. B. Cell and Organ Printing Turns 15: Diverse Research to Commercial Transitions *MRS Bull.* 2013, 38, 834-843.
4. Wohlers Associates, Inc. Wohlers report 2013: Additive Manufacturing and 3D Printing State of the Industry Fort Collins, Colo., 2013.
5. Huang, Y.; Leu, M. C.; Mazumder, J.; Donmez, A. Additive Manufacturing: Current State, Future Potential, Gaps and Needs, and Recommendations *ASME J. of Manuf. Sci. Eng.* 2015, 137, 014001-1-10.
6. ASTM International Committee F42 on Additive Manufacturing Technologies, ASTM F2792-10 Standard Terminology for Additive Manufacturing Technologies, West Conshohocken, Pa., 2009.
7. Siqueira, G.; Kokkinis, D.; Libanori, R.; Hausmann, M. K.; Gladman, A. S.; Neels, A.; Tingaut, P.; Zimmermann, T.; Lewis, J. A.; Studart, A. R. Cellulose Nanocrystal Inks for 3D Printing of Textured Cellular Architectures *Adv. Funct. Mater.* 2017, 27.
8. Jin, Y.; Liu, C.; Chai, W.; Compaan, A. M.; Huang, Y. Self-Supporting Nanoclay as Internal Scaffold Material for Direct Printing of Soft Hydrogel Composite Structures in Air *ACS Appl. Mater. Interfaces.* 2017, DOI: 10.1021/acsami.7b03613.
9. Duarte-Campos, D. F.; Blaeser, A.; Weber, M.; Jäkel, J.; Neuss, S.; Jahnen-Dechent, W.; Fischer, H. Three-Dimensional Printing of Stem cell-Laden Hydrogels Submerged in a Hydrophobic High-Density Fluid *Biofabrication* 2012, 5, 015003.
10. Wu, W.; DeConinck, A.; Lewis, J. A. Omnidirectional Printing of 3D Microvascular Networks *Adv. Mater.* 2011, 23, 178-183.
11. Highley, C. B.; Rodell, C. B.; Burdick, J. A. Direct 3D Printing of Shear-Thinning Hydrogels into Self-Healing Hydrogels *Adv. Mater.* 2015, 27, 5075-5079.
12. Bhattacharjee, T.; Zehnder, S. M.; Rowe, K. G.; Jain, S.; Nixon, R. M.; Sawyer, W. G.; Angelini, T. E. Writing in the Granular Gel Medium *Sci. Adv.* 2015, 1, 1500655.
13. Jin, Y.; Compaan, A. M.; Bhattacharjee, T.; Huang, Y. Granular Gel Support-Enabled Extrusion of Three-Dimensional Alginate and Cellular Structures *Biofabrication* 2016, 8, 025016.
14. Hinton, T. J.; Hudson, A. R.; Pusch, K.; Lee, A.; Feinberg, A. W. 3D Printing PDMS Elastomer in a Hydrophilic Support Bath via Freeform Reversible Embedding *ACS Biomater. Sci. Eng.* 2016, 2, 1781-1786.
15. Hinton, T. J.; Jallerat, Q.; Palchesko, R. N.; Park, J. H.; Grodzicki, M. S.; Shue, H. J.; Ramadan, M. H.; Hudson, A. R.; Feinberg, A. W. Three-Dimensional Printing of Complex Biological Structures by Freeform Reversible Embedding of Suspended Hydrogels *Sci. Adv.* 2015, 1, 1500758.
16. Mourchid, A.; Delville, A.; Lambard, J.; Lecolier, E.; Levitz, P. (1995). Phase-Diagram of Colloidal Dispersions of Anisotropic Charged-Particles-Equilibrium Properties, Structure, and Rheology of Laponite Suspensions *Langmuir* 1995, 11, 1942-1950.
17. Mourchid, A.; Lecolier, E.; Van Damme, H.; Levitz, P. On Viscoelastic, Birefringent, and Swelling Properties of Laponite Clay Suspensions: Revisited Phase Diagram *Langmuir* 1998, 14, 4718-4723.
18. Dawson, J. I.; Kanczler, J. M.; Yang, X. B.; Attard, G. S.; Oreffo, R. O. Clay Gels for the Delivery of Regenerative Microenvironments *Adv. Mater.* 2011, 23, 3304-3308.
19. Gaharwar, A. K.; Schexnailder, P. J.; Kline, B. P.; Schmidt, G. Assessment of Using Laponite® Crosslinked Poly (Ethylene Oxide) for Controlled Cell Adhesion and Mineralization *Acta Biomater.* 2011, 7, 568-577.
20. Gaharwar, A. K.; Mihaila, S. M.; Swami, A.; Patel, A.; Sant, S.; Reis, R. L.; Marques, A. P.; Gomes, M. E.; Khademhosseini, A. Bioactive Silicate Nanoplatelets for Osteogenic Differentiation of Human Mesenchymal Stem Cells *Adv. Mater.* 2013, 25, 3329-3336.
21. Mihaila, S. M.; Gaharwar, A. K.; Reis, R. L.; Khademhosseini, A.; Marques, A. P.; Gomes, M. E. The Osteogenic Differentiation of SSEA-4 Sub-Population of Human Adipose Derived Stem Cells Using Silicate Nanoplatelets *Biomaterials* 2014, 35, 9087-9099.
22. Kerativitayanan, P.; Gaharwar, A. K. Elastomeric and Mechanically Stiff Nanocomposites from Poly (Glycerol Sebacate) and Bioactive Nanosilicates *Acta Biomater.* 2015, 26, 34-44.

23. Xavier, J. R.; Thakur, T.; Desai, P.; Jaiswal, M. K.; Sears, N.; Cosgriff-Hernandez, E.; Kaunas, R.; Gaharwar, A. K. Bioactive Nanoengineered Hydrogels for Bone Tissue Engineering: a Growth-Factor-Free Approach *ACS Nano* 2015, 9, 3109-3118.

24. Pignon, F.; Magnin, A.; Piau, J. M. Thixotropic Behavior of Clay Dispersions: Combinations of Scattering and Rheometric Techniques *J. Rheol.* 1998, 42, 1349-1373.

25. Conrad, J. C.; Lewis, J. A. Structure of Colloidal Gels during Microchannel Flow *Langmuir* 2008, 24, 7628-7634.

26. Willenbacher, N. Unusual Thixotropic Properties of Aqueous Dispersions of Laponite RD *J. Colloid Interface Sci.* 1996, 182, 501-510.

27. Gibaud, T.; Barentin, C.; Taberlet, N.; Manneville, S. Shear-Induced Fragmentation of Laponite Suspensions *Soft Matter* 2009, S, 3026-3037.

28. Xu, C.; Christensen, K.; Zhang, Z.; Huang, Y.; Fu, J.; Markwald, R. R. Predictive Compensation-Enabled Horizontal Inkjet Printing of Alginate Tubular Constructs *Manuf. Lett.* 2013, 1, 28-32.

29. Christensen, K.; Xu, C.; Chai, W.; Zhang, Z.; Fu, J.; Huang, Y. Freeform Inkjet Printing of Cellular Structures with Bifurcations *Biotechnol. Bioeng.* 2015, 112, 1047-1055.

30. Xiong, R.; Zhang, Z.; Chai, W.; Huang, Y.; Chrisey, D. B. Freeform Drop-on-Demand Laser Printing of 3D Alginate and Cellular Constructs *Biofabrication* 2015, 7, 045011.

31. Morris, E. R.; Rees, D. A.; Thom, D.; Boyd, J. Chiroptical and Stoichiometric Evidence of a Specific, Primary Dimerisation Process in Alginate Gelation *Carbohydr. Res.* 1978, 66, 145-154.

32. Braschler, T.; Valero, A.; Colella, L.; Pataky, K.; Brugger, J.; Renaud, P. Link between Alginate Reaction Front Propagation and General Reaction Diffusion Theory *Anal. Chem.* 2011, 83, 2234-2242.

33. Wedlock, D. J.; Fasihuddin, B. A.; Phillips, G. O. Comparison of Molecular Weight Determination of Sodium Alginate by Sedimentation-Diffusion and Light Scattering *Int. J. Biol. Macromolec.* 1986, 8, 57-61.

34. Xu, C.; Chai, W.; Huang, Y.; Markwald, R. R. Scaffold-free Inkjet Printing of Three-Dimensional Zigzag Cellular Tubes *Biotechnol. Bioeng.* 2012, 109, 3152-3160.

Example 2

Yield Stress

A material which hardly flows if the imposed stress is below some critical value but easily flows at high shear rates at stresses above this value is called a yield stress fluid and the stress value that marks this transition is called the yield stress. Usually, people use the Herschel-Bulkley model to describe the rheological behavior of the yield stress fluid as: $\sigma=\sigma_0+k\dot{\gamma}^n$, where $\sigma$ is the shear stress, $\dot{\gamma}$ is the shear rate, $\sigma_0$ is the yield stress, k is the consistency index and n is the flow index. If $\sigma<\sigma_0$, the yield stress fluid behaves as a solid, otherwise it behaves as a fluid.[1]

Yield Stress Range of Some Commonly Used Fluids a) Carbopol

As granular microgels with yield stress behavior, various grades of Carbopol are widely investigated by rheologists; representative yield stress values are listed as follows:

1.0 wt % Carbopol ETD 2050 dispersed in water at pH 7.0 has a yield stress of 26.9 Pa[2]

1.0 wt % Carbopol ETD 2050 at pH 3.83 has a yield stress of 7.4 Pa. Also, yield stress is a function of pH for Carbopol concentrations ranging from 0.1 wt % to 2.0 wt %, as shown in FIG. 2.1[3]

Carbopol 980 dispersed and neutralized at a 0.3% volume fraction in water has a measured yield stress of 50 Pa[4]

Carbopol 940 at concentrations of 0.07% and 0.08% has a yield stress of 0.5 Pa and 1.4 Pa, respectively[5]

0.5 wt % Carbopol 901 has a yield stress of ~80 Pa[6]

For 3D printing purposes, Carbopol ETD 2020 is suspended in ultrapure water at concentrations of 0.05%, 0.2% and 1.0% and the yield stress values are measured as 1 Pa, 9 Pa and 81 Pa, respectively[7]

b) Laponite

As a thixotropic material with yield stress behavior, various grades of Laponite are also investigated by rheologists; representative yield stress values are listed below:

3.0 wt. % Laponite RD has a yield stress around 30 Pa measured by a stress relaxation sweep[8]

The yield stress of Laponite RD suspended in silicone oil with a volume fraction 35.3% is measured under various magnitudes of applied electric field, and the measured yield stress varies from around 55 Pa to 400 Pa[9]

3.0 wt. % Laponite RD dispersed in ultrapure water with hollow glass spheres (0.3 wt. %) was characterized using stress sweep experiments; measured yield stress values vary from 30 to 100 Pa[10]

Laponite XLG is used to investigate the relationship between volume fractions of Laponite and the yield stress values. At low volume fractions (0.35%-0.48%) the yield stress is around 10 Pa, and at high volume fractions (0.60%-2.00%), the yield stress increases from 20 Pa to 700 Pa[11]

For 3D printing purposes, Laponite RD (4.0% (w/v)) and Laponite EP (2.0% and 4.0% (w/v)) were prepared and the yield stress values are measured as ~90 Pa, ~5 Pa and ~10 Pa, respectively.

c) Selected Other Embodiments

Bentonite, a type of MMT, is prepared by mixing with distilled water at a solid volume fraction of 10.0% and the thixotropy is measured under an increasing and then decreasing stress ramp. The yield stress is around 5 Pa.[1]

When writing in a yield-stress fluid bath, the potential crevasses behind the nozzle translation will spontaneously collapse and be filled by the surrounding yield-stress fluid when the hydrostatic stress at the bottom of the crevasse exceeds the yield stress of the bath fluid, which can be described by a dimensionless number: $\sigma_0/\rho gh$, where $\rho$ is the density, g is the gravity, and h is the depth. When $\sigma_0/\mu gh$ <1, the yield-stress fluid will collapse. Thus, the yield stress range for printing can be simply defined as $\sigma_0<\mu gh$.[7]

Effects of Build Material on the Yield Stress Behavior of Support-Bath Materials Chemically, as long as the build material will not interact strongly with the support bath material, which may destroy the electrostatic balance inside the bath material and disrupt the "house-of-cards" structure, it can be fabricated by our proposed Laponite-enabled "printing-then-solidification" approach.

Mechanically, the support bath also provides buoyant support to the build material printed inside. Thus, the gravitational force on the printed build material can be expressed as $G=mg=\rho_b Vg=\pi R^2 L\rho_b g$ and the buoyant force can be expressed as $F=\rho_s gV=\pi R^2 L\rho_s g$, where R is the radius of the printed filament, L is the length of the printed filament, $\rho_b$ is the density of the build material, $\rho_s$ is the density of the support bath material, and g is the gravitational acceleration. Therefore, when the forces are balanced, we have: $\pi R^2 Lg(\rho_b-\rho_s)=2RL\sigma_0$. So, for a stable printing process, the maximum density difference between build material and support bath material must satisfy the following equation:

$$(\rho_b - \rho_s) = \frac{2\sigma_0}{\pi R g}.$$

Otherwise, the support bath material beneath the printed structure will collapse due to the gravitational force and the 3D printed material will sink to the bottom of the bath.

Effects of Printing Conditions on the Printing Performance

The diameter of a printed filament is a function of nozzle diameter, dispensing pressure, and path speed, as shown in following equation:

$$D \approx \sqrt{\frac{P_0}{2\eta_0 L v_s}} R^2$$

where $P_0$ is the dispensing pressure, $v_s$ is the path speed, L is the length of the nozzle, $\eta_0$ is the zero-shear-rate viscosity of the build material, and R is the radius of the nozzle.

Thus, with a decreasing nozzle radius, the diameter of extruded filament also decreases as shown in FIG. 2.2A. With an increasing dispensing pressure, the diameter increases as shown in FIG. 2.2B. With an increasing path speed, the filament diameter decreases as shown in FIG. 2.2C.

References for Example 2

1. Moller, P., Fall, A., Chikkadi, V., Derks, D., & Bonn, D. (2009). An attempt to categorize yield stress fluid behaviour. *Philosophical Transactions of the Royal Society of London A: Mathematical, Physical and Engineering Sciences*, 367(1909), 5139-5155.
2. Divoux, T., Tamarii, D., Barentin, C., & Manneville, S. (2010). Transient shear banding in a simple yield stress fluid. *Physical review letters*, 104(20), 208301.
3. Lee, D., Gutowski, I. A., Bailey, A. E., Rubatat, L., de Bruyn, J. R., & Frisken, B. J. (2011). Investigating the microstructure of a yield-stress fluid by light scattering. *Physical Review E*, 83(3), 031401.
4. Ovarlez, G., Cohen-Addad, S., Krishan, K., Goyon, J., & Coussot, P. (2013). On the existence of a simple yield stress fluid behavior. *Journal of Non-Newtonian Fluid Mechanics*, 193, 68-79.
5. Putz, A. M. V., Burghelea, T. I., Frigaard, I. A., & Martinez, D. M. (2008). Settling of an isolated spherical particle in a yield stress shear thinning fluid. *Physics of Fluids*, 20(3), 33102-33300.
6. Dimitriou, C. J., Ewoldt, R. H., & McKinley, G. H. (2013). Describing and prescribing the constitutive response of yield stress fluids using large amplitude oscillatory shear stress (LAOStress). *Journal of Rheology* (1978-present), 57(1), 27-70.
7. Bhattacharjee, T., Zehnder, S. M., Rowe, K. G., Jain, S., Nixon, R. M., Sawyer, W. G., & Angelini, T. E. (2015). Writing in the granular gel medium. *Science advances*, 1(8), e1500655.
8. Mourchid, A., Delville, A., & Levitz, P. (1995). Sol-gel transition of colloidal suspensions of anisotropic particles of laponite. *Faraday Discussions*, 101, 275-285.
9. Parmar, K. P. S., Méheust, Y., Schjelderupsen, B., & Fossum, J. O. (2008). Electrorheological suspensions of laponite in oil: rheometry studies. *Langmuir*, 24(5), 1814-1822.
10. Gibaud, T., Barentin, C., & Manneville, S. (2008). Influence of boundary conditions on yielding in a soft glassy material. *Physical Review Letters*, 101(25), 258302.
11. Pignon, F., Magnin, A., Piau, J. M., Cabane, B., Lindner, P., & Diat, O. (1997). Yield stress thixotropic clay suspension: Investigations of structure by light, neutron, and x-ray scattering. *Physical Review E*. 56(3), 3281.

Example 3

Three dimensional (3D) printing technology, a fabrication approach to make parts without the need for part-specific tooling, has enabled a high degree of freedom in design for manufacturing and received increasing attention in various fields[1]. Of available 3D printing technologies[1], material extrusion is widely implemented due to its easy implementation and high efficiency, in particular, in the field of tissue engineering[2-4]. However, the adoption of material extrusion for bioprinting applications is still constrained by the need for rapid solidification of build material inks in order to ensure the shape fidelity of printed structures. Thus, it continues to require innovation in extrusion-related ink development as well as technology improvement.

For extrusion bioprinting of hydrogel structures, two methodologies have been developed: self-supporting in situ rapid solidification and support-bath enabled fabrication. For the former methodology, different stimuli are introduced to induce rapid solidification of deposited hydrogels in situ, such as temperature change for temperature sensitive hydrogels[5-7], which is similar to fused deposition modeling (FDM) 8, ultraviolet (UV) radiation for UV curable hydrogels[9, 10], and ionic solutions for ion reactive hydrogels[11, 12] Since rapid solidification is required to keep the shape as extruded, materials selection is constrained by available crosslinking mechanisms. In addition, the achievable geometry is limited due to the lack of supporting structures, and nozzle clogging may become an issue due to the short standoff distance during extrusion. For the latter methodology, deposited structures are supported by a support bath, and the supporting mechanisms can be buoyance-based by using hydrophobic fluids[13], entrapment-based by using various hydrogel matrices[14, 15] or hydrogel particles[16], and yield stress fluid-based by using thixotropic yield stress materials[17, 18]. As needed, the deposited structures can be gelled either during deposition[15, 16] or after deposition[17, 18] with various crosslinking mechanisms. While the support-bath enabled fabrication methodology provides a feasible approach for the printing of some hydrogel materials, the post-printing removal of support bath is sometimes not practical. Considering the shortcomings of the aforementioned two methodologies, it would be ideal to extrude a structure without the constraint of rapid solidification or the requirement of a support bath.

Herein, we report a nanoclay-enabled "printing-then-crosslinking" approach for the printing of 3D hydrogel composite structures without any support bath. The hydrogel ink is prepared by mixing various hydrogel precursor build materials with a thixotropic shear-thinning nanoclay colloid, which functions as a self-supporting internal scaffold material. Both nanoclay and nanoclay-based composite hydrogel colloids are capable of recovering nanoclay's unique self-supporting "house-of-cards" structure and gel state right upon deposition. During printing, a hydrogel composite structure retains its shape in air as deposited since the nanoclay additive provides necessary mechanical strength to keep its structural integrity. As such, there is no need for rapid solidification of printed hydrogel in order to retain its shape even when no additional support structure or bath is available. Once printed, the hydrogel precursor throughout the whole composite structure is available for further cross-linking as needed, and the entire process can be described as a "printing-then-crosslinking" approach.

Nanoclay Colloid Preparation and Hydrogel Composite Synthesis

Both Laponite RD and XLG (BYK Additives Inc., Gonzales, Tex.) were used in this study. Laponite RD was used to prepare the nanoclay colloid for mechanical stress analysis and complex structure fabrication. Specifically, 6.0% (w/v) Laponite RD was prepared by dispersing the appropriate amount of dry Laponite RD powder in deionized (DI) water with continuous mixing, which was continued for a minimum of 60 minutes to ensure thorough hydration of Laponite powder, stored in the dark in sealed containers to prevent degradation and evaporation, and aged for one day before use. For mechanical stress analysis, black dye was added to the prepared Laponite colloid to enhance the visibility. Due to its high purity and certified low heavy metal content, Laponite XLG powder was mixed with applicable hydrogel precursors to prepare hydrogel composites for cell related studies, and Laponite XLG was prepared per the same protocol for Laponite RD.

For the preparation of PEGDA-Laponite colloid, poly (ethylene glycol) diacrylate (PEGDA) solutions were prepared by mixing stock PEGDA (M. 700, Sigma-Aldrich, St. Louis, Mo.) with DI water at the three different concentrations (5.0%, 10.0%, and 15.0% (v/v)) and then dissolving 1.0% (w/v) Irgacure 2959 (I-2959, Ciba, Basel, Switzerland) as the photoinitiator. Laponite powder (RD or XLG) was added at 6.0% (w/v) into the PEGDA solutions with continuous stirring to ensure thorough hydration of the Laponite powder. Specifically, PEGDA-Laponite colloid consisting of 10.0% (v/v) PEGDA and 6.0% (w/v) Laponite RD was used for the printing of the cup and the three-layered tubular structures; PEGDA-Laponite colloid consisting of 10.0% (v/v) PEGDA and 6.0% (w/v) Laponite XLG was used for the cell-related studies including the printing of the hydrogel composite sheet and scaffold; and PEGDA-Laponite colloid has 6.0% (w/v) Laponite RD and 5.0% (v/v), 10.0% (v/v) and 15.0% (v/v) PEGDA respectively were used to cast samples for compression testing.

For the preparation of alginate-Laponite colloid, 0.5% (w/v) sodium alginate (NaAlg) (Alginic acid sodium salt, Acros Organics, Waltham, Mass.) solution was prepared by dispensing the appropriate amount of alginate powder in DI water and mixing thoroughly. Then the appropriate amount of Laponite RD powder was dispersed in the NaAlg solution with continuous stirring to ensure thorough hydration of Laponite powder to generate the NaAlg-Laponite hydrogel precursor colloid. The colloid consisting of 0.5% (w/v) NaAlg and 6.0% (w/v) Laponite RD was used to cast compression testing samples. For better visibility, it was also supplemented with black dye to print the cup and the triple-walled tubular structures. In addition, 12.0% (w/v) NaAlg solution was also prepared similarly for the study of its ability to form a free-standing structure in air.

For the preparation of gelatin-Laponite colloid, 20.0% (w/v) gelatin (Type A, 300 bloom, from porcine skin, MP Biomedicals, Solon, Ohio) was prepared by dispensing the appropriate amount of gelatin powder in DI water at 50° C. with continuous stirring for 60 minutes. Gelatin-Laponite hydrogel precursor colloid was prepared by diluting stock Laponite RD (12.0% (w/v)) at 1:1 (v/v) with aqueous stock gelatin solution (20.0% (w/v)) and mixing thoroughly at 50° C. The resulting colloid consisted of 10.0% (w/v) gelatin and 6.0% (w/v) Laponite RD and was used to cast compression testing samples. For better visibility, it was also supplemented with yellow dye to print the cup and triple-walled tubular structures.

Printing System and Printing Protocols

The extrusion system was a micro-dispensing pump machine (nScrypt-3D-450, nScrypt, Orlando, Fla.), and all printing was conducted in ambient conditions. For gelatin-Laponite printing, the ink reservoir temperature of 50° C. was maintained using a heating tape (SRT051-020, Omega, Stamford, Conn.) with temperature control accuracy of ±0.1° C., a temperature controller (CSi32J-C24, Omega, Stamford, Conn.), and a thermocouple probe (JMQSS-040U-6, Omega, Stamford, Conn.). For PEGDA-Laponite printing, a UV curing system (OmniCure Series 2000, wavelength: 320-500 nm, Lumen Dynamics, Mississauga, ON, Canada) was used to cure the deposited structures.

A 25 gauge (250 µm inner diameter) dispensing tip (EFD Nordson, Vilters, Switzerland) was used to fabricate the Laponite and Laponite-based composite structures with a layer height of 200 µm. The printing pressure was between $1.52 \times 10^5$ Pa (22 psi) and $1.72 \times 10^5$ Pa (25 psi), and the path speed was 1.0 mm/s, except 0.75 mm/s for the outer ring printing of the concentric cannular structure. Specifically, for PEGDA-Laponite printing, the printed structures were exposed to UV light for 10 minutes for crosslinking. For NaAlg-Laponite printing, the printed structures were submerged in a 2.0% (w/v) $CaCl_2$ bath for 30 minutes for crosslinking. For gelatin-Laponite printing, the printed structures were passively cooled down to room temperature for crosslinking.

Rheological Property Measurement

Rheological properties of nanoclay colloids (Laponite RD and XLG) and composite hydrogel precursor colloids (PEGDA-Laponite, NaAlg-Laponite, and gelatin-Laponite) were measured using a rheometer (ARES LS1, TA, New Castle, Del.) with a cone-plate measuring geometry (a diameter of 50 mm, a cone-to-plate gap distance of 46 µm, and a cone angle of 2.64°).

To quantitatively determine the yield stress, steady rate sweeps were conducted by varying the shear rate from 0.01 to 100/s. To evaluate the thixotropic response time of both the nanoclay and composite hydrogel precursor colloids, transient step shear rate tests were performed by pre-shearing the samples for 5 seconds and then decreasing the shear rate to 0, and the viscosity variance was recorded during the following 5 seconds. To explore the degree of fluid-like behavior in the composite hydrogel precursor colloids, 0.1-100 rad/s frequency sweeps were performed at a low strain of 1.0% for the composite hydrogel precursor colloids.

Compression Testing

Mechanical properties of hydrogels (PEGDA, NaAlg, and gelatin) and hydrogel composites (PEGDA-Laponite, alginate-Laponite, and gelatin-Laponite) were determined using a mechanical tester (eXpert 4000, Admet, Norwood, Mass.). A uniaxial unconfined compression test was performed on the cast cylindrical samples (Φ9.5 mm×8.5 mm) at a strain rate of 1.0 mm/min. The stress-strain curve was determined based on the load and displacement data and the geometry of samples, and the compressive modulus was calculated from the slope of the determined stress-strain curve. Cyclic compression tests consisting of five cycles of loading and unloading at a strain rate of 1.0 mm/min were performed, and the energy dissipated during cyclic loading was calculated from the area under the stress-strain curves over the range of applied strain values.

Degradation Test

All hydrogels (PEGDA, NaAlg, and gelatin) and hydrogel composites (PEGDA-Laponite, alginate-Laponite, and gelatin-Laponite) samples (09.5 mm×5.0 mm) were cast and incubated in DMEM on a 37° C. shaker. Degradation rate was determined by monitoring their mass loss over 7 days, and the degradation percentage was calculated as follows:

$$\text{Degradation percentage} = \left(\frac{M_0 - M_f}{M_0}\right) \times 100$$

where $M_0$ is the initial mass of samples, and Mf is the final mass after each testing period.

In Vitro Cell Studies

NIH 3T3 mouse fibroblasts (ATCC, Rockville, Md.) were cultured in Dulbecco's Modified Eagles Medium (DMEM) (Sigma Aldrich, St. Louis, Mo.) supplemented with 10.0% Fetal Bovine Serum (FBS) (HyClone, Logan, Utah) in a humidified 5.0% $CO_2$ incubator at 37° C. The PEGDA-Laponite XLG sheet substrates (6.0 mm diameter and 0.4 mm thickness) were printed by the proposed direct-write approach and then autoclaved and soaked in DMEM complete cell culture medium with 1.0% penicillin and streptomycin (Sigma Aldrich, St. Louis, Mo.) for 30 minutes before seeding cells. Fibroblasts were trypisinized and seeded onto the sheets at a density of 20,000 cells/sheet in DMEM complete cell culture medium with 1.0% penicillin and streptomycin. Cell culture medium was removed 24, 48, and 72 hours after cell seeding, and the hydrogels were washed twice with PBS. Then, PBS containing a final concentration of 10.0 µg/mL fluorescein diacetate (FDA) (Sigma Aldrich, St. Louis, Mo.) and 10.0 µg/mL Hoechst 33342 (Sigma Aldrich, St. Louis, Mo.) was added to the sheets, and they were incubated in the dark for 5 minutes at room temperature. The seeded sheets were imaged using the transmitted, green fluorescent, and blue fluorescent channels of a fluorescence microscope (EVOS FL, ThermoFisher Scientific, Waltham, Mass.) at 10× magnification. For metabolic activity testing, a density of 400 cells/sheet were seeded, and these cells were analyzed using the alamarBlue assay (ThermoFisher Scientific, Waltham, Mass.) on Days 1, 2, 3, 7, and 10 per the manufacturer's protocol. The fluorescent intensity was recorded using a fluorescence microplate reader (Synergy HT, Biotek, Winooski, Vt.) to obtain the percent reduction in alamarBlue.

Statistical Analysis

All quantitative values in the text and figures were reported as means±standard deviation (SD) with n=3 samples per group. Statistical analysis was performed using analysis of variance (ANOVA) and p-values of less than 0.05 were considered statistically significant.

Results and Discussion

Laponite Nanoclay as a Self-Supporting Internal Scaffold Material for 3D Printing Laponite nanoclay or nanosilicate ($Na_{0.7}Si_8Mg_{5.5}Li_{0.3}O_{20}(OH)_4$) is a type of hydrous sodium lithium magnesium silicate, which consists of nanoscale platelets/discs, approximately 1 nm in thickness and 25 nm in diameter with positive and negative charges on the nanosilicate edge and faces, respectively as shown in FIG. 3.1A. The presence of the positive and negative charges results in unique anisotropic interactions between the nanoparticles and allows nanosilicates to interact with anionic, cationic and neutral polymers by physical interactions[19-21]; in addition, as shown in the inset of FIG. 3.1A functional groups such as hydroxyl on the crystal of nanosilicates result in chemical interactions with polymers by covalent bonds, hydrogen bonds, or coordinate bonds[22, 23]. When dispersed in water, sodium ions dissociate from individual platelets, leaving the faces of each platelet negatively charged; hydroxide ion dissociation at the edge results in a slightly positive charge. This charge distribution drives Laponite platelets to adopt a stable "house-of-cards" arrangement as an aqueous Laponite colloid equilibrates as shown in FIG. 3.1B, resulting in a transparent colloidal suspension with a yield stress as shown in FIG. 3.1C. This yield stress is a result of the threshold energy required to disrupt the "house-of-cards" structure before the suspension flows as described by the Herschel-Bulkley model: $\tau=\tau_0+k\dot{\gamma}^n$, where $\tau$ is the shear stress, $\dot{\gamma}$ is the shear rate, $\tau_0$ is the yield stress, k is the consistency index, and n is the flow index. If $\tau<\tau_0$, the nanoclay colloidal suspension behaves as a solid, otherwise it behaves as a fluid[24]. The observed shear-thinning behavior also confirms that the Laponite colloid is an extrudable material.

When the applied stress falls below the yield stress, nanoclay colloidal suspension recovers to the "house-of-cards" arrangement. Such time-dependent structural change is termed as thixotropy which enables Laponite colloids to be a potential self-supporting material for printing applications. To investigate the thixotropic behavior of Laponite colloids, transient step shear rate tests are performed by pre-shearing the Laponite samples for 5 seconds (to ensure the Laponite colloids are in the sol state) and then decreasing the shear rate to 0/s (to let the Laponite colloids transit to the gel state); the viscosity is recorded during the 5 seconds immediately following the shear rate reduction. The measured data is shown in FIG. 3.1D. As seen from FIG. 3.1D, it is further found that by pre-shearing the two common Laponite nanoclay colloids (RD and XLG), their viscosities are relatively low (~30 Pa·s) at a given 10/s shear rate due to the shear-thinning effect; after decreasing the shear rate to 0, their viscosities increase rapidly to ~3×10$^6$ Pa·s (five orders higher) within 0.08 second to resume their gel state with the "house-of-cards" arrangement. We herein define the time for them to transit from the liquid to gel/solid state as the thixotropic response time, which is close to 0.08 second for both the two RD and XLG colloids. This indicates that the Laponite nanoclay colloids can revert to the gel state within a short period of time after the removal of applied shear. In the gel state, the Laponite colloids can effectively retain their shape as given. This thixotropic property makes the Laponite colloids printable in air.

Mechanism of Laponite Nanoclay-Enabled Self-Supporting Printing Approach

This interesting liquid to gel/solid transition behavior of the Laponite nanoclay colloids has been further explored for direct-write applications. We first explore the feasibility of the Laponite colloids as a self-supporting extrudable scaffold material during printing. As shown in FIG. 3.1E, a nanoclay colloid being deposited (top) can have three phases (bottom). When the applied pressure is higher than the yield stress of the Laponite colloid in the nozzle, the colloid experiences three different phases sequentially. Firstly, its "house-of-cards" structure is disrupted, and the Laponite nanoclay gel liquefies to readily flow out of the nozzle (bottom left). When the nanoclays are deposited atop a substrate or a previously printed layer, the disturbed and disordered nanoclays revert to a gel state as they rapidly recover the "house-of-cards" structure (bottom center). When the nanoclays return to the "house-of-cards" arrangement, the extruded colloid solidifies (bottom right). Finally, each deposited layer connects with adjacent layers and mechanically supports the whole printed feature, as long as the maximum gravity-induced stress is lower than its yield stress.

It is Laponite's ability to recover its "house-of-cards" structure and gel state right after deformation that results in a unique self-supporting capability upon deposition, which enables its use for 3D printing. The sol-gel transition time of Laponite suspensions after extrusion (FIG. 3.1E) can be roughly characterized based on the thixotropic response time, which is on the order of 0.1 second for both the two RD and XLG colloids as shown in FIG. 3.1D. Such a short sol-gel transition time is sufficiently short for various 3D printing applications. To further appreciate the self-supporting printing capability of Laponite suspensions, a Laponite suspension (6.0% (w/v)) and a high-concentration (12.0% (w/v)) sodium alginate (NaAlg) solution are printed in air, and their ability to form a free-standing structure is compared. It is noted that the high viscosity itself of a build material ink, which is higher than ~32 Pa·s for the 12.0% (w/v) NaAlg solution herein, cannot guarantee printing-in-air performance similar to that of Laponite suspensions. Instead, it is the yield-stress property and thixotropic behavior that enables Laponite suspensions as a versatile scaffold material for direct printing in air.

Assessment of Laponite Nanoclay-Enabled Self-Supporting Printing Approach

The self-supporting capability of Laponite nanoclay features has been investigated by studying the deflection degree of spanning Laponite beams. As shown in FIG. 3.2A, when the span increases, the deflection of the beams increases from negligible to a few millimeters. Each beam can be analyzed as a simply supported beam with a uniformly distributed weight-induced load as shown in FIG. 3.2B. Thus, the maximum shear stresses at the supporting points A and B can be estimated as $$\tau_{max} = \frac{V_{max} Q}{Ib},$$

where $\tau_{max}$ is the maximum shear stress, $V_{max}$ is the maximum shear force, Q is the first moment of the cross-sectional area, I is the moment of inertia, b is usually the beam width and herein equals to 2R, and R is the beam radius. The maximum tensile stress occurs at the midspan and can be estimated as $$\sigma_{max} = \frac{M_{max} y}{I},$$

where $\sigma_{max}$ is the maximum tensile stress, $M_{max}$ is the maximum bending moment, and y is the distance from the neutral axis to the evaluated surface, which equals to R for a beam with a circular cross section. In order to justify whether yielding or deformation will happen, the estimated maximum shear and tensile stresses should be compared with the shear and tensile yield stress of the Laponite colloids, which are estimated as 337.5 and 715.5 Pa based on the fitting of the Herschel-Bulkley model. For example, for Beam 1, its maximum shear and tensile stresses are 37.0 and 559.5 Pa, respectively, both are smaller than the respective yield stresses, indicating that Beam 1 can support itself and remain as a straight beam in air. For some large-span beams (such as Beams 4 to 6), they deform and deflect noticeably by 0.85, 1.69, and 1.95 mm, respectively, which closely matches the predicted deflections of 0.80, 1.70, and 2.43 mm, respectively. This deflection predictability can direct design and fabrication of Laponite-based structures by understanding the permissible design space. In addition, some mechanical properties such as the Young's modulus calculated based on the beam deflection can be used to estimate deformation of printed structures by either simulation or theoretical calculation; such deformation can be compensated as needed by optimizing the design of structures and the printing path.

Extruded filaments are the basic building blocks for 3D printing applications, so the effects of operating conditions including the nozzle size, standoff distance, dispensing pressure, and path speed on the filament diameter are further investigated. To evaluate the resolution of Laponite structures fabricated by the proposed approach, various Laponite filaments are printed on a glass slide with different nozzles. It is found that all the Laponite filaments with different diameters have a smooth boundary and no irregular spreading is observed, which is attributed to the very short sol-gel transition time (thixotropic response time on the order of 0.1 second as seen from FIG. 3.1D).

To further demonstrate the feasibility of the Laponite nanoclay-enabled printing approach, we fabricate several complex structures using the Laponite nanoclay colloid only. FIG. 3.2C shows a pyramid structure with a length of 8.0 mm, a width of 6.0 mm, and a height of 4.0 mm. All four pyramid edges are well-defined, showing that the surface tension effects observed in the traditional extrusion-based liquid material printing approach can be eliminated by the proposed approach. To illustrate the self-supporting capability of the proposed printing method, FIG. 3.2D shows a self-supporting spanning bridge structure with a length of 17.6 mm, a width of 5.0 mm, a height of 8.0 mm, and an inclination angle of 45°, FIG. 3.2E shows an overhanging Z-shaped tubular structure with a mean diameter of 4.0 mm, a height of 12.0 mm, and an overhang inclination angle of 45°, and FIG. 3.2F shows a cup structure with a well-defined shape (a total height of 7.0 mm and a rim diameter of 4.8 mm). After filling the FIG. 3.2F cup with deionized water, no leaking is observed, demonstrating that all deposited layers connect well as a seamless structure. The 3D models and 3D printed structures are compared to demonstrate the print fidelity of Laponite structures and further verify that Laponite is an effective self-supporting material to maintain its shape in air after deposition.

To explore the 3D printing limitations of the proposed approach, inclined tubular structures with different inclination angles (30°, 450 and 60°) are printed as shown in the insets of FIG. 3.2G. Due to the gravity effect, an inclined tube may deform when the maximum stress of the tube is larger than the yield strength. The maximum stress is a function of the tube geometries including the height, inclination angle, and inner and outer radii. Herein, we define the achievable maximum height for a given inclination angle as the height above which a tubular structure is statically instable. FIG. 3.2G shows the achievable maximum height as a function of inclination angle based on our printing experiments. Furthermore, finite element analysis (FEA) is performed to assess the maximum stress along the tubes with different inclination angles, and the estimated maximum height values are compared with the experimental values. As seen from FIG. 3.2G, there is a good match between the predicted and experimental value while the experimental values are slightly lower than the theoretical ones due to possible material inhomogeneity of the printed tubes. After investigating the rheological properties and self-supporting properties of Laponite nanoclay only colloids, Laponite nanoclay is mixed with some hydrogel precursors to expand applications of the proposed fabrication approach.

Mixing of Laponite Nanoclays with Representative Hydrogels

Furthermore, the Laponite nanoclay liquid-gel transition inspired direct-write approach is extended to print hydrogel precursor-based soft composite hydrogel structures by adding Laponite nanoclay as a scaffold material into various hydrogel precursors. Specifically, a hydrogel precursor is first mixed with Laponite nanoclay to make an ink to be deposited. During printing, the demonstrated self-supporting capability of Laponite nanoclay enables the deposited structure to retain its shape as deposited without any additional support. The hydrogel precursor is not crosslinked until the whole structure is fabricated, which is a "printing-then-crosslinking" approach as mentioned before.

It is noted that there is a need for and are various applications of Laponite nanoclay-based hydrogel composites. As an inorganic biomaterial, silicate-based nanoclay has already been mixed with various polymeric hydrogels, both synthetic[25-30] and natural[19, 31-33]. The introduction of nanoclays into various polymeric hydrogels typically results in soft composites with higher mechanical strength, improved elasticity and rheological properties, and enhanced biological activities[22, 25, 28-30, 33-37]. Relevant applications of such soft composites include medical diagnostic and therapeutic devices, controlled drug delivery devices, biomedical imaging, and regenerative medicine[19, 27-29, 31-33, 38-40].

Depending on crosslinking mechanisms, hydrogels can be divided into two main classes: 1) chemically crosslinked hydrogels, formed by covalent networks, and 2) physically crosslinked hydrogels, formed by dynamic and reversible crosslinking of synthetic or natural building blocks based on noncovalent interactions. To test the self-supporting Laponite nanoclay as a type of scaffold material for hydrogel composite printing, we have selected three hydrogel precursors for fabrication studies based on three different crosslinking mechanisms. The first one is poly (ethylene glycol) diacrylate (PEGDA), an ultraviolet (UV) curable hydrogel, as an exemplary chemically crosslinked hydrogel, the second one is NaAlg, an ionically crosslinked hydrogel, and the third one is gelatin, a thermosensitive hydrogel; both NaAlg and gelatin are exemplary physically crosslinked hydrogels. These hydrogel composites are suitable for a broad array of applications in tissue engineering, such as PEGDA-Laponite for bone tissue engineering and biomedical applications[28], alginate-Laponite for cartilage and/or bone tissue regeneration[33], and gelatin-Laponite as a hemostatic agent[19]. By mixing with Laponite to prepare the hydrogel composites, soft hydrogel composite structures can be printed directly in air, and Laponite nanoclay functions as an internal scaffold material while the hydrogel precursors function as the polymer phase as shown in FIG. 3.3A.

In addition to different crosslinking mechanisms, the Laponite interaction mechanisms with PEGDA, NaAlg, and gelatin are different. When mixed with PEGDA, physical gels are formed due to enhanced interactions between Laponite nanosilicates and polymer chains; nanosilicates serve as multi-functional crosslinkers through secondary interactions with ethylene oxide on PEGDA polymer chains[25, 28, 41] as shown in FIG. 3.3B. When mixed with NaAlg, gels are formed by physical bonding, including hydrogen bonding as well as van der Waals and ionic interactions between nanosilicate fillers and the alginate molecular network[42-44] as shown in FIG. 3.3C. When mixed with gelatin, the polyampholytic gelatin, containing positive and negative regions, can strongly interact with the oppositely charged regions (FIG. 3.1A) of nanosilicates and form gels with the yield-stress behavior[45] as shown in FIG. 3.3D. Fortunately, since all these interactions between nanosilicates and aforementioned representative hydrogel molecular chains are physical in nature and do not interfere with Laponite's "house-of-cards" arrangement, the resulting composite hydrogel precursor colloids inherit the yield-stress behavior of Laponite colloids. This is demonstrated by the rheology tests to quantify the storage and loss moduli (FIG. 3.3E), yield-stress behavior (FIG. 3.3F), and thixotropic response time (FIG. 3.3G), indicating that these composite hydrogel precursor colloids have good printability and shape controllability comparable to Laponite colloids. That is, Laponite-based hydrogel composite colloids still retain the unique rheological properties of Laponite and are able to recover to Laponite's "house-of-cards" structure and gel state after deformation, enabling the self-supporting printing of hydrogel composites as demonstrated during filament printing.

Printing of Self-Supporting Hydrogel Composite Structures

Furthermore, the prepared PEGDA-Laponite, NaAlg-Laponite, and gelatin-Laponite composite hydrogel precursor colloids are extruded to form a cup with a curved contour (FIGS. 3.3B-D), respectively, without any additional support structure. Different dyes are added for better visibility. Only after a whole cup is deposited, the printed structure is further gelled by applying a suitable crosslinking stimuli, that is, UV radiation-initiated gelation, $CaCl_2$) solution-based ionic gelation, and decreased temperature-induced gelation, respectively, as shown in FIGS. 3.3B-D, which is again a "printing-then-crosslinking" approach. The 3D cup model and 3D printed and crosslinked composite hydrogel cups were compared, demonstrating the print fidelity of the hydrogel composite structures and that as a scaffold material Laponite effectively preserves the shape of the hydrogel composites in air as deposited.

In order to demonstrate that the proposed fabrication approach is suitable for fabrication of heterogeneous structures, a triple-walled tube consisting of differently dyed NaAlg-Laponite, gelatin-Laponite, and PEGDA-Laponite is printed from inside to outside. The tube has a height of 4.0 mm, an inner-layer diameter of 4.0 mm, an intermediate-layer diameter of 6.0 mm, and an outer-layer diameter of 8.0 mm. Then the triple-walled tube (FIG. 3.3H) is solidified by using appropriate mechanisms. As observed, different dyes do not diffuse through the interfaces into any adjacent wall during printing or after solidification, and the interfaces between any adjacent walls are clearly distinguishable. In addition, a concentric cannular PEGDA-Laponite structure is printed and UV cured as shown in FIG. 3.3I. As measured, the printed structure has an inner tube diameter of 5.0 mm, inner tube wall thickness of 0.9 mm, outer tube diameter of 11.8 mm, outer tube wall thickness of 1.6 mm, and height of 8.2 mm. Such a cannular structure can be used for various cell culture applications, and it can hold typical cell culture medium very well.

It is noted that the effects of water loss or excessive water on the geometry stability of printed structures during printing should be investigated in order to understand the general applicability of this process. To assess the effects of water loss during printing, filaments made of Laponite and PEGDA-Laponite are printed on a petri dish, and the widths of Laponite filaments, and gelled and ungelled PEGDA-Laponite filaments are monitored in the next 180 minutes; to assess the effects of excessive water during printing, Laponite and gelled PEGDA-Laponite filaments are submerged in deionized water for 180 minutes, and their widths are monitored accordingly. The filament widths only decrease or increase slightly during 180-minute observation, demonstrating that the proposed fabrication approach can be used for time-consuming structure fabrication.

It should be pointed out that Laponite has been used as a physical crosslinker, which is also sometimes viewed as a rheological additive, to make printable/injectable inks for various fabrications processes[46-48] instead of being a scaffold material as proposed in this study. Laponite was used to retain the shape of printed filaments[48], however, it was not further explored for the freeform fabrication of 3D structures. For 3D printing studies[46, 47], various crosslinking approaches were applied to solidify their structures during printing such as the use of $CaSO_4$ as the pre-crosslinker[46] and UV radiation[47]. In essence, these Laponite-based printing studies are examples of the "crosslinking-while-printing" approach, which is fundamentally different from the proposed "printing-then-crosslinking" approach herein.

Effects of the Nanoclay on Hydrogel Composite Mechanical Properties

It is also found that the addition of nanoclays can enhance the mechanical properties of hydrogel composites due to the interaction between the polymeric matrix and nanosilicates. The microstructure of Laponite-based hydrogel composites has been well studied elsewhere[33], so this study does not attempt to duplicate prior work. Instead, the Young's modulus of hydrogels and their hydrogel-Laponite composite counterparts are measured using uniaxial compression testing to quantify the effects of nanoclay on the composite mechanical stiffness. As shown in FIG. 3.4A, the addition of 6.0% (w/v) Laponite nanoclay results in a significant increase in the Young's modulus of each hydrogel-Laponite composite: 1.9-fold increase for the PEGDA-Laponite composite, 7.4-fold increase for the alginate-Laponite composite, and 3.3-fold increase for the gelatin-Laponite composite. Such an increase is attributed to the anisotropic, plate-like, and high aspect-ratio morphology of the nanoclay, which results in high surface interactions between the hydrogel polymer and the nanosilicate[38, 47]. By comparing PEGDA hydrogel precursors with different concentrations, it is observed that the lower the hydrogel concentration, the more sensitive the composite Young's modulus and fracture strength are to the addition of nanoclays. Cyclic compression testing is also performed to investigate the effect of nanoclay on the elastomeric behavior of hydrogel composites. Since the stress-strain curves are hysteretic under cyclic loadings (in particular hysteresis loops during hydrogel composite testing), energy dissipated during each loading cycle is calculated from the area under the stress-strain curves over the range of applied strain values, and the sum of them is the total energy dissipated. The variation of dissipated energy due to Laponite nanoclay during cyclic loading can be seen in FIGS. 3.4B-C, illustrating the capability of energy absorption of each specimen during deformation. We find that the addition of nanoclay can significantly increase the energy dissipation of the PEGDA, alginate, and gelatin hydrogel composites. This is because the crosslinking between hydrogel polymer chains generally leads to the formation of elastic networks; whereas the addition of nanosilicates introduces physical interactions among nanoclay particles and hydrogel polymer chains, resulting in the viscoelastic property of hydrogel composites and increased energy dissipation due to damping. Specifically, the physical interactions between the nanosilicate and hydrogel may rebuild themselves time-dependently during deformation, which causes extra energy dissipation[33, 47].

Effects of the Nanoclay on Hydrogel Composite Biological Properties

Such hydrogel composites find wide applications in the biomedical field for their good capability to support cellular activities. Herein NIH 3T3 mouse fibroblasts are used to investigate the effect of nanoclay on the cell adhesion and proliferation on a printed PEGDA-Laponite structure. As seen from FIGS. 3.5A and 3.5B, the cells adhere and survive well on the surface of 3D printed hydrogel composite scaffold and hydrogel composite sheet after 3-day incubation. Specifically, living fibroblasts are stained in green while dead fibroblasts are in blue. The observed good cell adhesion can be explained by easy protein (including adhesion proteins such as vitronectin and fibronectin) adsorption onto the surface of nanosilicates as well as focal points for cell adhesion provided by nanosilicates 49. The cell morphology indicates that the hydrogel composite is cytocompatible and does not elicit any cytotoxic effect. In addition, alamarBlue reduction testing is performed to quantify the metabolic activity of cultured cells after 1, 2, 3, 7, and 10 days over PEGDA-Laponite sheets and conventional tissue culture polystyrene (TCPS) dishes. As shown in FIG. 3.5C, the hydrogel composite supports better cell proliferation compared with the TCPS dishes over a 7-day incubation period, indicating that the composite hydrogels used for nanoclay-enabled printing approach are cytocompatible as previously reported[47, 50, 51]. A systematic long-term cell-related investigation should be performed to further elucidate the mechanism regarding the effects of Laponite nanoclay on the cell growth and proliferation.

For some biomedical applications, the degradation rate of hydrogel composites is also of interest. The degradation rates of the hydrogels (PEGDA, alginate, and gelatin) and the corresponding hydrogel composites are evaluated by monitoring mass loss over a 7-day period. As shown in FIG. 3.5D, while there is no noticeable degradation rate difference between the PEGDA and PEGDA-Laponite structures, the alginate and gelatin hydrogel composites show improved stability during incubation, which can be explained by the stable physical interactions between the nanosilicate and hydrogel polymeric chains. The enhanced stability of printed alginate and gelatin constructs is usually desirable in order to give enough time for cell proliferation and tissue fusion since pure alginate or gelatin constructs degrade or dissolve too fast during incubation as seen from FIG. 3.5D. Specifically, mixing gelatin with Laponite can effectively increase the gel-sol transition temperature from 32° C. for gelatin alone to a much higher temperature for the gelatin-Laponite composite, (e.g. above 45° C. for gelatin-Laponite composites with Laponite solid concentrations of 6.0% (w/v) or greater[19]), enabling gelatin-Laponite constructs to be usable under in vivo conditions[19], without requiring chemical crosslinking.

Conclusions

In summary, we report a Laponite nanoclay-enabled "printing-then-crosslinking" direct-write approach, which can be applied to fabricate various hydrogel composite structures without the need for a support bath. Since Laponite effectively helps provide structural support and retain the shape of structures as deposited during printing, crosslinking of the whole structure can be delayed until printing is complete. This direct-write approach greatly broadens the range of materials suitable for extrusion-based 3D printing by blending Laponite nanoclays into applicable polymer precursors, which are hydrophilic and have no detrimental chemical interaction with Laponite. The addition of nanoclays can not only facilitate the printing of various hydrogel precursors, but also improve the mechanical properties of printed structures. The cytocompatibility and degradation resistance of Laponite-based hydrogel composites enables them to be widely used in vivo and in vitro. The proposed approach can certainly be extended to the fabrication of non-biological structures, such as electronic devices, soft robots, microfluidic devices, etc. Since Laponite nanoclay colloids are hydrophilic materials, it should be tuned to facilitate the printing of hydrophobic liquid build materials, which currently are not printable using the proposed approach. In addition, a real-time microscopy study will be needed in order to characterize the dynamic arrangement of Laponite platelets along the interface and elucidate the nature of interfacial contact between deposited Laponite layers.

References for Example 3

1. Huang, Y.; Leu, M. C.; Mazumder, J.; Donmez, A. Additive Manufacturing: Current State, Future Potential, Gaps and Needs, and Recommendations *J. Manuf. Sci. Eng.* 2015, 137, 014001.
2. Mironov, V.; Visconti, R. P.; Kasyanov, V.; Forgacs, G.; Drake, C. J.; Markwald, R. R. Organ Printing: Tissue Spheroids as Building Blocks *Biomaterials* 2009, 30, 2164-2174.
3. Ringeisen, B. R.; Pirlo, R. K.; Wu, P. K.; Boland, T.; Huang, Y.; Sun, W.; Chrisey, D. B. Cell and Organ Printing Turns 15: Diverse Research to Commercial Transitions *MRS Bull.* 2013, 38, 834-843.
4. Ozbolat, I. T.; Yu, Y. Bioprinting toward Organ Fabrication: Challenges and Future Trends *IEEE Trans. Biomed. Eng.* 2013, 60, 691-699.
5. Landers, R.; Hübner, U.; Schmelzeisen, R.; Mülhaupt, R. Rapid Prototyping of Scaffolds Derived from Thermoreversible Hydrogels and Tailored for Applications in Tissue Engineering *Biomaterials* 2002, 23, 4437-4447.
6. Fedorovich, N. E.; De Wijn, J. R.; Verbout, A. J.; Alblas, J.; Dhert, W. J. Three-Dimensional Fiber Deposition of Cell-Laden, Viable, Patterned Constructs for Bone Tissue Printing *Tissue Eng. Part A* 2008, 14, 127-133.
7. Chang, C. C.; Boland, E. D.; Williams, S. K.; Hoying, J. B. Direct-Write Bioprinting Three-Dimensional Biohybrid Systems for Future Regenerative Therapies *J. Biomed. Mater. Res. Part B* 2011, 98, 160-170.
8. Zein, I.; Hutmacher, D. W.; Tan, K. C.; Teoh, S. H. Fused Deposition Modeling of Novel Scaffold Architectures for Tissue Engineering Applications *Biomaterials* 2002, 23, 1169-1185.
9. Hockaday, L. A.; Kang, K. H.; Colangelo, N. W.; Cheung, P. Y. C.; Duan, B.; Malone, E.; Wu, J.; Girardi, L. N.; Bonassar, L. J.; Lipson, H.; Chu, C. C.; Butcher, J. T. Rapid 3D Printing of Anatomically Accurate and Mechanically Heterogeneous Aortic Valve Hydrogel Scaffolds *Biofabrication* 2012, 4, 035005.
10. Bertassoni, L. E.; Cardoso, J. C.; Manoharan, V.; Cristino, A. L.; Bhise, N. S.; Araujo, W. A.; . . . Khademhosseini, A. Direct-Write Bioprinting of Cell-Laden Methacrylated Gelatin Hydrogels *Biofabrication* 2014, 6, 024105.
11. Khalil, S.; Sun, W. Biopolymer Deposition for Freeform Fabrication of Hydrogel Tissue Constructs *Mater. Sci. Eng.: C* 2007, 27, 469-478.
12. Ozbolat, I. T.; Hospodiuk, M. Current Advances and Future Perspectives in Extrusion-Based Bioprinting *Biomaterials* 2016, 76, 321-343.
13. Campos, D. F. D.; Blaeser, A.; Weber, M.; Jäkel, J.; Neuss, S.; Jahnen-Dechent, W.; Fischer, H. Three-Dimensional Printing of Stem Cell-Laden Hydrogels Submerged in a Hydrophobic High-Density Fluid *Biofabrication* 2012, 5, 015003.
14. Wu, W.; DeConinck, A.; Lewis, J. A. Omnidirectional Printing of 3D Microvascular Networks *Adv. Mater.* 2011, 23, 178-183.
15. Highley, C. B.; Rodell, C. B.; Burdick, J. A. Direct 3D Printing of Shear-Thinning Hydrogels into Self-Healing Hydrogels *Adv. Mater.* 2015, 27, 5075-5079.
16. Hinton, T. J.; Jallerat, Q.; Palchesko, R. N.; Park, J. H.; Grodzicki, M. S.; Shue, H. J.; . . . Feinberg, A. W. Three-Dimensional Printing of Complex Biological Structures by Freeform Reversible Embedding of Suspended Hydrogels *Sci. Adv.* 2015, 1, 1500758.
17. Bhattacharjee, T.; Zehnder, S. M.; Rowe, K. G.; Jain, S.; Nixon, R. M.; Sawyer, W. G.; Angelini, T. E. Writing in the Granular Gel Medium *Sci. Adv.* 2015, 1, 1500655.
18. Jin, Y.; Compaan, A. M.; Bhattacharjee, T.; Huang, Y. Granular Gel Support-Enabled Extrusion of Three-Dimensional Alginate and Cellular Structures *Biofabrication* 2016, 8, 025016.
19. Gaharwar, A. K.; Avery, R. K.; Assmann, A.; Paul, A.; McKinley, G. H.; Khademhosseini, A.; Olsen, B. D. Shear-Thinning Nanocomposite Hydrogels for the Treatment of Hemorrhage *ACS Nano* 2014, 8, 9833-9842.
20. Gaharwar, A. K.; Mukundan, S.; Karaca, E.; Dolatshahi-Pirouz, A.; Patel, A.; Rangarajan, K.; . . . Khademhosseini, A. Nanoclay-Enriched Poly (e-caprolactone) Electrospun Scaffolds for Osteogenic Differentiation of Human Mesenchymal Stem Cells *Tissue Eng. Part A* 2014, 20, 2088-2101.
21. Wang, Q.; Mynar, J. L.; Yoshida, M.; Lee, E.; Lee, M.; Okuro, K.; . . . Aida, T. High-Water-Content Mouldable Hydrogels by Mixing Clay and a Dendritic Molecular Binder *Nature* 2010, 463, 339-343.
22. Du, J.; Xu, S.; Feng, S.; Yu, L.; Wang, J.; Liu, Y. Tough Dual Nanocomposite Hydrogels with Inorganic Hybrid Crosslinking *Soft Matter* 2016, 12, 1649-1654.
23. Haraguchi, K.; Takehisa, T. Nanocomposite Hydrogels: a Unique Organic-Inorganic Network Structure with Extraordinary Mechanical, Optical, and Swelling/Deswelling Properties *Adv. Mater.* 2002, 14, 1120-1124.
24. Coussot, P.; Raynaud, J. S.; Bertrand, F.; Moucheront, P.; Guilbaud, J. P.; Huynh, H. T.; . . . Lesueur, D. Coexistence of Liquid and Solid Phases in Flowing Soft-Glassy Materials *Phys. Rev. Lett.* 2002, 88, 218301.
25. Baghdadi, H. A.; Sardinha, H.; Bhatia, S. R. Rheology and Gelation Kinetics in Laponite Dispersions Containing Poly (ethylene oxide) *J. Polym. Sci. Part B: Polym. Phys.* 2005, 43, 233-240.
26. Chen, G. X.; Yoon, J. S. Clay Functionalization and Organization for Delamination of the Silicate Tactoids in Poly (L-lactide) Matrix *Macromol. Rapid Commun.* 2005, 26, 899-904.
27. Gaharwar, A. K.; Schexnailder, P.; Kaul, V.; Akkus, O.; Zakharov, D.; Seifert, S.; Schmidt, G. Highly Extensible Bio-Nanocomposite Films with Direction-Dependent Properties *Adv. Funct. Mater.* 2010, 20, 429-436.
28. Chang, C. W.; van Spreeuwel, A.; Zhang, C.; Varghese, S. PEG/Clay Nanocomposite Hydrogel: a Mechanically Robust Tissue Engineering Scaffold *Soft Matter* 2010, 6, 5157-5164.

29. Gaharwar, A. K.; Dammu, S. A.; Canter, J. M.; Wu, C. J.; Schmidt, G. Highly Extensible, Tough, and Elastomeric Nanocomposite Hydrogels from Poly (ethylene glycol) and Hydroxyapatite Nanoparticles *Biomacromolecules* 2011, 12, 1641-1650.
30. Wu, C. J.; Gaharwar, A. K.; Chan, B. K.; Schmidt, G. Mechanically Tough Pluronic F127/Laponite Nanocomposite Hydrogels from Covalently and Physically Cross-linked Networks *Macromolecules* 2011, 44, 8215-8224.
31. Fan, Q.; Shan, D.; Xue, H.; He, Y.; Cosnier, S. Amperometric Phenol Biosensor based on Laponite Clay-Chitosan Nanocomposite Matrix *Biosens. Bioelectron.* 2007, 22, 816-821.
32. Yang, H.; Hua, S.; Wang, W.; Wang, A. Composite Hydrogel Beads based on Chitosan and Laponite: Preparation, Swelling, and Drug Release Behaviour *Iran Polym J* 2011, 20, 479-490.
33. Ghadiri, M.; Chrzanowski, W.; Lee, W. H.; Fathi, A.; Dehghani, F.; Rohanizadeh, R. Physico-Chemical, Mechanical and Cytotoxicity Characterizations of Laponite®/Alginate Nanocomposite *Appl. Clay Sci.* 2013, 85, 64-73.
34. Schexnailder, P. J.; Gaharwar, A. K.; Bartlett, I. I.; Rush, L.; Seal, B. L.; Schmidt, G. Tuning Cell Adhesion by Incorporation of Charged Silicate Nanoparticles as Cross-Linkers to Polyethylene Oxide *Macromol. Biosci.* 2010, 10, 1416-1423.
35. Gaharwar, A. K.; Rivera, C. P.; Wu, C. J.; Schmidt, G. Transparent, Elastomeric and Tough Hydrogels from Poly (ethylene glycol) and Silicate Nanoparticles *Acta Biomater.* 2011, 7, 4139-4148.
36. Gaharwar, A. K.; Schexnailder, P. J.; Kline, B. P.; Schmidt, G. Assessment of using Laponite® Cross-linked Poly (ethylene oxide) for Controlled Cell Adhesion and Mineralization *Acta Biomater.* 2011, 7, 568-577.
37. Hosseini, H.; Tenhu, H.; Hietala, S. Rheological Properties of Thermoresponsive Nanocomposite Hydrogels *J. Appl. Polym. Sci.* 2016, 133, 43123.
38. Gaharwar, A. K.; Peppas, N. A.; Khademhosseini, A. Nanocomposite Hydrogels for Biomedical Applications *Biotechnol. Bioeng.* 2014, 111, 441-453.
39. Carrow, J. K.; Gaharwar, A. K. Bioinspired Polymeric Nanocomposites for Regenerative Medicine *Macromol. Chem. Phys.* 2015, 216, 248-264.
40. Paul, A. Nanocomposite Hydrogels: an Emerging Biomimetic Platform for Myocardial Therapy and Tissue Engineering *Nanomedicine* 2015, 10, 1371-1374.
41. Zebrowski, J.; Prasad, V.; Zhang, W.; Walker, L. M.; Weitz, D. A. Shake-Gels: Shear-Induced Gelation of Laponite-PEO Mixtures *Colloids Surf., A* 2003, 213, 189-197.
42. Loizou, E.; Butler, P.; Porcar, L.; Kesselman, E.; Talmon, Y.; Dundigalla, A.; Schmidt, G. Large Scale Structures in Nanocomposite Hydrogels *Macromolecules* 2005, 38, 2047-2049.
43. Loizou, E.; Butler, P.; Porcar, L.; Schmidt, G. Dynamic Responses in Nanocomposite Hydrogels *Macromolecules* 2006, 39, 1614-1619.
44. Schexnailder, P.; Schmidt, G. Nanocomposite Polymer Hydrogels *Colloid Polym. Sci.* 2009, 287, 1-11.
45. Pawar, N.; Bohidar, H. B. Surface Selective Binding of Nanoclay Particles to Polyampholyte Protein Chains *J. Chem. Phys.* 2009, 131, 45103.
46. Hong, S.; Sycks, D.; Chan, H. F.; Lin, S.; Lopez, G. P.; Guilak, F.; Zhao, X. 3D Printing of Highly Stretchable and Tough Hydrogels into Complex, Cellularized Structures *Adv. Mater.* 2015, 27, 4035-4040.
47. Xavier, J. R.; Thakur, T.; Desai, P.; Jaiswal, M. K.; Sears, N.; Cosgriff-Hernandez, E.; Gaharwar, A. K. Bioactive Nanoengineered Hydrogels for Bone Tissue Engineering: a Growth-Factor-Free Approach *ACS Nano* 2015, 9, 3109-3118.
48. Gladman, A. S.; Matsumoto, E. A.; Nuzzo, R. G.; Mahadevan, L.; Lewis, J. A. Biomimetic 4D Printing *Nat. Mater.* 2016, 15, 413-418.
49. Bettinger, C. J.; Langer, R.; Borenstein, J. T. Engineering Substrate Topography at the Micro- and Nanoscale to Control Cell Function *Angew. Chem., Int. Ed.* 2009, 48, 5406-5415.
50. Gaharwar, A. K.; Mihaila, S. M.; Swami, A.; Patel, A.; Sant, S.; Reis, R. L.; Khademhosseini, A. Bioactive Silicate Nanoplatelets for Osteogenic Differentiation of Human Mesenchymal Stem Cells *Adv. Mater.* 2013, 25, 3329-3336.
51. Mihaila, S. M.; Gaharwar, A. K.; Reis, R. L.; Khademhosseini, A.; Marques, A. P.; Gomes, M. E. The Osteogenic Differentiation of SSEA-4 Sub-Population of Human Adipose Derived Stem Cells using Silicate Nanoplatelets *Biomaterials* 2014, 35, 9087-9099.

Example 4

The disparity between increasing demand for transplantable human organs and significant shortage thereof motivates tissue engineering and regenerative medicine. Fortunately, layer-by-layer additive manufacturing-based organ printing[1] provides a promising solution to achieve the on-demand fabrication of three-dimensional (3D) human organ constructs to address this issue[2-6]. Of three commonly used bioprinting approaches[4-10], material extrusion, a continuous filament-based fabrication approach, is widely utilized due to its easy implementation, high efficiency in terms of greater deposition and printing speed, and wide range of extrudable materials[11]. During conventional extrusion bioprinting, each deposited layer is rapidly solidified in situ prior to the deposition of the next layer, which is a gelation-while-printing approach. While conventional extrusion bioprinting works for various applications[10, 12-13], it is limited by possible nozzle clogging due to the short standoff distance[11, 14] and weak interfacial strength between two sequentially deposited layers due to the phase change in the gelation process[14]. To address these challenges, a printing-then-gelation approach[14] has been proposed: the printed structure remains liquid during fabrication, and the structure is solidified only after the whole structure is completely printed.

The printing-then-gelation approach is mainly enabled by utilizing some complex fluids with a yield-stress property as the support bath material. Various support bath materials have been used for extrusion printing, such as hydrophobic fluids[15], various hydrogel matrices[16, 17] and hydrogel particles[18], and thixotropic yield-stress materials[14, 19-20] based on different supporting mechanisms from buoyancy-based[15], to entrapment-based[16-18], to yield-stress fluid-based[14, 19-20]. Thus far, only the yield-stress material has been explored for the printing-then-gelation concept[14] for complex 3D structure printing.

Since the extruded filament during extrusion printing is the basic building block to form complex 3D structures, the better understanding of filament formation process during extrusion is of great significance. During conventional extrusion, the filament formation process is mainly influenced by the surface tension and gravity in nature, and the effects of build material properties and operating conditions on the filament diameter have been well investigated[10, 21-24] However, during the yield stress material-enabled printing-then-gelation process[14], the effects of surface tension and gravity on filament formation are negligible. A filament being deposited during yield stress-enabled extrusion printing is adequately supported by the yield-stress bath and since the liquid filament and the yield-stress bath are both aqueous in most cases, their interfacial tension is negligible. Instead, the yield stress and elastic behavior of the yield-stress bath material may play a more important role during the formation of filaments in addition to build material properties and operating conditions.

For filament formation in a support bath in general, Kolesky et al[25] reported that by only varying the printing pressure, filament diameter could be adjusted in a wide range using only one nozzle with a given diameter; microchannel arrays with diameters increasing from 45 μm to 500 μm were fabricated using the same nozzle. Highley et al[17] changed operating conditions including the nozzle diameter, flow rate, and nozzle translation rate in an extrusion process and found that increasing the nozzle diameter and flow rate caused an increase in filament diameter while increasing the translation rate led to a decrease in filament diameter. As expected, these general conclusions reached are similar to those observed during conventional extrusion. Furthermore, the filament printing performance in a Carbopol yield-stress bath was reported during PDMS filament printing[20]. Depending on different Carbopol products used, printed filaments were smooth and cylindrical or had a rough surface. Unfortunately, there is still no systematic investigation dedicated to study the filament formation in yield stress bath-enabled extrusion.

The objective of this study is to study the printability of hydrogel precursor solutions in a nanoclay yield-stress bath during extrusion-based printing-then-gelation where the printed hydrogel precursor solutions remain liquid until a whole structure is fabricated. The printability herein is mainly evaluated based on the morphology and dimensions of printed liquid filaments. In particular, Laponite nanoclay, a member of the smectite mineral family, was selected for the preparation of yield-stress baths for its unique properties such as the ionic insensitivity, thermal stability and ultraviolet transparency. These properties enable the Laponite nanoclay as a versatile yield-stress support bath material for the fabrication of complex 3D human tissue constructs from various hydrogels. Alginate-gelatin blends were selected herein as the viscoelastic bioink/build material to be printed in the Laponite nanoclay bath. Alginate, a natural polysaccharide isolated from brown algae, consists of a family of unbranched binary copolymers of 1,4 linked β-D-mannuronic acid (M units) and a-L-guluronic acid (G units). Gelatin is derived from collagen, a stiff helical protein with the repeating amino acid sequence glycine-$X_1$-$X_2$ in which $X_1$ and $X_2$ are often proline and hydroxyproline. These two hydrogels are biocompatible and widely used in bioprinting, and alginate-gelatin blends have been applied as bioinks for cellular artificial tissue fabrication[26] and utilized to make sponges for tissue matrices[27], drug delivery carriers[28, 29], wound dressing fibers[30], and enzyme immobilization beads[31]. By varying the concentration of alginate solution and nanoclay suspension, respectively, the effects of their rheological properties on the morphology of extruded filaments are investigated in this study. In addition, the effects of operating conditions including the dispensing pressure, nozzle size, and nozzle path speed on the filament diameter and morphology are studied and discussed systematically. Furthermore, a complex 3D fibroblast-based vascular structure is printed and then gelled in the bath, and the cell viability and metabolic activity are measured to show the biocompatibility of the proposed printing-then-gelation biofabrication approach.

Materials and Experimental Setup

Nanoclay Yield-Stress Bath Preparation

Laponite, a synthetic nanoclay, is widely used in personal care products, coatings, and industrial applications. Laponite nanoclay ($Na_{0.7}Si_8Mg_{5.5}Li_{0.3}O_{20}(OH)_4$) is usually in the form of nanoscale platelets, approximately 1 nm thick and 25 nm in diameter, with very low polydispersity. When dispersed in aqueous solutions, sodium ions dissociate from individual platelets, leaving the faces of each disc negatively charged; hydroxide ion dissociation at platelet edges results in a slight positive charge. This charge distribution drives Laponite nanoclay platelets to adopt a stable "house-of-cards" arrangement as aqueous nanoclay suspension equilibrates to form a colloidal suspension with a yield stress. At rest or when a stress applied on the nanoclay suspension is lower than the yield stress, it behaves as a solid, otherwise it behaves as a liquid.

Laponite EP nanoclay (BYK Additives Inc., Gonzales, Tex.) was used herein to function as the yield-stress support bath for filament formation investigation and cellular structure fabrication due to its neutral pH value. When a nozzle translates in a Laponite EP nanoclay bath, nanosilicates around the nozzle experience shear stress higher than its yield stress, resulting in a transition from a gel state to a sol state. Thus the liquefied Laponite nanoclay suspension can easily fill the crevasse behind the nozzle and entrap the deposited filaments in place. After the nozzle travels away from a given location, the local shear stress recovers below the yield stress, which leads to a rapid reverse transition from the sol state to the gel state to hold deposited filaments in situ.

Laponite EP nanoclay suspensions (pH≈7.0) at different concentrations were used as the support yield-stress bath materials for this filament printability study. Nanoclay suspensions were prepared by dispersing the appropriate amount of dry Laponite EP nanoclay powder in deionized (DI) water with continuous mixing for a minimum of 60 min to ensure thorough hydration of the nanoclay solids, and were stored in the dark in sealed containers to prevent degradation and evaporation and aged for one day before use. Specifically, 0.5%, 1.0%, 2.0%, 4.0%, and 8.0% (w/v) Laponite EP nanoclay suspensions were prepared to investigate the effects of support-bath material properties on filament formation; and 2.0% (w/v) Laponite EP nanoclay suspensions were used for 3D cellular construct fabrication.

Alginate-Gelatin Bioink Preparation

The bioink blends were prepared by dispersing the appropriate amount of dry sodium alginate (NaAlg) (low molecular weight (20-40 kDa), Acros Organics, Waltham, Mass.) powder and gelatin (Type A, 300 bloom, from porcine skin, MP Biomedicals, Solon, Ohio) powder in hot DI water (~50° C.) with continuous stirring until completely dissolved. Then the blend precursor solutions were cooled down to 37° C. for use. Specifically, bioink blends consisting of 0.5%, 1.0%, 2.0% (w/v) NaAlg and 10.0% (w/v) gelatin were prepared and printed respectively to investigate the effects of bioink properties on filament formation.

Cellular Bioink Preparation

For cellular construct fabrication, bioink made of the alginate and gelatin precursors and mouse fibroblasts was prepared for extrusion printing. The mixed stock solution (4.0% (w/v) alginate and 20.0% (w/v) gelatin) was prepared by dispensing the required amount of each powder in Dulbecco's modified Eagle's medium (DMEM, Sigma-Aldrich, St. Louis, Mo.) at 37° C. with continuous stirring until completely dissolved, then combined with suspended NIH-3T3 mouse fibroblasts ($1 \times 10^7$ cells/mL, ATCC, Rockville, Md.) in DMEM at 1:1 (v:v) to make the final bioink with cells (2.0% (w/v) NaAlg, 10.0% (w/v) gelatin, and $5 \times 10^6$ cells/mL 3T3 fibroblasts). Specifically, the fibroblasts were cultured in DMEM supplemented with 10.0% Fetal Bovine Serum (FBS; HyClone, Logan, Utah) in a humidified 5.0% $CO_2$ incubator at 37° C. The culture medium was replaced every 3 days as required. Then the freshly confluent flasks of 3T3 fibroblasts were washed twice with Dulbecco's phosphate buffered saline (PBS; Cellgro, Manassas, Va.), and incubated with 0.25% Trypsin/EDTA (Sigma-Aldrich) for 5 min at 37° C. to detach the cells from the culture flasks. After that, the cell suspension was centrifuged at 1000 rpm for 5 min at room temperature and the resulting pellet was resuspended in DMEM complete cell culture medium. Finally, the resuspended cells were adjusted to the cell concentration of $1 \times 10^7$ cells/mL and mixed with alginate-gelatin blends to make the cellular bioink.

Printing System and Printing Conditions

The extrusion system was a micro-dispensing pump machine (nScrypt-3D-450, nScrypt, Orlando, Fla.), in which the bioinks were dispensed through a nozzle tip (EFD Nordson, Vilters, Switzerland) pneumatically to form continuous filaments. As the nozzle tip moved in a nanoclay bath, filaments were deposited along the printing path. Due to the yield-stress property of the nanoclay suspension, the deposited fluid filaments were held stably in situ as shown in FIG. 4.1 before any necessary crosslinking.

The diameter of extruded filaments was measured using an optical microscope (EVOS XL Core, Thermo Fisher Scientific, Waltham, Mass.). To increase the visibility, a red food dye (Mccormick, Hunt Valley, Md.) was added to the alginate-gelatin blends. It is noted the filament diameter may increase due to the diffusion of both the food dye and the ungelled bioink blends. As observed, the filament diameter increases approximately 13.3% after one hour. To avoid any measurement error, the filament measurement was taken less than two minutes after filament deposition to minimize the effect of diffusion on the variation of filament diameters. For alginate-gelatin precursor solution printing, the 37° C. printing temperature was controlled using a heating tape (SRT051-020, Omega, Stamford, Conn.) with temperature control accuracy of 0.1° C., a temperature controller (CSi32J-C24, Omega, Stamford, Conn.), and a thermo-couple probe (JMQSS-040U-6, Omega, Stamford, Conn.). It should be noted that the bath was not heated to prevent gelation during printing since alginate-gelatin solution didn't gel during the period of this filament diameter and morphology investigation.

To comprehensively investigate the effects of operating conditions on the filament formation process of different alginate-gelatin blends in different nanoclay baths, some key printing parameters including the dispensing pressure, nozzle size, and nozzle translation speed (path speed) as well as different concentrations of alginate-gelatin solutions and nanoclay suspensions were selected to print filaments as detailed in Table 4.1.

TABLE 4.1

| Printing Conditions | |
| --- | --- |
| Parameter | Values |
| Dispensing pressure (psi) | 5, 10, 15, 20, 25, 30 |
| Nozzle diameter (μm) | 100, 150, 200, 250, 330, 400 |

TABLE 4.1-continued

| Printing Conditions | |
| --- | --- |
| Parameter | Values |
| Path speed (mm/s) | 0.5-15 |
| Alginate concentration (% (w/v)) | 0.5, 1.0, 2.0 |
| Laponite concentration (% (w/v)) | 0.5, 1.0, 2.0, 4.0, 8.0 |

Rheological Property Measurements

Rheological properties of Laponite EP nanoclay suspensions (room temperature) at different concentrations (0.5%, 1.0%, 2.0%, 4.0%, and 8.0% (w/v)) and alginate-gelatin blend solutions (37'C) at different alginate concentrations (0.5%, 1.0%, and 2.0% (w/v) alginate mixed with 10.0% (w/v) gelatin) were measured using a rheometer (ARES LS1, TA, New Castle, Del.) with a cone-plate measuring geometry, which had a diameter of 50 mm, a cone-to-plate gap distance of 46 μm, and a cone angle of 2.64°. To investigate the fluid-like behavior of Laponite nanoclay suspensions and alginate-gelatin blends, frequency sweep (frequency range of 0.1~100 rad/s) tests were performed in the linear viscoelastic region (LVR) at a low strain of 1.0%. To determine the yield stress of Laponite EP nanoclay suspensions quantitatively, steady rate sweeps were conducted by varying the shear rate from 0.001 $s^{-1}$ to 1000 $s^{-1}$, and the stresses were measured at different shear rates. It is noted that the rheological properties of the 2.0% (w/v) Laponite nanoclay EP suspension were also measured at 37° C. since it was used for cellular vascular construct printing at 37° C. To measure the viscosity of alginate-gelatin blends (37° C.), the same steady rate sweeps were performed on alginate-gelatin blends with different alginate concentrations, and the viscosities were recorded at different shear rates.

Cell Viability and Metabolic Activity Evaluation

After three-day incubation in a humidified 5% $CO_2$ incubator at 37° C., the morphology of cells of the printed vascular constructs was examined by staining with 10.0 μg/mL fluorescein diacetate (FDA, Sigma, St. Louis, Mo.) and 10.0 μg/mL Hoechst 33342 (Sigma Aldrich, St. Louis, Mo.) and imaged using an EVOS FL fluorescence microscope (470 nm excitation and 525 nm emission, Thermo Fisher Scientific, Waltham, Mass.). For cell viability testing, the printed and/or incubated tubes were liquefied using aqueous 0.055M sodium citrate (VWR, West Chester, Pa.), and cells were collected by centrifuging at 1000 rpm for 5 minutes. The cell pellets were then resuspended by mixing with 20 μL DMEM. The control samples were unprinted 3T3 cellular bioink cultured in 35 mm petri dishes in the humidified 5% $CO_2$ incubator. 20 μL of the liquefied suspension was mixed with fluorescein diacetate to a concentration of 10.0 μg/mL and incubated at room temperature for 5 minutes. Stained green live cells were counted under the fluorescence microscope; total cells were counted using the transmitted light channel of the microscope.

For metabolic activity testing, the cellular constructs were incubated for three days while the same volume cellular bioink was incubated as ungelled fluid in a Petri dish as control. The metabolic activity of the cells in the printed constructs as well as the control sample was evaluated using the alamarBlue assay (Thermo Scientific, Rockford, Ill.) on Days 1, 2, and 3 per the manufacturer's protocol. The resulting fluorescence intensity was recorded using a fluorescence microplate reader (Synergy HT, Biotek, Winooski, Vt.).

Statistical Analysis

All quantitative values of filament measurements in the text and figures were reported as means±standard deviation (SD) with n=3 samples per group. Statistical analysis was performed using analysis of variance (ANOVA) and p-values of less than 0.05 were considered statistically significant.

Experimental Results

In nanoclay bath-enabled fabrication, the filament printability is influenced by bioink material properties, nanoclay bath material properties and operating conditions. Under different conditions, several types of filaments are observed during alginate-gelatin extrusion in the nanoclay bath. Since the printed filaments are consistent for each filament pattern, the images are segmented in the middle of the corresponding types of filaments and illustrated in FIGS. 4.2A and 4.2B: three types of well-defined liquid filaments (swelling filament, equivalent diameter filament, and stretched filament, (FIG. 4.2A)) and four types of irregular liquid filaments (rough surface filament, over-deposited filament, compressed filament, and discontinuous filament (FIG. 4.2B)). Particularly, of the three types of well-defined filaments, the swelling filament has a diameter larger than the nozzle diameter but with a smooth surface, the equivalent diameter filament has a diameter approximating the nozzle diameter, and the stretched filament has a diameter smaller than the nozzle diameter due to the stretching effect when the path speed is higher than the velocity of bioink at the nozzle exit (dispensing velocity). Of the four types of irregular filaments, the rough surface filament has a diameter much larger than the nozzle diameter with an irregular surface, the over-deposited filament is a group of filaments twisted together and its surface morphology is uncontrollable, the compressed filament has a rectangle-like cross section (FIG. 4.2B, center right) instead of a circular cross section due to the hydrostatic compression from the nanoclay bath, and the discontinuous filament is a filament broken into droplets or segments due to high path speeds. Well-defined filaments are favored for 3D printing due to their well-defined geometries, and irregular filaments should be avoided due to the uncontrollability of the morphology and/or diameter of such filaments.

Effects of Bioink Material Properties on Filament Formation

The measured rheological properties of alginate-gelatin blends are shown in FIGS. 4.3A and 4.3B. FIG. 4.3A depicts the relationship between the viscosity and shear rate; for all the alginate-gelatin blends the viscosity decreases with the shear rate, meaning that the alginate-gelatin blends are a typical shear-thinning material. With the increasing alginate concentration, the viscosity also increases. FIG. 4.3B illustrates the relationship between the shear moduli and frequency varying from $10^{-1}$ to $10^2$ Hz. As seen from the figure, with the increase of frequency the shear moduli (storage (G') and loss (G") moduli) increase, and for all alginate-gelatin blends with different alginate concentrations, the loss modulus is higher than the storage modulus.

Filaments made of different alginate-gelatin blends are extruded in the 4.0% (w/v) nanoclay bath under the same printing conditions, that is, the same dispensing pressure, nozzle size, and path speed. FIG. 4.4A shows the typical filament morphologies and the relationship between filament diameter and alginate component concentration. All the filaments formed are swelling filaments, and with the increase of alginate concentration, the filament diameter decreases. The flow rate is a function of nozzle geometries, dispensing pressure, and viscosity of build materials, and can be approximated as inversely proportional to the build material viscosity[10]. Under the same printing conditions, the high alginate concentration blend has a smaller flow rate due to its higher viscosity, which results in the decreased filament diameter.

In addition, significant spreading is observed for the lower alginate concentration (0.5% (w/v)) filaments in the nanoclay bath, resulting in a much larger filament diameter than the nozzle diameter; the higher alginate concentration (1.0% and 2.0% (w/v)) filaments exhibit less swelling, so their diameters are similar to the nozzle diameter as shown in the insets of FIG. 4.4A. This phenomenon may be explained by the combined result due to both the initial filament formation and subsequent filament spreading in the nanoclay bath. The lower viscosity of low alginate concentration blends leads to a higher flow rate during printing. Thus, the initial filament diameter of low alginate concentration blends is larger than those of high alginate concentration blends. Besides, both storage and loss moduli of low alginate concentration blends are lower than those at high alginate concentrations as shown in FIG. 4.3B, and the resulting alginate-gelatin filaments behave more like a liquid at a lower concentration (the loss modulus is much larger than the storage modulus), which can easily spread and/or fuse together after deposition. As such, the low alginate concentration filament has a larger diameter than the nozzle diameter while the high alginate concentration filament has less swelling.

This phenomenon is more obvious when extruding different alginate concentration blends in a less concentrated nanoclay bath. Using the same printing conditions, alginate-gelatin filaments are extruded in the 0.5% (w/v) nanoclay bath, and the printing results are shown in FIG. 4.4B. At a lower alginate concentration (0.5% (w/v)), the high flow rate and more liquid-like behavior (low viscosity) make the deposited filaments fuse well with each other to form filaments with rough surfaces. When the alginate concentration increases to 1.0% (w/v), the deposited filaments have a higher viscosity and behave more like rigid wires. In addition, due to the low yield stress of the 0.5% (w/v) nanoclay suspension the printed alginate-gelatin blends cannot be trapped in situ as deposited. Especially, at a low path speed, the filaments tend to spatially overlap the deposited pattern, resulting in over-deposited filaments with a transition from the rough surface filament to a bundle of twisted filaments. At an even higher alginate concentration (2.0% (w/v)), the deposited filaments twist and overlap more with each other without rapid fusion due to its higher viscosity.

Effects of Support Bath Material Properties on Filament Formation

The measured relationship between shear stress and shear rate is shown in FIG. 4.5A. As the nanoclay concentration increases, the yield stress increases accordingly. With the increase of shear rate, the shear stress increases accordingly, indicating that the nanoclay suspension is a shear-thinning material. When the shear rate is approximately 0, there is still a shear stress value as extrapolated, which shows that the nanoclay suspension is a yield-stress material and such stress value is the yield stress of nanoclay suspensions at a corresponding concentration. By fitting the measurement data using the Herschel-Bulkley model $\sigma = \sigma_0 + k\dot{\gamma}^n$, where $\sigma$ is the shear stress, $\dot{\gamma}$ is the shear rate, $\sigma_0$ is the yield stress, k is the consistency index, and n is the flow index, it is found that the yield stress increases from 0.0015 to 0.16 to 4.20 to 8.80 to 15.78 Pa, respectively for each nanoclay suspension. The yield stress represents the threshold for transition between the liquid and solid states. If $\sigma < \sigma_0$, the nanoclay suspension behaves as a solid to support deposited liquid features in place. Otherwise, it behaves as a fluid to fill any crevasse behind the nozzle and entrap deposited liquid features.

As a support bath material, the dynamic rheological properties under stressed conditions must be evaluated, and the measured relationships between shear moduli and frequency are shown in FIG. 4.5B. As seen from FIG. 4.5B, both the storage and loss moduli increase when the nanoclay concentration and the frequency increase. Over the sweep range (from $10^{-1}$-$10^{1}$ Hz) the storage modulus is higher than the loss modulus at each nanoclay concentration, confirming that the nanoclay support bath demonstrates a gel-like behavior. By comparing the storage modulus of nanoclay suspensions (FIG. 4.5B) with that of alginate-gelatin blends (FIG. 4.3B), it is found that at the same frequency (e.g. 1 Hz) the storage moduli of nanoclay suspensions vary significantly (four orders) as ~0.1 Pa (0.5% (w/v) nanoclay suspension) to ~1 Pa (1.0% (w/v)), ~10 Pa (2.0% (w/v)), ~100 Pa (4.0% (w/v)), and ~1000 Pa (8.0% (w/v)). In contrast, the storage moduli of alginate-gelatin blends don't change too much when the alginate concentration increases: ~0.1 Pa for 0.5% (w/v) alginate-gelatin blends, ~1.0 Pa for 1.0% (w/v) alginate-gelatin blends, and ~10 Pa for 2.0% (w/v) alginate-gelatin blends.

Since 2.0% (w/v) nanoclay suspension is used for cellular construct printing at 37° C., the rheological measurements (steady rate sweeps and frequency sweeps) of 2.0% (w/v) Laponite EP are performed at both room temperature and 37° C. as shown in FIGS. 4.5C and 4.5D. From FIGS. 4.5C and 4.5D, it is found that the shear stress and moduli of nanoclay suspension at 37° C. are slightly lower than those at room temperature.

Different alginate-gelatin filaments are printed, and their filament diameter is measured and shown in FIG. 4.6A. Under a given set of printing conditions, the increase of nanoclay concentration leads to a decrease in the filament diameter. This phenomenon is attributed to the increase of yield stress when the nanoclay concentration increases. At low concentrations, the yield stress of nanoclay suspension is relatively low (~$10^{-3}$ Pa for 0.5% (w/v) nanoclay suspension), and the nanoclay bath behaves like a very weak liquid-like gel. Thus, when extruding alginate-gelatin blends in the bath, the deposited filaments can easily flow and spread in the liquid-like support bath, resulting in the formation of filaments with larger diameters even at high path speeds (such as 4.0 mm/s). However, with the increase of nanoclay concentration, the yield stress increases, which leads to a stronger gel-like state of the nanoclay bath. As a result, the deposited filament cannot easily spread in the bath and can retain its original dimensions stably as deposited.

It is noted that more types of filaments can be produced by adjusting the nanoclay bath concentration when depositing alginate-gelatin blends with a higher alginate concentration. As seen from FIG. 4.6A, low alginate concentration filaments (such as 0.5% and 1.0% (w/v) alginate) always have a larger diameter than the nozzle inner diameter (ID: 250 μm) regardless of the concentration of nanoclay suspension, and they can be categorized as swelling filaments. In contrast, high alginate concentration filaments (such as 2.0% (w/v) alginate) can achieve a much wider range of filament diameter, smaller or larger than the nozzle diameter by adjusting the nanoclay concentration, providing an alternative way to control the filament diameter when printing viscous inks.

At low path speeds (e.g. 0.5 mm/s), the effects of nanoclay concentration on the filament formation are more pronounced as seen from FIG. 4.6B. In a less concentrated nanoclay bath, some irregular filaments such as rough surface and over-deposited filaments are formed due to the low yield stress of the support bath and its liquid-like behavior. As the nanoclay concentration increases, low concentration alginate-gelatin filaments (0.5% (w/v)) may vary from the rough surface filament to the swelling filament and to the compressed filament, while high concentration alginate-gelatin filaments (2.0% (w/v)) may result in the morphological transition from the over-deposited filament to swelling filament.

When extruding the low alginate concentration blends in nanoclay baths, the filaments can be easily compressed in a high concentration nanoclay bath (e.g. 8% (w/v)) due to the big difference in storage moduli (three-order difference) as aforementioned; this results in the formation of compressed filaments. When extruding the high alginate concentration blends with a higher storage modulus, the compression effect on deposited filaments is not so pronounced as during printing of the low concentration alginate-gelatin blends, resulting in a more controllable morphology of deposited filaments. As such, when using nanoclay as the support bath material for 3D printing, the nanoclay concentration must be selected carefully with respect to the bioink rheological properties in order to allow a wider range of achievable filament diameters with well-defined morphology.

Effects of Operating Conditions on Filament Formation Mathematical Model

Different operating conditions such as the nozzle diameter and dispensing pressure determine the dispensing velocity ($v_{out}$), and the formation of filament depends on the ratio between the path speed ($v_{path}$) and $v_{out}$[10, 21, 24]. Thus, it is of great significance to establish a mathematical model to predict $v_{out}$ during the proposed extrusion process. By assuming the flow of alginate-gelatin solution through a nozzle into the nanoclay bath as a Poiseuille flow with an exit pressure p as shown in FIG. 4.7, the following mass and momentum conservation equations can be listed as follows:

$$\frac{1}{r}\frac{\partial(rv_r)}{\partial r} + \frac{1}{r}\frac{\partial v_\theta}{\partial \theta} + \frac{\partial v_z}{\partial z} = 0 \quad (4.1)$$

$$\begin{pmatrix} \rho\frac{\partial v_r}{\partial t} \\ \rho\frac{\partial v_\theta}{\partial t} \\ \rho\frac{\partial v_z}{\partial t} \end{pmatrix} + \rho\begin{pmatrix} v_r\frac{\partial v_r}{\partial r} + v_\theta\left(\frac{1}{r}\frac{\partial v_r}{\partial \theta} - \frac{v_\theta}{r}\right) + v_z\frac{\partial v_r}{\partial z} \\ v_r\frac{\partial v_\theta}{\partial r} + v_\theta\left(\frac{1}{r}\frac{\partial v_\theta}{\partial \theta} + \frac{v_r}{r}\right) + v_z\frac{\partial v_\theta}{\partial z} \\ v_r\frac{\partial v_z}{\partial r} + v_\theta\left(\frac{1}{r}\frac{\partial v_z}{\partial \theta}\right) + v_z\frac{\partial v_z}{\partial z} \end{pmatrix} = \quad (4.2)$$

$$-\begin{pmatrix} \frac{\partial P}{\partial r} \\ \frac{1}{r}\frac{\partial P}{\partial \theta} \\ \frac{\partial P}{\partial z} \end{pmatrix} - \begin{pmatrix} \frac{1}{r}\frac{\partial}{\partial r}(r\tau_{rr}) + \frac{1}{r}\frac{\partial \tau_{\theta r}}{\partial \theta} + \frac{\partial \tau_{zr}}{\partial z} - \frac{\tau_{\theta\theta}}{r} \\ \frac{1}{r^2}\frac{\partial}{\partial r}(r^2\tau_{r\theta}) + \frac{1}{r}\frac{\partial \tau_{\theta\theta}}{\partial \theta} + \frac{\partial \tau_{r\theta}}{\partial z} + \frac{\tau_{\theta r} - \tau_{r\theta}}{r} \\ \frac{1}{r}\frac{\partial}{\partial r}(r\tau_{rz}) + \frac{1}{r}\frac{\partial \tau_{\theta z}}{\partial \theta} + \frac{\partial \tau_{zz}}{\partial z} \end{pmatrix} + \begin{pmatrix} 0 \\ 0 \\ \rho g \end{pmatrix}$$

where r is the radius, $v_r$, $v_\theta$ and $v_z$ are the cylindrical velocity components, ρ is the density, t is the time, P is the pressure, $\tau_{rr}$, $\tau_{\theta r}$, $\tau_{zr}$, $\tau_{\theta\theta}$, $\tau_{\theta z}$ and $\tau_{zz}$ are the cylindrical stress components of stress tensor $\underline{\tau}$, and g is the gravitational acceleration.

Since $v_r=v_\theta=0$ in this study, the above equations are simplified along the z direction only as follows:

$$\frac{\partial v_z}{\partial z} = 0 \quad (4.3)$$

$$0 = -\frac{\partial P}{\partial z} - \left(\frac{1}{r}\frac{\partial}{\partial r}(r\tau_{rz}) + \frac{1}{r}\frac{\partial \tau_{\theta z}}{\partial \theta} + \frac{\partial \tau_{zz}}{\partial z}\right) + \rho g \quad (4.4)$$

The alginate-gelatin solution is a type of quasi-linear viscoelastic fluid, so Jeffrey's constitutive equation is used to describe its rheological properties as follows:

$$\underline{\underline{\tau}}(t) = -\int_{-\infty}^{t}\left[\frac{\eta_0}{\lambda_1}\left(1-\frac{\lambda_2}{\lambda_1}\right)e^{\frac{-(t-t')}{\lambda_1}}\right]\underline{\underline{\dot{\gamma}}}(t')dt' - \frac{\lambda_2\eta_0}{\lambda_1}\underline{\underline{\dot{\gamma}}}(t) \quad (4.5)$$

where $\eta_0$ is the zero-shear-rate viscosity, $\lambda_1$ is the relaxation time, $\lambda_2$ is the retardation time, $\underline{\underline{\dot{\gamma}}}$ is the shear rate tensor, and t' is the pseudo time.

Then the stress components can be derived by substituting the velocity gradient and shear rate tensor into Eq. (4.5) as follows:

$$\tau_{rz} = -\eta_0 \frac{\partial v_z}{\partial r}, \tau_{rr} = \tau_{r\theta} = \tau_{\theta\theta} = \tau_{\theta z} = \tau_{zz} = 0 \quad (4.6)$$

Herein the aforementioned Herschel-Bulkley model ($\sigma=\sigma_0+k\dot{\gamma}^n$) is used to describe the stress as a function of shear rate for yield-stress fluids at low shear rates.

For simplification the exit pressure p equals to $\sigma$ and after substituting Eq. (4.6) and Herschel-Bulkley model into Eq. (4.4), the velocity distribution at the nozzle exit can be derived as:

$$v_z = \frac{(p_0-\sigma)+\rho g L}{4\eta_0 L}(R^2-r^2) \quad (4.7)$$

where, $p_0$ is the inlet pressure, L is the nozzle length, and R is the nozzle radius. Thus, the flow rate can be calculated based on Eq. (4.7):

$$Q = \int_0^R v_z 2\pi r dr = \frac{(p_0-\sigma)+\rho g L}{8\eta_0 L}\pi R^4 \quad (4.8)$$

where Q is the bioink flow rate. The hydrogel dispensing velocity is then estimated by dividing the flow rate b the nozzle exit area as follows:

$$v_{out} = \frac{(p_0-\sigma)+\rho g L}{8\eta_0 L}R^2 \quad (4.9)$$

where $v_{out}$ is the average dispensing velocity at the nozzle exit. As such, the dispensing velocity of alginate-gelatin blends is a function of dispensing pressure and nozzle dimensions, and it increases as the dispensing pressure or nozzle diameter increases. Since the dispensing pressure ($10^5$ Pa) is usually much higher that the pressure drop in the nozzle ($10^2$ Pa) as well as the stress in a nanoclay bath ($\sim 10^{-3}\sim 10^2$ Pa), Eq. (4.9) can be further simplified as follows:

$$v_{out} = \frac{p_0}{8\eta_0 L}R^2 \quad (4.10)$$

Filament Diameter Under Different Operating Conditions

In order to investigate the effects of nozzle dimensions and dispensing pressure on the filament diameter, the 2.0% (w/v) alginate-10.0% gelatin blend is printed in a 4.0% (w/v) nanoclay bath under different operating conditions. FIGS. 4.8A and 4.8B show the relationships between filament diameter and nozzle diameter as well as dispensing pressure. As seen from FIG. 4.8A, the decrease of nozzle diameter leads to the reduction of filament diameter since the less bioink is extruded at a given pressure (20 psi). In FIG. 4.8B, it can be found that the increase of dispensing pressure results in the increase of extruded bioink volume as shown in Eq. (4.8), contributing to the increase of filament diameter at a given path speed (1.0 mm/s).

FIGS. 4.9A-C illustrate the filament formation of different alginate-gelatin solutions when the path speed increases, and the corresponding dispensing velocity is estimated based on Eq. (4.10) and marked in each figure accordingly. If the nozzle path speed $v_{path}$ is lower than $v_{out}$, excess bioink is deposited which leads to the formation of swelling or even irregular filaments. When $v_{path}$ is equal to $v_{out}$, the volume of extruded bioink forms a filament with a diameter equal to the nozzle diameter. When $v_{path}$ increases further, stretching is observed and the deposited material forms a continuous filament with a smaller diameter than the nozzle diameter. When $v_{path}$ further increases to a critical value, discontinuous filaments may form, and the extruded filament breaks up into droplets.

Phase Diagrams for Filament Quality Evaluation and Discussion

To better evaluate the printability of alginate-gelatin precursor solutions in terms of the morphology and dimensions of printed liquid filaments in the nanoclay bath, a 3D printability phase diagram is constructed based on rheological properties of alginate-gelatin blend solutions and nanoclay suspensions as well as operating conditions, which is represented by a dimensionless ratio between the path speed and the bioink dispensing velocity ($v=v_{path}/v_{out}$). As seen from FIG. 4.10 (left), the formation of different types of filaments is the synergistic result of various factors such as material properties and operating conditions.

Furthermore, two representative sub-phase diagrams are summarized in FIG. 4.10 (right). In FIG. 4.10 (right, top) where the nanoclay concentration is fixed at 4.0% (w/v), it can be seen that when $v_{path}/v_{out}=1$, the equivalent diameter filament can be printed. However, at lower alginate concentrations, $v_{out}$ is relatively high due to their very low viscosity, and it is difficult to match this velocity by increasing the path speed. Thus, when extruding alginate-gelatin blends with a low alginate concentration, swelling filaments are typical under most printing conditions. In contrast, by increasing the alginate concentration, other types of filaments such as equivalent diameter filaments and stretched filaments and even discontinuous filaments can be formed.

FIG. 4.10 (right, bottom) illustrates the filaments formed by 0.5% (w/v) alginate-10.0% (w/v) gelatin blends printed in different nanoclay baths. As seen from FIG. 4.10 (right, bottom), although it is difficult to achieve the filament with the diameter equal or smaller than the nozzle diameter, it is still possible to have well-defined swelling filaments by controlling operating conditions and selecting suitable nanoclay concentrations.

As observed, the elastic properties of both nanoclay suspensions and alginate-gelatin blends result in the formation of different types of filaments when depositing alginate-gelatin blends in a nanoclay bath. As shown in FIG. 4.11, a two-dimensional phase diagram is further constructed by including a material property-based dimensionless number, which is defined as the storage modulus ratio between the nanoclay bath and the bioink: $G'_{bath}/G'_{ink}$, in addition to the operating conditions-dependent number v. FIG. 4.11 can be used to guide the selection of alginate-gelatin concentration, nanoclay concentration, and operating conditions to facilitate the fabrication of 3D structures with smooth and well-defined filaments with a controllable diameter.

Comparison Between Conventional Extrusion and Nanoclay Bath-Enabled Printing

The filament formation process in conventional extrusion approaches is different from that during the nanoclay support bath-enabled fabrication approach. In conventional extrusion approaches which follow the gelation-while-printing procedure, filaments are usually deposited directly in air and solidified in situ[12,13] or deposited in a crosslinking solution to be rapidly solidified[10]. For the former scenario, the filament formation before crosslinking is in a liquid-in-air environment, and liquid-air interfacial surface tension and the gravitational force significantly affect the morphology of deposited filaments. In some situations, the pinchoff phenomenon is observed due to the gravity and surface tension effects at high standoff distances or the large pulling force at high path speeds. The resulting filament may break up into several droplets before landing on the receiving substrate or the previously deposited layer. For the latter scenario, the filament formation in a crosslinking solution is in a solid-in-liquid environment, in which deposited fluid filament is rapidly crosslinked. Although the (aqueous) crosslinking solution has negligible effect on the morphology of printed and solidified filaments, undesirable nozzle clogging may be difficult to be mitigated.

In contrast, filament formation during the nanoclay bath-enabled fabrication is in a liquid-in-liquid environment in which deposited filament retains its liquid state before the whole structure is printed. Thus, the material properties of support bath may affect the filament formation process in the bath. Firstly, due to the yield-stress property of nanoclay bath, the entrapped filament can hold its shape once extruded instead of spreading. Secondly, the filament breakup phenomenon caused by the interfacial tension is absent since the interfacial surface tension between the nanoclay bath and inks is usually negligible. Instead, the filament breakup in a nanoclay bath is possible due to the mismatch of bioink dispensing velocity and path speed. Finally, the deposited filament diameter and morphology is influenced by the rheological properties of nanoclay support bath materials.

Application for Alginate-Gelatin Vascular Structure Fabrication

Vascular networks are critical for the delivery of nutrients and oxygen as well as removal of metabolic byproducts for organ systems. Successful fabrication of vascular networks is usually viewed as the first step toward on-demand manufacturing human tissues[32]. Based on the knowledge learned from the aforementioned filament formation study, a complex 3D cellular vascular construct is designed and printed in the nanoclay bath. Considering the effects of nanoclay concentration on the filament formation and the ease of post-processing such as residual nanoclay removal from printed and crosslinked constructs, 2.0% (w/v) Laponite EP nanoclay was used as the support bath and 2.0% (w/v) alginate-10.0% (w/v) gelatin mixed with $5 \times 10^6$ cells/mL 3T3 fibroblasts was used as the bioink. Printing conditions wise, a 25 gauge (250 µm inner diameter) dispensing tip (EFD Nordson, Vilters, Switzerland) was used; the dispensing pressure was 15 psi (1 psi=$6.9 \times 10^3$ Pa) and the path speed was 2.0 mm/s. The cellular alginate-gelatin construct was thermally gelled in the 2.0% (w/v) nanoclay bath at room temperature for 30 min, then moved to a 0.9% (w/v) sodium chloride (NaCl) bath to rinse away the residual nanoclay, and finally crosslinked in a 2.0% (w/v) calcium chloride ($CaCl_2$)) bath at 37° C. for 15 minutes to crosslink the alginate component for thermal stability in incubation.

The designed vascular construct is shown in FIG. 4.12A, and its detailed dimensions are illustrated in FIG. 4.12B. Overall, the vascular construct consists of three Y-shaped vascular units and has an average tubular diameter of 4.0 mm and a wall thickness of 1.0 mm as shown in the inset of FIG. 4.12B. The total height of the vascular construct is 22.0 mm and the inclination angle of each branch is 45°. For the printing of such a large spanning structure with many branches, the nanoclay bath provides an additional benefit in improving the efficiency by using a "localized layer-by-layer" printing procedure in which the nozzle keeps turning on and depositing a filament continuously while moving up vertically to form a designed structure; then the nozzle moves to other sides for printing other portions only after completing a branched structure as shown in FIG. 4.12C. By using this printing procedure, the dispensing nozzle does not need to be frequently turned on and off per the design of structures at a given elevation under the conventional layer-by-layer approach, which requires non-depositing travel between various deposition locations in the bath. As such, the printing efficiency can be effectively improved by maximizing the continuous deposition of build materials and minimizing unnecessary discontinuities in material deposition and the total printing time can be reduced from 75 minutes (conventional layer-by-layer printing) to 45 minutes (proposed "localized layer-by-layer" printing).

Using the proposed "localized layer-by-layer" extrusion planning, the cellular vascular construct is printed as shown in FIG. 4.12D. During the printing process, the ambient temperature was kept at 37° C. to ensure that the bioink remains fluid and to facilitate the printing-then-gelation fabrication procedure. It is noted that the 2.0% (w/v) Laponite EP nanoclay at 37° C. has the similar rheological properties as those at room temperature as seen from FIG. 5($c$), so the resulting knowledge from the filament diameter and morphology study still applies here. As seen from FIG. 4.12D, the average tubular diameter is 4.12 mm and all the other dimensions are similar to the designed geometries, proving the effectiveness of the proposed nanoclay bath-enabled biofabrication approach. Once fabricated, the residual nanoclay in the channels is removed by pipetting NaCl solution through the channels. To test whether the nanoclay suspension in the channels of the construct is removed, the DMEM medium with a red food dye solution (to improve the visibility) is pumped through the channels; all branches show red fluid flow as seen in FIG. 4.12E, indicating the effective removal of residual nanoclay.

The nanoclay-free cellular vascular construct is further incubated in a humidified 5% $CO_2$ incubator at 37° C. for follow-up biological evaluations. FIG. 4.13A illustrates the crosslinked construct stained with Hoechst 33342 for all fibroblasts (right top) and fluorescein diacetate (FDA) for living fibroblasts (right bottom). Cell viability is measured by counting live cells (stained with FDA) and dead (non-fluorescing) cells in image stacks. As shown in FIG. 4.13B, the cell viability immediately after printing is 93.6% and remains above 90.0% (90.2%) with the control effect considered, which is the cell viability of the unprinted bioinks. In addition, the metabolic activity during the three-day incubation is investigated by alamarBlue reduction testing, and the same volume cellular bioink deposited in a Petri dish is used as the control. After the three day incubation at 37° C., the resulting fluorescent intensity is recorded as shown in FIG. 4.13C. It is found that cells in the vascular construct live and proliferate during the three-day incubation, proving the biocompatibility of the proposed biofabrication approach.

Conclusions

The formation of alginate-gelatin filaments in a nanoclay bath is investigated. By varying the alginate concentration, nanoclay concentration, and operating conditions including the dispensing pressure, nozzle geometry and nozzle path speed, different filament types have been observed. Based on the knowledge gained from filament formation investigation, cellular vascular constructs have been successfully fabricated with well-defined features in a nanoclay bath. Some main conclusions are summarized as follows:

1. Seven filament types are observed during extrusion in the nanoclay bath: three types of well-defined filaments (swelling filament, equivalent diameter filament, and stretched filament) and four types of irregular filaments (rough surface filament, over-deposited filament, compressed filament, and discontinuous filament).
2. When the alginate concentration increases, the diameter of filaments made of alginate-gelatin blends decreases;
3. The nanoclay concentration significantly affects the morphology of deposited filaments: low concentration Laponite bath (such as 0.5% (w/v)) may lead to the formation of irregular filaments such as rough surface and over-deposited filaments while high concentration bath (such as 8.0% (w/v)) may result in the formation of compressed filaments. Such filaments are undesirable for 3D printing;
4. Operating conditions affect the filament diameter and morphology. The increase of dispensing pressure and nozzle diameter results in the increase of filament diameter; the increase of path speed leads to the decrease of filament diameter and results in the filament formation from swelling to equivalent diameter to stretched to discontinuous;
5. The filament diameter and morphology of alginate-gelatin blends with a higher alginate concentration is more adjustable than those with a lower alginate concentration by adjusting the nanoclay bath concentration. The effects of nanoclay concentration on the filament formation are more obvious when extruding alginate-gelatin blends at low path speeds (such as 0.5 mm/s);
6. The filament printability can be evaluated using a phase diagram constructed based on the storage modulus ratio between the nanoclay bath and the bioink and the speed ratio between the nozzle path speed and the ink dispensing speed at the nozzle exit; and
7. Cellular vascular construct can be successfully fabricated based on good fabrication conditions as identified, and the cell viability and metabolic activity of the printed vascular constructs demonstrates the feasibility of the proposed fabrication approach.

References for Example 4

1. Y. Huang, M. C. Leu, J. Mazumder, A. Donmez, Additive manufacturing: current state, future potential, gaps and needs, and recommendations, ASME J. of Manufacturing Sci. and Eng. 137 (2015) 014001-1-10.
2. V. Mironov, R. P. Visconti, V. Kasyanov, G. Forgacs, C. J. Drake, R. R. Markwald, Organ printing: tissue spheroids as building blocks, Biomaterials 30 (2009) 2164-2174.
3. B. R. Ringeisen, R. K. Pirlo, P. K. Wu, T. Boland, Y. Huang, W. Sun, D. B. Chrisey, Cell and organ printing turns 15: diverse research to commercial transitions, MRS Bulletin 38 (2013) 834-843.
4. S. V. Murphy, A. Atala, 3D bioprinting of tissues and organs, Nature Biotechnology 32 (2014) 773-785.
5. F. Pati, J. Gantelius, H. A. Svahn, 3D bioprinting of tissue/organ models, Angewandte Chemie International Edition 55 (2016) 4650-4665.
6. C. Mandrycky, Z. Wang, K. Kim, D. H. Kim, 3D bioprinting for engineering complex tissues, Biotechnology Advances 34 (2016) 422-434.
7. C. Xu, W. Chai, Y. Huang, R. R. Markwald, Scaffold-free inkjet printing of three-dimensional zigzag cellular tubes, Biotechnology and Bioengineering 109 (2012) 3152-3160.
8. R. Xiong, Z. Zhang, W. Chai, Y. Huang, D. B. Chrisey, Freeform drop-on-demand laser printing of 3D alginate and cellular constructs, Biofabrication 7 (2015) 045011-1-13.
9. K. Christensen, C. Xu, W. Chai, Z. Zhang, J. Fu, Y. Huang, Freeform inkjet printing of cellular structures with bifurcations, Biotechnology and Bioengineering 112 (2015) 1047-1055.
10. S. Khalil, W. Sun, Biopolymer deposition for freeform fabrication of hydrogel tissue constructs, Materials Science and Engineering: C 27 (2007) 469-478.
11. I. T. Ozbolat, M. Hospodiuk, Current advances and future perspectives in extrusion-based bioprinting, Biomaterials 76 (2016) 321-343.
12. R. Landers, U. Hübner, R. Schmelzeisen, R. Mülhaupt, Rapid prototyping of scaffolds derived from thermoreversible hydrogels and tailored for applications in tissue engineering, Biomaterials 23 (2002) 4437-4447.
13. L. A. Hockaday, K. H. Kang, N. W. Colangelo, P. Y. C. Cheung, B. Duan, E. Malone, J. Wu, L. N. Girardi, L. J. Bonassar, H. Lipson, C. C. Chu, J. T. Butcher, Rapid 3D printing of anatomically accurate and mechanically heterogeneous aortic valve hydrogel scaffolds, Biofabrication 4 (2012) 035005.
14. Y. Jin, A. M. Compaan, T. Bhattacharjee, Y. Huang, Granular gel support-enabled extrusion of three-dimensional alginate and cellular structures, Biofabrication 8 (2016) 025016.
15. D. F. D. Campos, A. Blaeser, M. Weber, J. Jäkel, S. Neuss, W. Jahnen-Dechent, H. Fischer, Three-dimensional printing of stem cell-laden hydrogels submerged in a hydrophobic high-density fluid, Biofabrication 5 (2012) 015003.
16. W. Wu, A. DeConinck, J. A. Lewis, Omnidirectional printing of 3D microvascular networks, Advanced Materials 23 (2011) 178-183.
17. C. B. Highley, C. B. Rodell, J. A. Burdick, Direct 3D printing of shear-thinning hydrogels into self-healing hydrogels, Advanced Materials 27 (2015) 5075-5079.
18. T. J. Hinton, Q. Jallerat, R. N. Palchesko, J. H. Park, M. S. Grodzicki, H. J. Shue, A. W. Feinberg, Three-dimensional printing of complex biological structures by freeform reversible embedding of suspended hydrogels, Science Advances 1 (2015) 1500758 (2015).

19. T. Bhattacharjee, S. M. Zehnder, K. G. Rowe, S. Jain, R. M. Nixon, W. G. Sawyer, T. E. Angelini, Writing in the granular gel medium, Science Advances 1 (2015) e1500655.
20. T. J. Hinton, A. Hudson, K. Pusch, A. Lee, A. W. Feinberg, 3D Printing PDMS elastomer in a hydrophilic support bath via freeform reversible embedding. ACS Biomaterials Science & Engineering 2 (2016) 1781-1786.
21. M. G. Li, X. Y. Tian, X. B. Chen, Modeling of flow rate, pore size, and porosity for the dispensing-based tissue scaffolds fabrication, Journal of Manufacturing Science and Engineering 131 (2009) 034501.
22. K. H. Kang, L. A. Hockaday, J. T. Butcher, Quantitative optimization of solid freeform deposition of aqueous hydrogels, Biofabrication 5 (2013) 035001.
23. X. Wang, K. He, W. Zhang, Optimizing the fabrication processes for manufacturing a hybrid hierarchical polyurethane-cell/hydrogel construct, Journal of Bioactive and Compatible Polymers 28 (2013) 303-319.
24. J. M. Lee, W. Y. Yeong, A preliminary model of time-pressure dispensing system for bioprinting based on printing and material parameters: This paper reports a method to predict and control the width of hydrogel filament for bioprinting applications, Virtual and Physical Prototyping 10 (2015) 3-8.
25. D. B. Kolesky, R. L. Truby, A. Gladman, T. A. Busbee, K. A. Homan, J. A. Lewis, 3D bioprinting of vascularized, heterogeneous cell-laden tissue constructs, Advanced Materials 26 (2014) 3124-3130.
26. B. Duan, L. A. Hockaday, K. H. Kang, J. T. Butcher, 3D bioprinting of heterogeneous aortic valve conduits with alginate/gelatin hydrogels, Journal of Biomedical Materials Research Part A 101 (2013) 1255-1264.
27. Y. S. Choi, S. R. Hong, Y. M. Lee, K. W. Song, M. H. Park, Y. S. Nam, Study on gelatin-containing artificial skin: I. Preparation and characteristics of novel gelatin-alginate sponge, Biomaterials 20 (1999) 409-417.
28. E. Rosellini, C. Cristallini, N. Barbani, G. Vozzi, P. Giusti, Preparation and characterization of alginate/gelatin blend films for cardiac tissue engineering, Journal of Biomedical Materials Research Part A 91 (2009) 447-453.
29. Z. Dong, Q. Wang, Y. Du, Alginate/gelatin blend films and their properties for drug controlled release, Journal of Membrane Science 280 (2006) 37-44.
30. L. Fan, Y. Du, R. Huang, Q. Wang, X. Wang, L. Zhang, Preparation and characterization of alginate/gelatin blend fibers, Journal of Applied Polymer Science 96 (2005) 1625-1629.
31. N. W. Fadnavis, G. Sheelu, B. M. Kumar, M. U. Bhalerao, A. A. Deshpande, Gelatin blends with alginate: gels for lipase immobilization and purification, Biotechnology Progress 19 (2003) 557-564.
32. K. Schmidt-Nielsen, Scaling in biology: the consequences of size, Journal of Experimental Zoology Part A: Ecological Genetics and Physiology 194 (1975) 287-307.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A composition comprising:
a precursor build material comprising a hydrogel precursor and a support material comprising a nanoclay, wherein the precursor build material has a gel-like state when a stress applied to the precursor build material is less than a yield stress, wherein the precursor build material has a free-flow state when the stress applied to the precursor build material is above the yield stress, and wherein when the stress applied to the precursor build material changes from above the yield stress to below the yield stress, the precursor build material returns to the gel-like state and is self-supporting.

2. The composition of claim 1, wherein the support material comprises one or more of: synthetic clays, synthetic hectorites, smectic clays, sodium silicate, or sodium lithium magnesium silicates.

3. The composition of claim 1, wherein the hydrogel precursor comprises one or more of: alginate, gelation, chitosan, collagen, Matrigel, poly (ethylene glycol), polyvinyl alcohol, or Pluronic.

4. The composition of claim 1, wherein a concentration of the nanoclay in the support material ranges from about 0.5% w/v to about 8.0% w/v.

5. A three-dimensional printing system, comprising:
a precursor build material comprising a hydrogel precursor and a support material comprising a nanoclay; and
a printing device for delivering one or more volumes of the precursor build material into one or more voxels without a support bath, wherein as the one or more volumes of the precursor build material is delivered into the one or more voxels, the support material supports the hydrogel precursor to form a liquid three dimensional structure,
wherein prior to delivering the one or more volumes of the precursor build material to respective voxels of the one or more voxels, the support material is in a gel-like state, wherein the printing device is configured to apply a stress to the support material during delivery of the one or more volumes of the precursor build material into the one or more voxels that is above the yield stress of the support material so that the support material converts into a free-flow state during delivery, wherein after each respective volume of the precursor build material is printed into each respective voxel, the support material in the free-flow state transforms back to the gel-like state to support the liquid three dimensional structure once the stress applied to the support material is below the yield stress.

6. The system of claim 5, wherein the support material comprises a smectite material.

7. The system of claim 6, wherein the smectite material is selected from the group consisting of: montmorillonite (MMT), nontronite, Saponite, hectorite, and a combination thereof.

8. The system of claim 5, wherein the support material comprises one or more of: synthetic clays, synthetic hectorites, smectic clays, sodium silicate, or sodium lithium magnesium silicates.

9. The system of claim 5, wherein the support material is at least one of: ion insensitive, UV transparent, or thermally stable.

10. The system of claim 5, wherein the support material further comprises an aqueous solution, wherein preparing the support material comprises dispersing the nanoclay in the aqueous solution and continuously mixing for a mixing time.

11. The system of claim 10, wherein the aqueous solution comprises a dionized water.

12. The system of claim 5, wherein a concentration of the nanoclay in the support material ranges from about 0.5% w/v to about 8.0% w/v.

13. The system of claim 5, wherein the support material has a pH value of about 7.0 or higher.

14. The system of claim 5, wherein the precursor build material comprises a natural polymer comprising one or more of: alginate, gelatin, chitosan, collagen, Matrigel, agarose, or fibrin.

15. The system of claim 5, wherein the precursor build material comprises a synthetic polymer comprising one or more of: ethylene glycol, polyethylene glycol, polyvinyl alcohol, Pluronic, SU-8, or polydimethylsiloxane.

16. A method comprising:
providing a precursor build material comprising a hydrogel precursor and a support material comprising a nanoclay; and
printing one or more volumes of the precursor build material into one or more respective voxels without a support bath, wherein prior to printing the one or more volumes of the precursor build material into the respective voxels, the support material is in a gel-like state, wherein the printing applies stress to the support material that is above a yield stress of the support material so that upon printing the one or more volumes of the precursor build material into the one or more voxels, the support material converts into a free-flow state, and wherein the support material in the free-flow state transforms back to the gel-like state to support the hydrogel precursor when the applied stress is decreased to below the yield stress to form a liquid three-dimensional structure.

17. The method of claim 16, further comprising:
after said printing of the one or more volumes of the precursor build material into the one or more voxels to form the liquid three-dimensional structure, causing a phase change in the liquid three-dimensional structure to form the three dimensional structure, which can be removed from the support material.

18. The method of claim 16, wherein the support material comprises a smectite material.

19. The method of claim 18, wherein the smectite material comprises one or more of: montmorillonite (MMT), nontronite, Saponite, or hectorite.

20. The method of claim 16, wherein the support material comprises one or more of: synthetic clays, synthetic hectorites, smectic clays, sodium silicate, or sodium lithium magnesium silicates.

* * * * *